(12) United States Patent
Kadotani

(10) Patent No.: US 11,846,844 B2
(45) Date of Patent: Dec. 19, 2023

(54) TRANSMISSIVE LIQUID CRYSTAL PANEL

(71) Applicant: SEIKO EPSON CORPORATION, Tokyo (JP)

(72) Inventor: Norikazu Kadotani, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/875,187

(22) Filed: Jul. 27, 2022

(65) Prior Publication Data

US 2023/0034230 A1    Feb. 2, 2023

(30) Foreign Application Priority Data

Jul. 28, 2021   (JP) ................ 2021-123692

(51) Int. Cl.
*G02F 1/1333* (2006.01)
*H04N 9/31* (2006.01)
*G03B 21/16* (2006.01)

(52) U.S. Cl.
CPC ....... *G02F 1/133385* (2013.01); *G03B 21/16* (2013.01); *H04N 9/3144* (2013.01)

(58) Field of Classification Search
CPC ................................................. G02F 1/1333
See application file for complete search history.

(56) References Cited

U.S. PATENT DOCUMENTS

| 8,083,355 | B2 | 12/2011 | Yanagisawa et al. |
| 2008/0174741 | A1 | 7/2008 | Yanagisawa et al. |
| 2019/0116343 | A1* | 4/2019 | Nakamura ........... H04N 9/3164 |
| 2019/0250454 | A1* | 8/2019 | Chauveau ......... G02F 1/133528 |
| 2021/0018821 | A1 | 1/2021 | Sugiyama |
| 2021/0026189 | A1 | 1/2021 | Fujikawa |

(Continued)

FOREIGN PATENT DOCUMENTS

| JP | 2002-107698 A | 4/2002 |
| JP | 2004-272088 A | 9/2004 |
| JP | 2007-294655 A | 11/2007 |

(Continued)

OTHER PUBLICATIONS

Feb. 2, 2023 Non-Final Office Action Issued in U.S. Appl. No. 17/706,043.

(Continued)

*Primary Examiner* — Sang V Nguyen
(74) *Attorney, Agent, or Firm* — Oliff PLC

(57) ABSTRACT

A transmissive liquid crystal panel includes a pixel region where a plurality of pixels are arrayed, a liquid crystal layer configured to modulate light for each of the pixels, an incident section configured to make the light incident on the liquid crystal layer, an emission section configured to emit, as image light, the light modulated by the liquid crystal layer, and a vapor chamber including an opening section corresponding to the pixel region, a heat receiving section around the opening section, and a heat radiating section configured to radiate heat received by heat receiving section, the vapor chamber vaporizing, with the heat received, a coolant in a liquid phase encapsulated on an inside of the vapor chamber and radiating, with the heat radiating section, heat of the coolant in a gas phase to thereby condense the coolant in the gas phase into the coolant in the liquid phase.

18 Claims, 36 Drawing Sheets

(56) References Cited

U.S. PATENT DOCUMENTS

2021/0341823 A1* 11/2021 Nishi ........................ F21V 9/32
2022/0283463 A1   9/2022 Fujikawa

FOREIGN PATENT DOCUMENTS

| JP | 2008-089722 A | 4/2008 |
| JP | 2008-197344 A | 8/2008 |
| JP | 2009-271467 A | 11/2009 |
| JP | 2018-017963 A | 2/2018 |
| JP | 2019-074695 A | 5/2019 |
| JP | 2021-018308 A | 2/2021 |
| JP | 2021-018367 A | 2/2021 |
| WO | 2005/100897 A1 | 10/2005 |

OTHER PUBLICATIONS

Apr. 24, 2023 Notice of Allowance issued in U.S. Appl. No. 17/706,043.
Jul. 13, 2023 Notice of Allowance issued in U.S. Appl. No. 17/706,041.
U.S. Appl. No. 17/706,043, filed Mar. 28, 2022 in the name of Norikazu Kadotani et al.

* cited by examiner

TRANSMISSIVE LIQUID CRYSTAL PANEL

The present application is based on, and claims priority from JP Application Serial Number 2021-123692, filed Jul. 28, 2021, the disclosure of which is hereby incorporated by reference herein in its entirety.

BACKGROUND

1. Technical Field

The present disclosure relates to a transmissive liquid crystal panel.

2. Related Art

There has been known a projector including a cooling device that cools a liquid crystal panel (see, for example, JP-A-2019-74695 (Patent Literature 1)). In the projector described in Patent Literature 1, the liquid crystal panel is housed in a frame body. A channel for a liquid coolant circulated by the cooling device is provided in the frame body. The frame body is a cooling section that cools the liquid crystal panel by transferring, to the liquid coolant, heat transferred from the liquid crystal panel. The liquid crystal panel and the frame body are housed in a first sealed housing. A heat exchanger and a blower fan are provided in the first sealed housing. The liquid coolant circulated by the cooling device flows to the heat exchanger. The heat exchanger transfers the heat of gas in the first sealed housing to the liquid coolant to thereby cool the gas in the first sealed housing. The gas in the first sealed housing is circulated in the first sealed housing by the blower fan and cools the liquid crystal panel.

The cooling device includes a pump that pressure-feeds the liquid coolant, a radiator that cools the liquid coolant, and a plurality of pipes in which the liquid coolant circulates. In a part of the plurality of pipes, couplers are provided to make it possible to replace components to which the liquid coolant is circulated by the part of the pipes.

However, in the projector described in Patent Literature 1, since the liquid coolant flows to the frame body that houses the liquid crystal panel, a pipe is provided in the frame body. When such a pipe is provided, if necessity for replacing the liquid crystal panel arises, it is necessary to detach the liquid crystal panel while preventing the liquid coolant from leaking. Therefore, replacement work for the liquid crystal panel is complicated. Such a problem also occurs when the liquid crystal panel is built in the projector.

A pump and a tank are necessary to circulate the liquid coolant that flows to the frame body. Therefore, the cooling device and the projector increase in size.

Accordingly, there have been demands for a configuration that can achieve simplification of a replacing process and an incorporating process for a liquid crystal panel and a reduction in the size of a device on which the liquid crystal panel is mounted.

SUMMARY

A transmissive liquid crystal panel according to a first aspect of the present disclosure includes: a pixel region where a plurality of pixels are arrayed; a liquid crystal layer configured to modulate light for each of the plurality of pixels; an incident section configured to make the light incident on the liquid crystal layer; an emission section configured to emit, as image light, the light modulated by the liquid crystal layer; and a vapor chamber including an opening section corresponding to the pixel region, a heat receiving section provided around the opening section, and a heat radiating section configured to radiate heat received by the heat receiving section, the vapor chamber vaporizing, with the heat received by the heat receiving section, a coolant in a liquid phase encapsulated on an inside of the vapor chamber and radiating, with the heat radiating section, heat of the coolant in a gas phase to thereby condense the coolant in the gas phase into the coolant in the liquid phase.

A transmissive liquid crystal panel according to a second aspect of the present disclosure includes: a pixel region where a plurality of pixels are arrayed; a liquid crystal layer configured to modulate light for each of the plurality of pixels; a counter substrate including a common electrode provided to correspond to the pixel region; a pixel substrate including a plurality of pixel electrodes provided to respectively correspond to the plurality of pixels, the pixel substrate carrying the liquid crystal layer between the pixel substrate and the counter substrate; a first dustproof substrate provided on a surface on an opposite side of the pixel substrate in the counter substrate; a second dustproof substrate provided on a surface on an opposite side of the counter substrate in the pixel substrate; a first vapor chamber including a first opening section corresponding to the pixel region, a first heat receiving section provided around the first opening section and coupled to at least one of the counter substrate and the first dustproof substrate in a heat transferable manner, and a first heat radiating section configured to radiate heat received by the first heat receiving section, the first vapor chamber vaporizing, with the heat received by the first heat receiving section, a first coolant in a liquid phase encapsulated on an inside of the first vapor chamber and radiating, with the first heat radiating section, heat of the first coolant in a gas phase to thereby condense the first coolant in the gas phase into the first coolant in the liquid phase; and a second vapor chamber including a second opening section corresponding to the pixel region, a second heat receiving section provided around the second opening section and coupled to at least one of the pixel substrate and the second dustproof substrate in a heat transferable manner, and a second heat radiating section configured to radiate heat received by the second heat receiving section, the second vapor chamber vaporizing, with the heat received by the second heat receiving section, a second coolant in the liquid phase encapsulated on an inside of the second vapor chamber and radiating, with the second heat radiating section, heat of the second coolant in the gas phase to thereby condense the second coolant in the gas phase into the second coolant in the liquid phase.

DESCRIPTION OF EXEMPLARY EMBODIMENTS

First Embodiment

A first embodiment of the present disclosure is explained below with reference to the drawings.

Schematic Configuration of a Projector

Figure 1:
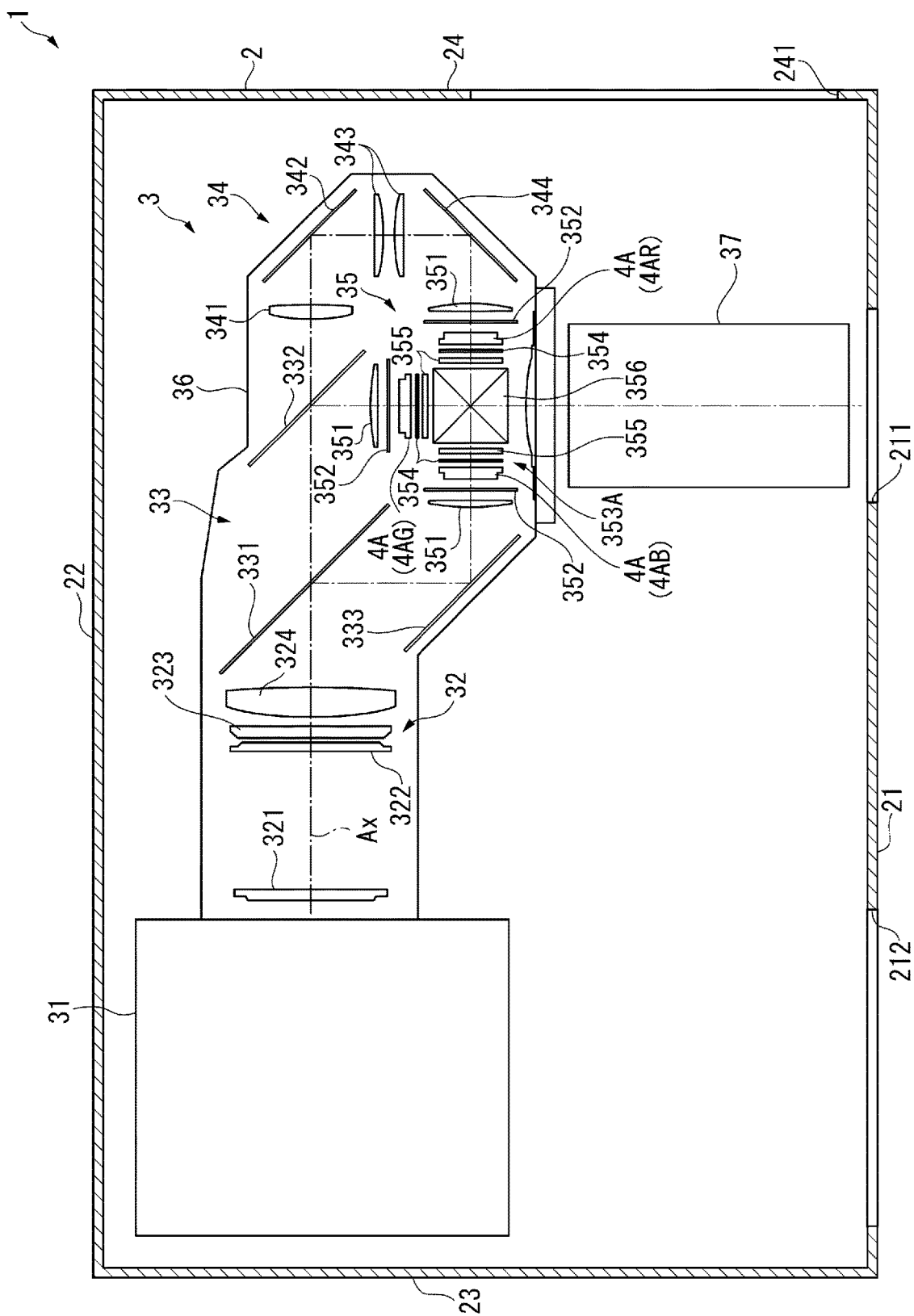
FIG. 1 is a schematic diagram showing the configuration of a projector according to a first embodiment.

FIG. 1 is a schematic diagram showing the configuration of a projector 1 according to this embodiment.

The projector 1 according to this embodiment modulates light emitted from a light source to form an image corresponding to image information and enlarges and projects the formed image onto a projection surface such as a screen. The projector 1 includes, as shown in FIG. 1, an exterior housing 2 and an image projection device 3. Besides, although not illustrated, the projector 1 includes a cooling device that cools cooling targets configuring the projector 1, a power supply device that supplies electric power to electronic components configuring the projector 1, and a control device that controls the operation of the projector 1.

Configuration of the Exterior Housing

The exterior housing 2 configures the exterior of the projector 1 and houses the image projection device 3, the cooling device, the power supply device, and the control device on the inside.

The exterior housing 2 includes a front surface section 21, a rear surface section 22, and a left side surface section 23 and a right side surface section 24 provided on the left side and the right side of the front surface section 21. Although not illustrated, the exterior housing 2 includes a top surface section that couples one end portions in the surface sections 21 to 24 and a bottom surface section that couples the other end portions in the surface sections 21 to 24. The exterior housing 2 is formed in, for example, a substantially rectangular parallelepiped shape.

The right side surface section 24 includes an air intake port 241. The air intake port 241 introduces air on the outside of the exterior housing 2 into the inside of the exterior housing 2 as a cooling gas. A filter that collects dust included in the air passing through the air intake port 241 may be provided in the air intake port 241.

The front surface section 21 includes a passage port 211 located substantially in the center in the front surface section 21. Light projected from a projection optical device 37 explained below passes through the passage port 211.

The front surface section 21 includes an exhaust port 212 located on the left side surface section 23 side in the front surface section 21. The exhaust port 212 discharges the cooling gas having cooled the cooling targets provided in the exterior housing 2 to the outside of the exterior housing 2.

Configuration of the Image Projection Device

The image projection device 3 forms an image corresponding to image information input from the control device and projects the formed image. The image projection device 3 includes a light source 31, a uniformizing section 32, a color separating section 33, a relay section 34, an image forming section 35, a housing for optical components 36, and a projection optical device 37.

The light source 31 emits illumination light to the uniformizing section 32. As the configuration of the light source 31, for example, a configuration including a solid-state light source that emits blue light, which is excitation light, and a wavelength conversion element that converts a part of the blue light emitted from the solid-state light source into fluorescent light including green light and red light can be illustrated. As other configurations of the light source 31, a configuration including a light source lamp such as an ultrahigh pressure mercury lamp as a light source can be illustrated and a configuration including solid-state light sources including semiconductor lasers or light emitting elements that individually emit the blue light, the green light, and the red light can be illustrated.

The uniformizing section 32 uniformizes light emitted from the light source 31. The uniformized light illuminates a modulation region of liquid crystal panels 4A explained below through the color separating section 33 and the relay section 34. The uniformizing section 32 includes two lens arrays 321 and 322, a polarization conversion element 323, and a superimposing lens 324.

The color separating section 33 separates light made incident from the uniformizing section 32 into color lights of red, green, and blue. The color separating section 33 includes two dichroic mirrors 331 and 332 and a reflection mirror 333 that reflects the blue light separated by the dichroic mirror 331.

The relay section 34 is provided in an optical path of the red light longer than optical paths of the other color lights and suppresses a loss of the red light. The relay section 34 includes an incident side lens 341, a relay lens 343, and reflection mirrors 342 and 344. In this embodiment, the relay section 34 is provided on the optical path of the red light. However, not only this, but, for example, color light having an optical path longer than the optical paths of the other color lights may be the blue light and the relay section 34 may be provided on the optical path of the blue light.

The image forming section 35 modulates the color lights of red, green, and blue made incident thereon, combines the modulated color lights, and forms an image. The image forming section 35 includes three field lenses 351 and three incident side polarizing plates 352 provided to correspond to the color lights made incident thereon and an image forming unit 353A.

The image forming unit 353A includes three liquid crystal panels 4A, three viewing angle compensation plates 354, three emission side polarizing plates 355, and one color combining section 356 and is obtained by integrating the liquid crystal panels 4A, the viewing angle compensation plates 354, the emission side polarizing plates 355, and the color combining section 356.

The liquid crystal panels 4A modulate, according to an image signal input from the control device, light emitted from the light source 31. Specifically, the liquid crystal panels 4A modulate, based on the input image signal, lights emitted from the incident side polarizing plates 352 and emit the modulated lights as image lights. The liquid crystal panels 4A include a liquid crystal panel 4AR that modulates the red light, a liquid crystal panel 4AG that modulates the green light, and a liquid crystal panel 4AB that modulates the blue light. The liquid crystal panels 4A are transmissive liquid crystal panels that emit modulated lights along light incident directions with respect to the liquid crystal panels 4A. Liquid crystal light valves are configured by the incident side polarizing plates 352, the liquid crystal panels 4A, and the emission side polarizing plates 355.

A detailed configuration of the liquid crystal panels 4A is explained in detail below.

The color combining section 356 combines the three color lights modulated by the liquid crystal panels 4AB, 4AG, and 4AR. Image light combined by the color combining section 356 is made incident on the projection optical device 37. In this embodiment, the color combining section 356 is configured by a cross dichroic prism having a substantially rectangular parallelepiped shape. The cross dichroic prism is, for example, a prism having a substantially rectangular parallelepiped shape obtained by sticking together four prisms having a right angled triangular prism shape. Two dielectric multilayer films crossing each other are provided on interfaces of the four prisms.

Figure 2:
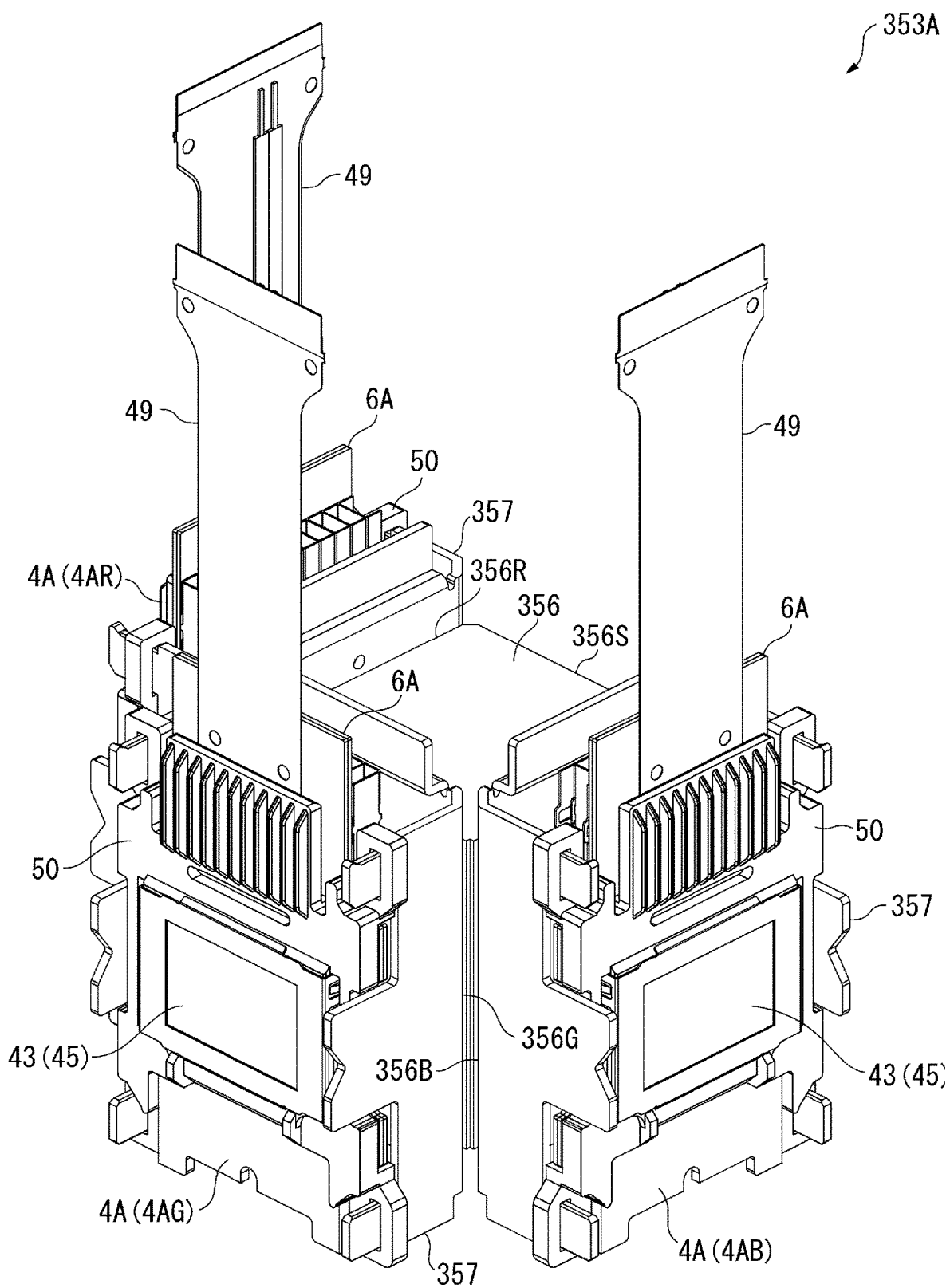
FIG. 2 is a perspective view showing an image forming unit according to the first embodiment.

FIG. 2 is a perspective view showing the image forming unit 353A.

The color combining section 356 includes, as shown in FIG. 2, three incident surfaces 356R, 356G, and 356B that are opposed to the liquid crystal panels 4AR, 4AG, and 4AB and on which the color lights having passed through the liquid crystal panels 4AR, 4AG, and 4AB are made incident and one emission surface 356S. Among the three color lights made incident on the incident surfaces 356R, 356G, and 356B, the blue light and the red light are reflected toward the projection optical device 37 by the two dielectric multilayer films and the green light passes through the two dielectric multilayer films toward the projection optical device 37. Consequently, the three color lights are combined. The combined image light is emitted from the emission surface 356S toward the projection optical device 37.

As shown in FIG. 2, the image forming unit 353A includes three holding members 357 besides the components explained above.

Each of the three holding members 357 holds the liquid crystal panel 4A and the emission side polarizing plate 355 explained below and is fixed to an incident surface corresponding thereto among the incident surfaces 356R, 356G, and 356R.

Figure 3:
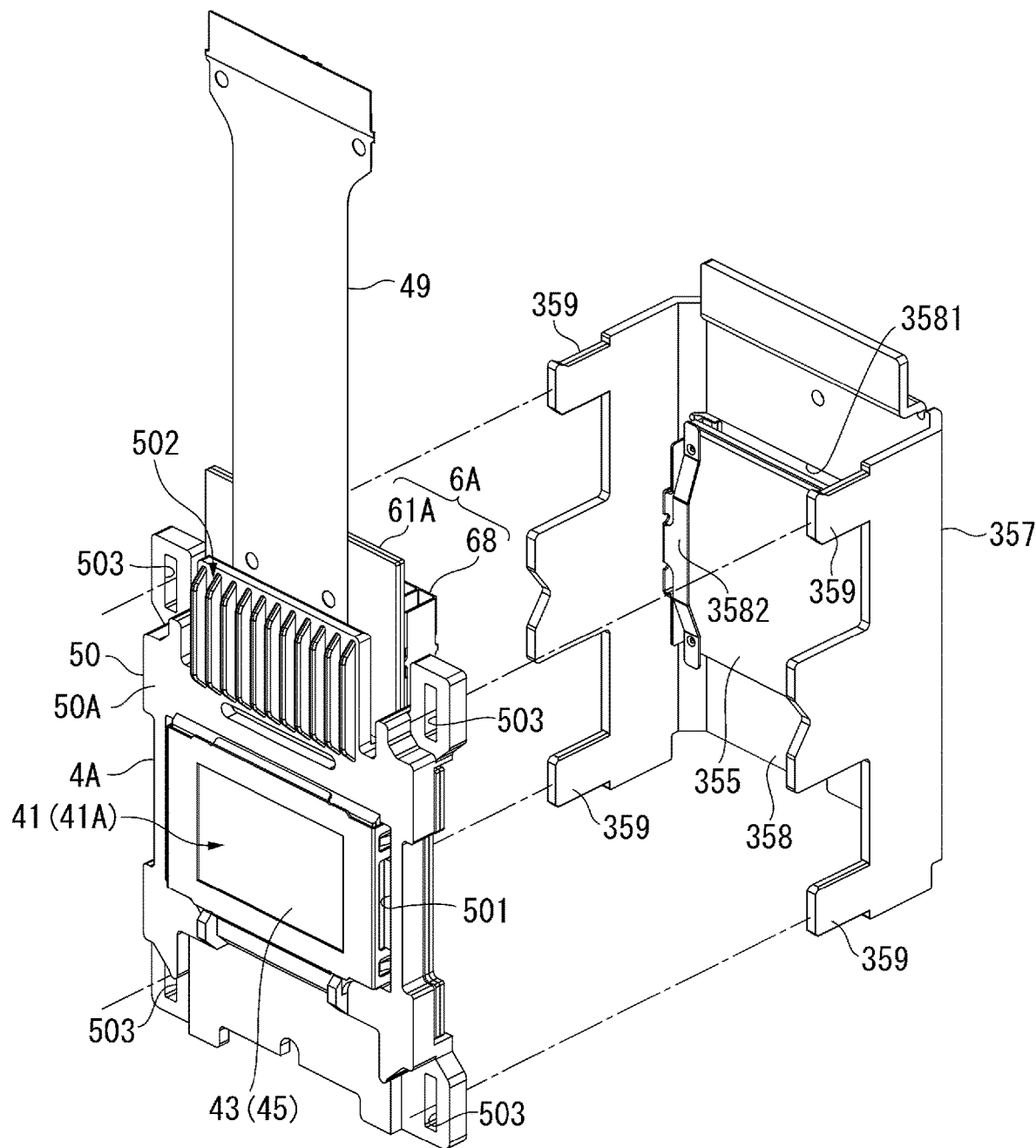
FIG. 3 is an exploded perspective view showing a liquid crystal panel and a holding member according to the first embodiment.
Figure 4:
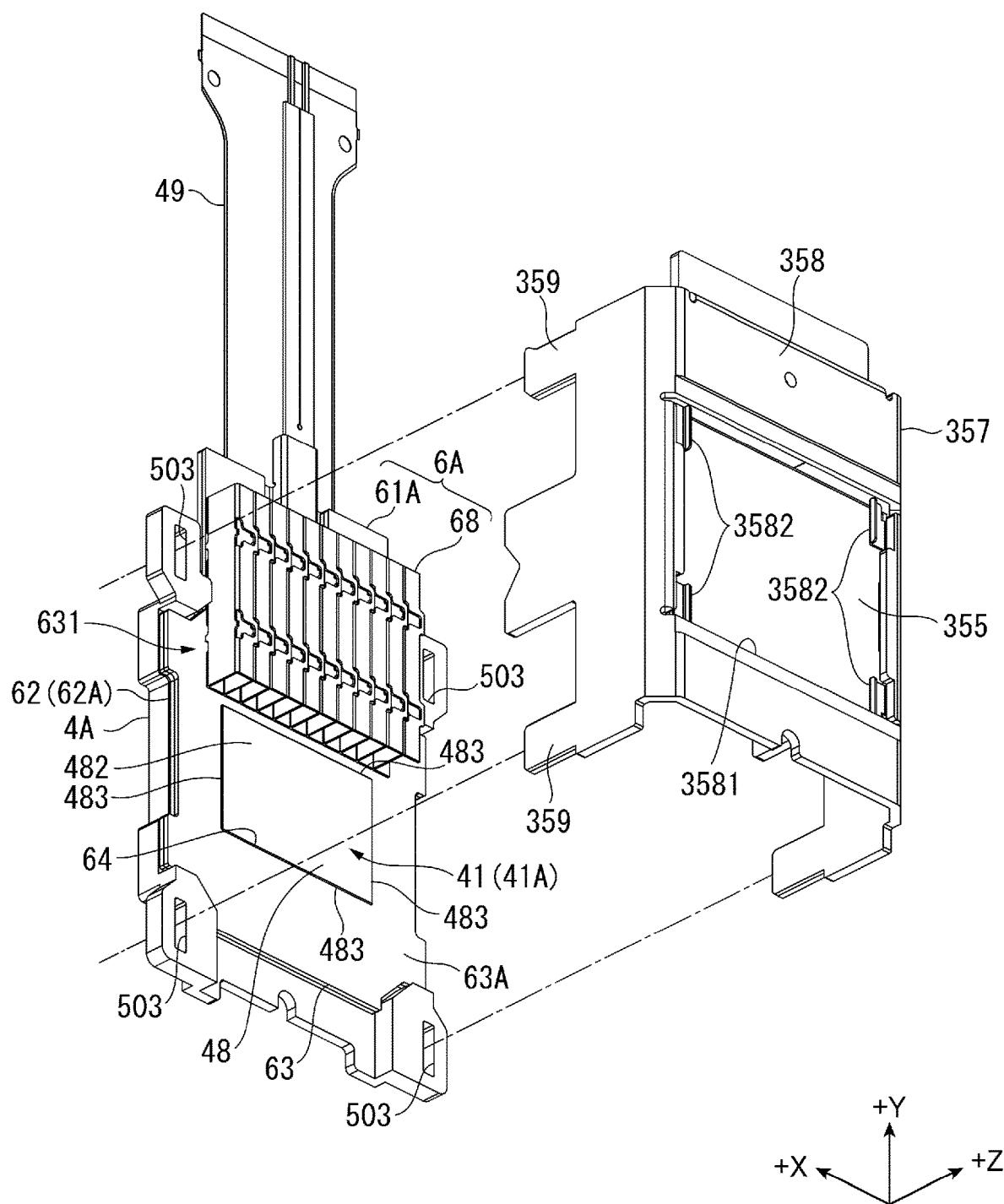
FIG. 4 is an exploded perspective view showing the liquid crystal panel and the holding member according to the first embodiment.

FIG. 3 is an exploded perspective view of the liquid crystal panel 4A and the holding member 357 viewed from a light incident side of the liquid crystal panel 4A. FIG. 4 is an exploded perspective view of the liquid crystal panel 4A and the holding member 357 viewed from a light emission side of the liquid crystal panel 4A.

As shown in FIGS. 3 and 4, the holding member 357 includes an attaching section 358 and four inserting sections 359 for protrusions.

The attaching section 358 is formed in a rectangular frame shape and attached to the corresponding incident surface by bonding or the like. The attaching section 358 includes an opening section 3581 and a holding section 3582.

The opening section 3581 is formed in a rectangular shape substantially in the center of the attaching section 358. Light having passed through the emission side polarizing plate 355 passes through the opening section 3581 toward the color combining section 356.

The holding section 3582 holds the emission side polarizing plate 355.

The four inserting sections 359 project to the liquid crystal panel 4A side from portions corresponding to four corners in the attaching section 358. The four inserting sections 359 are inserted into position adjusting sections 483 of the liquid crystal panel 4A and, thereafter, bonded and fixed to the liquid crystal panel 4A by an adhesive such as an ultraviolet curing adhesive.

The liquid crystal panel 4A is integrated with the color combining section 356 by such a holding member 357. However, the color combining section 356 may be configured by, for example, a plurality of dichroic mirrors without being limited to be configured by the cross dichroic prism having the substantially rectangular parallelepiped shape.

As shown in FIG. 1, the housing for optical components 36 houses the sections 32 to 34 and the field lenses 351 explained above on the inside. In the image projection device 3, an illumination light axis Ax, which is an optical axis in design, is set. The housing for optical components 36 holds the sections 32 to 34 and the field lenses 351 in predetermined positions on the illumination light axis Ax. The light source 31, the image forming unit 353A, and the projection optical device 37 are disposed in predetermined positions on the illumination light axis Ax.

The projection optical device 37 is a projection lens that enlarges and projects an image made incident from the image forming section 35 onto the projection surface. That is, the projection optical device 37 projects image light modulated by the liquid crystal panel 4A. As the projection optical device 37, a group lens including a plurality of lenses and a tubular lens barrel in which the plurality of lenses are housed can be illustrated.

Configuration of the Liquid Crystal Panel

As explained above, the liquid crystal panel 4A is the transmissive liquid crystal panel that modulates light made incident from the incident side polarizing plate 352 and is disposed in the position corresponding to each of the incident surfaces of the color combining section 356 by the holding member 357. The liquid crystal panel 4A includes, as shown in FIGS. 3 and 4, a panel main body 41, a wire 49 configured by a flat cable, a holding housing 50, and an emission side cooling member 6A.

In the following explanation, three directions orthogonal to one another are represented as a +X direction, a +Y direction, and a +Z direction. In this embodiment, the +Z direction is a traveling direction of light made incident on the liquid crystal panel 4A. A right direction in the case in which the liquid crystal panel 4A is viewed along the +Z direction such that the +Y direction coincides with the upward direction is the +X direction. Although not illustrated, the opposite direction of the +X direction is represented as a −X direction, the opposite direction of the +Y direction is represented as a −Y direction, and the opposite direction of the +Z direction is represented as a −Z direction. That is, the +Z direction with respect to the liquid crystal panel 4A is the light emission side with respect to the liquid crystal panel 4A and the −Z direction with respect to the liquid crystal panel 4A is the light incident side with respect to the liquid crystal panel 4A.

Configuration of the Panel Main Body

Figure 5:
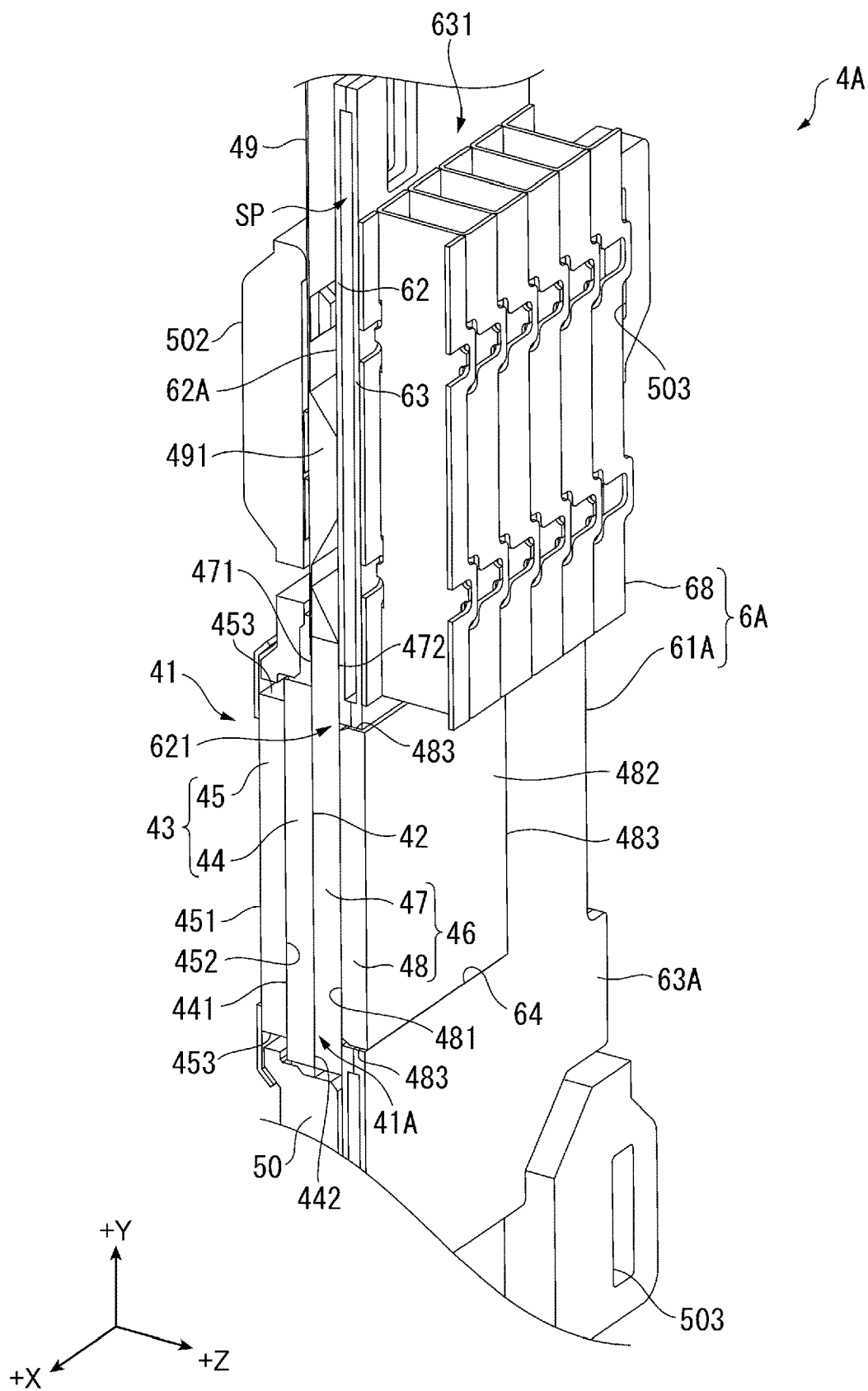
FIG. 5 is a sectional view showing the liquid crystal panel according to the first embodiment.

FIG. 5 is a sectional view showing the liquid crystal panel 4A.

The panel main body 41 modulates light made incident thereon. The panel main body 41 includes a pixel region 41A in which a plurality of pixels are arrayed. The pixel region 41A is a region where a plurality of pixels are arrayed in the liquid crystal panel 4A and light made incident thereon is modulated based on an input image signal. Each of the plurality of pixels is capable of individually modulating light.

The panel main body 41 includes, as shown in FIG. 5, a liquid crystal layer 42, an incident section 43, and an emission section 46. That is, the liquid crystal panel 4A is a transmissive liquid crystal panel including the pixel region 41A.

Configuration of the Liquid Crystal Layer

The liquid crystal layer 42 is formed by liquid crystal encapsulated between the incident section 43 and the emission section 46. Specifically, the liquid crystal layer 42 is formed by liquid crystal encapsulated between a counter substrate 44 configuring the incident section 43 and a pixel substrate 47 configuring the emission section 46.

The liquid crystal layer 42 modulates, according to an input image signal, light made incident via the incident section 43. That is, the liquid crystal layer 42 is a modulating section that modulates light made incident thereon in the pixel region 41A. The liquid crystal layer 42 configures a main portion of the pixel region 41A.

Light is made incident on the liquid crystal layer 42, whereby heat is generated by the liquid crystal layer 42. The heat generated by the liquid crystal layer 42 is transferred to the incident section 43 and the emission section 46 that sandwich the liquid crystal layer 42.

Configuration of the Incident Section

The incident section 43 is provided on the light incident side with respect to the liquid crystal layer 42 and transmits light to be made incident on the liquid crystal layer 42 to thereby make the light incident on the liquid crystal layer 42. The incident section 43 includes the counter substrate 44 that sandwiches the liquid crystal layer 42 in conjunction with the pixel substrate 47 and an incident side dustproof substrate 45 provided on the counter substrate 44.

Configuration of the Counter Substrate

The counter substrate 44 is a light transmissive incident side electrode substrate disposed on the light incident side with respect to the liquid crystal layer 42 and coupled to the liquid crystal layer 42 in a heat transferable manner. Although not illustrated, the counter substrate 44 includes a counter electrode functioning as a common electrode electrically coupled to the liquid crystal layer 42 and a supporting substrate that supports the counter electrode. The counter electrode is equivalent to the incident side electrode and configures the pixel region 41A. When viewed along a traveling direction of light made incident on the pixel region 41A, the area of the counter substrate 44 is larger than the area of the pixel region 41A. That is, when viewed from the −Z direction, the area of the counter substrate 44 is larger than the area of the pixel region 41A.

The counter substrate 44 includes a light incident surface 441 that is a surface on the light incident side and on which light is made incident and a light emission surface 442 that is a surface on the light emission side and from which light having passed through the counter substrate 44 is emitted.

The heat generated by the liquid crystal layer 42 is transferred to the counter substrate 44.

Configuration of the Incident Side Dustproof Substrate

The incident side dustproof substrate 45 is a light transmissive substrate provided in a portion corresponding to the pixel region 41A on the light incident surface 441 of the counter substrate 44. That is, when the liquid crystal panel 4A is viewed from the −Z direction, the incident side dustproof substrate 45 is provided on the light incident surface 441 in a heat transferable manner to cover the pixel region 41A.

The incident side dustproof substrate 45 prevents a situation in which dust and the like adhere to a region corresponding to the pixel region 41A on the light incident surface 441 and shadows of the dust and the like penetrate into image light. When viewed along the traveling direction of the light made incident on the pixel region 41A, the area of the incident side dustproof substrate 45 is larger than the area of the pixel region 41A. Specifically, when viewed from the −Z direction, the area of the incident side dustproof substrate 45 is larger than the area of the pixel region 41A and is smaller than the area of the counter substrate 44.

The incident side dustproof substrate 45 includes a light incident surface 451, a light emission surface 452, and a side surface 453 and is formed in a substantially rectangular parallelepiped shape.

The light incident surface 451 is a surface on the light incident side in the incident side dustproof substrate 45 and is a surface on which light emitted from the incident side polarizing plate 352 is made incident.

The light emission surface 452 is a surface on the light emission side in the incident side dustproof substrate 45 and is a surface from which light passing through the incident side dustproof substrate 45 is emitted. The light emission surface 452 is coupled to the light incident surface 441 of the counter substrate 44.

The side surface 453 is a surface that couples the light incident surface 451 and the light emission surface 452.

The heat of the liquid crystal layer 42 is transferred to the incident side dustproof substrate 45 via the counter substrate 44. That is, the incident side dustproof substrate 45 is coupled to the liquid crystal layer 42 via the counter substrate 44 in a heat transferable manner.

Configuration of the Emission Section

The emission section 46 is provided on the light emission side with respect to the liquid crystal layer 42 and emits, as image light, light modulated by the liquid crystal layer 42. The emission section 46 includes the pixel substrate 47 that sandwiches the liquid crystal layer 42 in conjunction with the counter substrate 44 and an emission side dustproof substrate 48 provided on the pixel substrate 47.

Configuration of the Pixel Substrate

The pixel substrate 47 is a light transmissive emission side electrode substrate disposed on the light emission side with respect to the liquid crystal layer 42 and coupled to the liquid crystal layer 42 in a heat transferable manner. Although not illustrated, the pixel substrate 47 includes a plurality of switching elements such as TFTs (Thin Film Transistors), a plurality of pixel electrodes electrically coupled to the liquid crystal layer 42, and a supporting substrate that supports the plurality of switching elements and the plurality of pixel electrodes.

The plurality of pixel electrodes are equivalent to the emission side electrode and configure the pixel region 41A. Specifically, each of the plurality of pixel electrodes is provided to correspond to each of the plurality of pixels arrayed in the pixel region 41A and is electrically coupled to the plurality of switching elements and portions corresponding to the plurality of pixels in the liquid crystal layer 42. In other words, the plurality of pixel electrodes define the plurality of pixels arrayed in the pixel region 41A. When viewed from an emitting direction of image light emitted from the pixel substrate 47, the area of the pixel substrate 47 is larger than the area of the pixel region 41A.

The pixel substrate 47 is a surface on the light incident side and includes a light incident surface 471 on which light modulated by the liquid crystal layer 42 is made incident and a light emission surface 472 that is disposed on the light emission side and from which light having passed through the pixel substrate 47 is emitted.

The heat generated by the liquid crystal layer 42 is transferred to the pixel substrate 47.

Configuration of the Emission Side Dustproof Substrate

The emission side dustproof substrate 48 is a light transmissive substrate provided in a portion corresponding to the pixel region 41A on the light emission surface 472 of the pixel substrate 47. That is, when the liquid crystal panel 4A is viewed from the light emission side, the emission side dustproof substrate 48 is provided on the light emission surface 472 in a heat transferable manner to cover the pixel region 41A.

The emission side dustproof substrate 48 prevents a situation in which dust and the like directly adhere to the pixel substrate 47 and shadows of the dust and the like penetrate into image light. When viewed from an emitting direction of image light emitted from the liquid crystal layer 42, the area of the emission side dustproof substrate 48 is larger than the area of the pixel region 41A. Specifically, when viewed from the +Z direction, the area of the emission side dustproof substrate 48 is larger than the area of the pixel region 41A and smaller than the area of the pixel substrate 47.

The emission side dustproof substrate 48 includes a light incident surface 481, a light emission surface 482, and a side surface 483 and is formed in a substantially rectangular parallelepiped shape.

The light incident surface 481 is a surface on the light incident side in the emission side dustproof substrate 48 and is a surface that is coupled to the light emission surface 472 of the pixel substrate 47 and on which light emitted from the light emission surface 472 is made incident.

The light emission surface 482 is a surface on the light emission side in the emission side dustproof substrate 48 and is a surface from which light having passed through the emission side dustproof substrate 48 is emitted.

The side surface 483 is a surface that couples the light incident surface 481 and the light emission surface 482.

The heat of the liquid crystal layer 42 is transferred to the emission side dustproof substrate 48 via the pixel substrate 47. That is, the emission side dustproof substrate 48 is coupled to the liquid crystal layer 42 via the pixel substrate 47 in a heat transferable manner.

Configuration of the Wire

The wire 49 applies an applied voltage corresponding to an image signal between the plurality of pixel electrodes provided on the pixel substrate 47 and the counter electrode of the counter substrate 44 in a region corresponding to the plurality of pixels in the liquid crystal layer 42. That is, the wire 49 supplies an image signal for driving the liquid crystal layer 42.

The wire 49 is electrically coupled to the pixel substrate 47. Specifically, the wire 49 extends in the +Y direction from each of the counter substrate 44 and the pixel substrate 47 and is coupled to a not-shown control device. In this embodiment, the wire 49 is configured by an FPC (Flexible Printed Circuit).

A driver circuit 491 that controls the operation of the panel main body 41 according to an image signal input from the control device is provided on a surface in the +Z direction in the wire 49. The driver circuit 491 is thermally coupled to a first member 62 of the emission side cooling member 6A.

Configuration of the Holding Housing

The holding housing 50 covers the panel main body 41, the counter substrate 44, and a part of the wire 49 in the −Z direction. The holding housing 50 is combined with the emission side cooling member 6A to thereby hold the panel main body 41 on the inside. That is, the holding housing 50 is separate from the emission side cooling member 6A explained below. As shown in FIG. 3, the holding housing 50 includes an opening section 501 and heat radiation fins 502. Besides, as shown in FIGS. 3 and 4, the holding housing 50 includes four position adjusting sections 503.

As shown in FIG. 3, the opening section 501 is provided in a substantially rectangular shape to correspond to the pixel region 41A when viewed from the −Z direction. The opening section 501 allows light emitted from the incident side polarizing plate 352 to pass and makes the light incident on the incident side dustproof substrate 45.

A plurality of heat radiation fins 502 are provided to project in the −Z direction from portions in the +Y direction with respect to the opening section 501. The heat radiation fins 502 radiate heat transferred from the incident section 43 to the holding housing 50.

As shown in FIGS. 3 and 4, the four position adjusting sections 503 are provided at four corners of the holding housing 50 when viewed from the −Z direction. The position adjusting sections 503 are hole sections into which inserting sections 359 corresponding thereto are inserted from the +Z direction. The position of the holding housing 50 with respect to the incident surfaces of the color combining section 356 to which the holding member 357 is attached and the position of the liquid crystal panel 4A are adjusted according to an insertion amount of the inserting sections 359 into the position adjusting sections 503. After the position of the liquid crystal panel 4A is adjusted, as explained above, the inserting sections 359 and the position adjusting sections 503 are fixed by an adhesive.

Configuration of the Emission Side Cooling Member

The emission side cooling member 6A is disposed on the opposite side of the counter substrate 44 with respect to the pixel substrate 47 and thermally coupled to the pixel substrate 47. As shown in FIG. 5, the emission side cooling member 6A includes a hollow encapsulating space SP in which a coolant is encapsulated. The emission side cooling member 6A vaporizes the coolant in a liquid phase with heat transferred from a heat generating body to thereby consume the heat transferred from the heat generating body and cool the heat generating body.

In this embodiment, the emission side cooling member 6A vaporizes the coolant in the liquid phase into the coolant in a gas phase with the heat of the liquid crystal layer 42 transferred via the pixel substrate 47 and the emission side dustproof substrate 48 to thereby cool the liquid crystal layer 42. That is, the emission side cooling member 6A cools the liquid crystal layer 42 with the vaporization of the coolant in the liquid phase.

The emission side cooling member 6A includes a main body section 61A and a first heat radiating member 68.

Configuration of the Main Body Section

Figure 6:
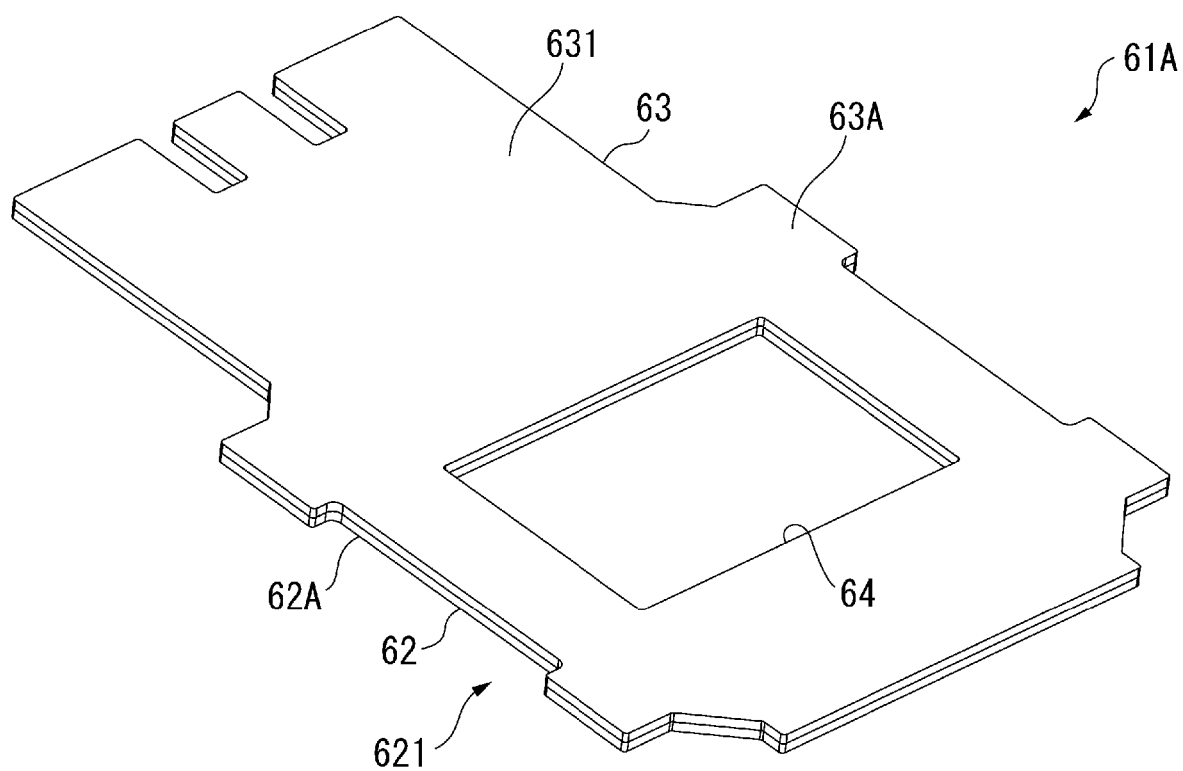
FIG. 6 is a perspective view showing a main body section of an emission side cooling member according to the first embodiment.

FIG. 6 is a perspective view showing the main body section 61A. Specifically, FIG. 6 is a perspective view of the main body section 61A viewed from a second member 63 side.

As shown in FIG. 6, the main body section 61A includes the first member 62 and the second member 63 and is configured by combining the first member 62 and the second member 63. In this embodiment, the main body section 61A is a vapor chamber. The encapsulating space SP (see FIG. 5) is formed on the inside of the main body section 61A by combining the first member 62 and the second member 63. The coolant is encapsulated in the encapsulating space SP. The main body section 61A extends further to the outer side than the pixel substrate 47 and the emission side dustproof substrate 48 when viewed from an emission side of light emitted from the liquid crystal layer 42 (the +Z direction).

The first member 62 is a substrate formed in a flat shape and can be referred to as first substrate as well. The first member 62 is a coupling portion coupled to the heat generating body in the main body section 61A and is configured to be capable of coming into contact with the coolant in the liquid phase encapsulated in the encapsulating space SP. In the first member 62, a portion to which heat is transferred from the outside changes the coolant in the liquid phase in the encapsulating space SP into the coolant in a gas phase. That is, the first member 62 vaporizes the coolant in the liquid phase with the transferred heat. A first surface 62A on the opposite side of the second member 63 in the first member 62 is a surface that is in contact with the heat generating body. In this embodiment, the first surface 62A is a flat surface.

The first member 62 includes a heat receiving section 621 that receives the heat of the heat generating body. That is, the main body section 61A, which is the vapor chamber according to this embodiment, includes the heat receiving section 621. The heat receiving section 621 is explained in detail below.

The second member 63 is a substrate formed in a flat shape and can be referred to as second substrate as well. The second member 63 is joined to the first member 62 to form the encapsulating space SP in conjunction with the first member 62. The second member 63 is configured to be capable of coming into contact with the coolant in the gas phase in the encapsulating space SP.

The second member 63 includes a second surface 63A and a first heat radiating section 631.

The second surface 63A is a surface on the opposite side of the first member 62 in the second member 63.

The first heat radiating section 631 receives heat from the coolant in the gas phase in the encapsulating space SP, condenses the coolant in the gas phase into the coolant in the liquid phase, and radiates the received heat to the outside. That is, the first heat radiating section 631 can be referred to as first condensing section as well. The position of the first heat radiating section 631 is explained in detail below.

Such a second member 63 is disposed on the opposite side of the liquid crystal layer 42 with respect to the first member 62 in the liquid crystal panel 4A.

The main body section 61A includes an opening section 64.

The opening section 64 is a substantially rectangular opening section provided to correspond to the pixel region 41A in the main body section 61A. The opening section 64 pierces through the main body section 61A along a direction in which the first member 62 and the second member 63 are opposed to each other (the +Z direction). Light passing through the liquid crystal panel 4A passes through the opening section 64. That is, the opening section 64 is a through-hole having an inner circumferential surface.

The inner circumferential surface of the opening section 64 is formed by a joining portion of the first member 62 and the second member 63. Accordingly, heat transferred to the inner edge of the opening section 64 is transferred to the first member 62.

The main body section 61A extends from the opening section 64 in the +Y direction. Specifically, the main body section 61A extends from the opening section 64 in an extending direction of the wire 49 from the pixel substrate 47 coupled to the liquid crystal layer 42 (the +Y direction). In other words, the main body section 61A extends from the opening section 64 in an extending direction of the wire 49 from the liquid crystal layer 42 (the +Y direction).

Configuration of the Heat Receiving Section

The heat receiving section 621 is a portion that receives the heat of the heat generating body in the main body section 61A. Accordingly, in this embodiment, a part of the heat receiving section 621 is provided around the opening section 64 in the first member 62. In this embodiment, the main body section 61A is provided such that the first member 62 is in contact with the pixel substrate 47 and the emission-side dustproof substrate 48. Therefore, the heat receiving section 621 is a portion around the opening section 64 and is a portion that is in contact with the pixel substrate 47 and the emission side dustproof substrate 48 in the first member 62. In other words, the main body section 61A includes the heat receiving section 621 that is provided around the opening section 64 in the first member 62 and receives heat from the light emission surface 472 of the pixel substrate 47, which is a heat generating body, and the side surface 483 of the emission side dustproof substrate 48, which is a heat generating body.

Although not illustrated, a portion corresponding to the heat receiving section 621 on the inner surface of the encapsulating space SP can be referred to as vaporizing section that vaporizes the coolant in the liquid phase with the heat received by the heat receiving section 621.

Specifically, in a portion coming into contact with the coolant in the liquid phase on the inner surface of the encapsulating space SP, a portion that receives transfer of the heat received by the heat receiving section 621 and vaporizes the coolant in the liquid phase with the heat is the vaporizing section.

Configuration of the First Heat Radiating Section

The first heat radiating section 631 is a portion that radiates the heat of the coolant in the gas phase flowing in the encapsulating space SP in the main body section 61A.

Although not illustrated, a portion corresponding to the first heat radiating section 631 on the inner surface of the encapsulating space SP can be referred to as a first condensing section that receives heat from the coolant in the gas phase and condenses the coolant in the gas phase into the coolant in the liquid phase. Specifically, in a portion coming into contact with the coolant in the gas phase on the inner surface of the encapsulating space SP, a portion that receives the heat of the coolant in the gas phase and condenses the coolant in the gas phase into the coolant in the liquid phase is the first condensing section. The heat received from the coolant in the gas phase by such a first condensing section is radiated by the first heat radiating section 631.

The first heat radiating section 631 is provided in the extending direction of the wire 49 from the liquid crystal layer 42 with respect to the opening section 64. The first heat radiating member 68 (see FIG. 5) is provided in a position corresponding to the first heat radiating section 631 on the second surface 63A. Since the first heat radiating member 68 is provided in the first heat radiating section 631, the first heat radiating section 631 is a portion that easily radiates the heat received from the coolant in the gas phase to the outside of the main body section 61A in the second member 63. Accordingly, in the emission side cooling member 6A, a portion where the first heat radiating member 68 is provided is configured as the first heat radiating section 631.

Configuration of the First Heat Radiating Member

Figure 7:
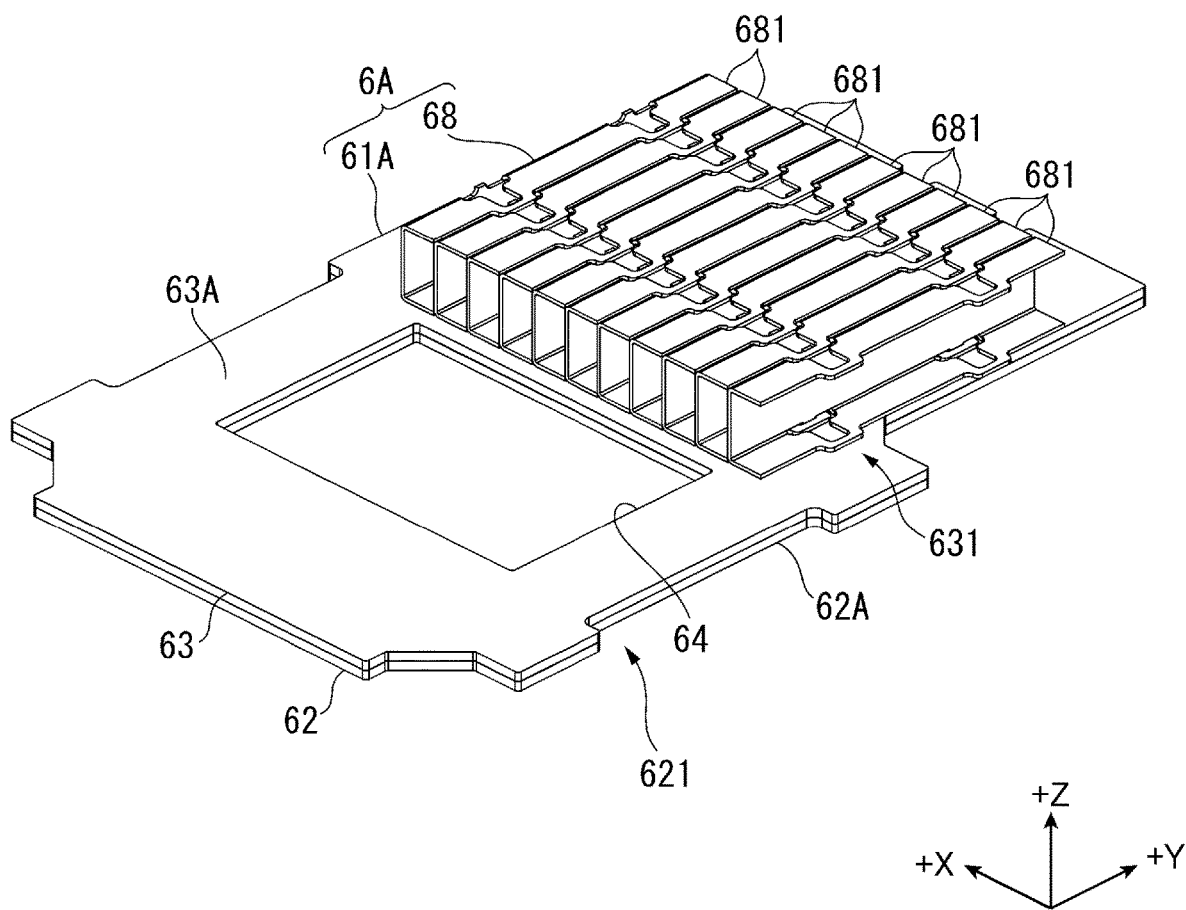
FIG. 7 is a perspective view showing a first heat radiating member attached to the main body section according to the first embodiment.

FIG. 7 is a perspective view showing the first heat radiating member 68 attached to the main body section 61A.

The first heat radiating member 68 radiates heat transferred from the first heat radiating section 631. As shown in FIG. 7, the first heat radiating member 68 includes a plurality of fins 681.

The plurality of fins 681 are formed in a square cylinder shape and disposed side by side in the +X direction. The plurality of fins 681 include, on the insides, channels in which a cooling gas is capable of flowing along the +Y direction. A part of the cooling gas flowing to the liquid crystal panel 4A flows in the +Y direction along the second surface 63A and flows along the channels provided on the insides of the fins 681. Heat is transferred from the fins 681 to the cooling gas flowing in the channels.

The shape of the fin 681 may be another shape. For example, the fin 681 may be a pin projecting to the opposite side of the first member 62. In this case, the shape of the pin may be one of a columnar shape, a prism shape, a truncated cone shape, and a truncated pyramid shape.

Figure 8:
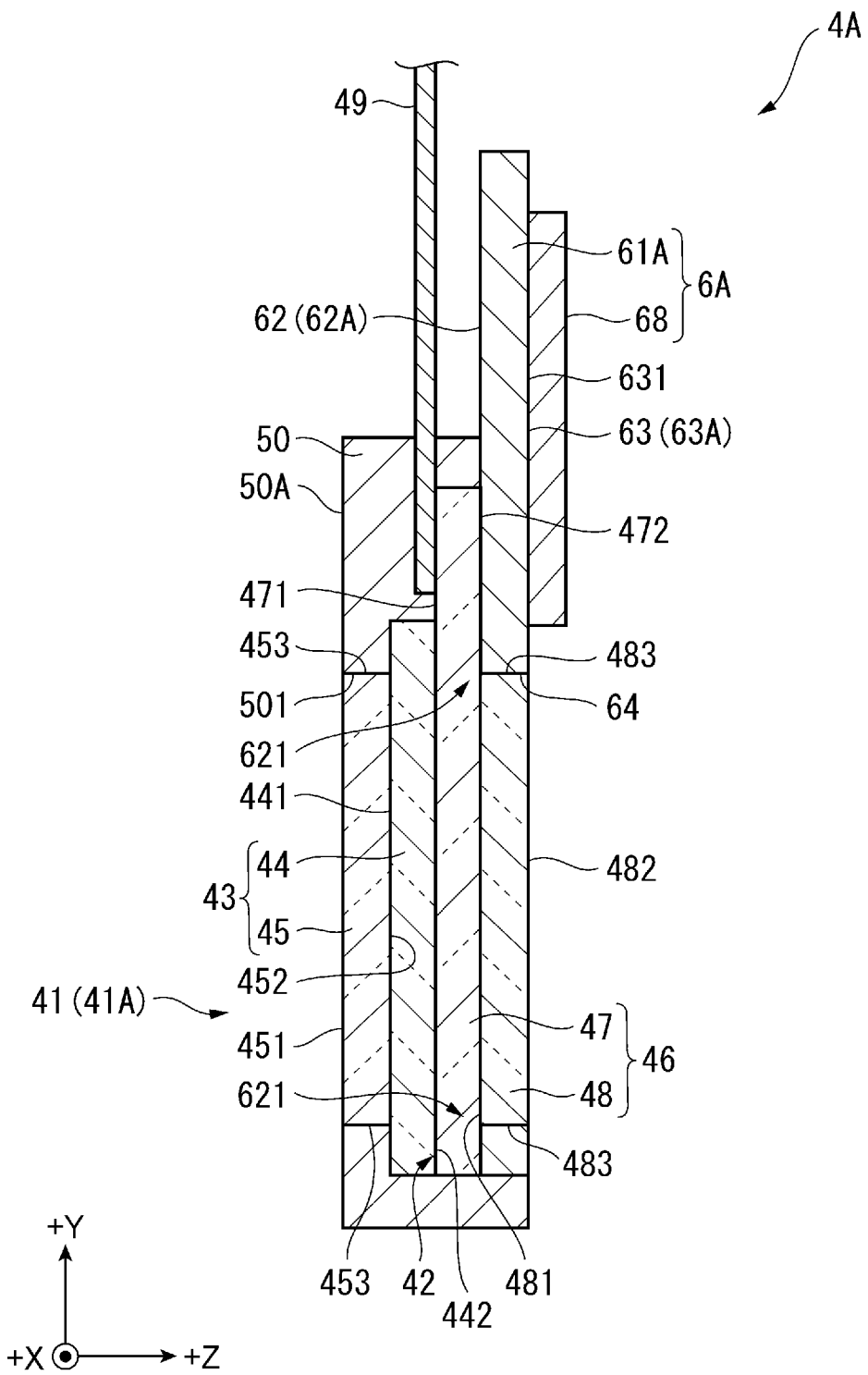
FIG. 8 is a schematic diagram showing a cross section of the liquid crystal panel according to the first embodiment.

Disposition of the Emission Side Cooling Member with Respect to the Panel Main Body FIG. 8 is a diagram schematically showing a cross section along a YZ plane of the liquid crystal panel 4A.

As shown in FIG. 8, the emission side cooling member 6A is provided on the light emission side with respect to the liquid crystal layer 42. Specifically, the emission side cooling member 6A is provided on the light emission surface 472 of the pixel substrate 47. That is, the first surface 62A of the first member 62 is coupled to the light emission surface 472 of the pixel substrate 47 in a heat transferable manner. In this embodiment, the pixel substrate 47 is equivalent to the emission side substrate.

The emission side dustproof substrate 48 is disposed in the opening section 64. The side surface 483 of the emission side dustproof substrate 48 is coupled to the inner circumferential surface of the opening section 64 via a thermally conductive adhesive in a heat transferable manner. That is, the inner circumferential surface of the opening section 64 is a part of the heat receiving section 621.

Transfer Route of Heat Generated by the Liquid Crystal Layer

A part of the heat generated by the liquid crystal layer 42 is transferred to the counter substrate 44 and the other heat is transferred to the pixel substrate 47. The heat transferred to the counter substrate 44 is transferred to the incident side dustproof substrate 45 and the holding housing 50 and radiated.

A part of the heat transferred to the pixel substrate 47 is transferred to the heat receiving section 621. Another part of the heat is transferred to the heat receiving section 621 via the emission side dustproof substrate 48. More specifically, in the emission side cooling member 6A shown in FIG. 8, the heat transferred from the liquid crystal layer 42 to the pixel substrate 47 is transferred to the heat receiving section 621 that is in contact with the light emission surface 472 of the pixel substrate 47. On the other hand, the heat transferred to the emission side dustproof substrate 48 is transferred to the inner circumferential surface of the opening section 64 coupled to the side surface 483 of the emission side dustproof substrate 48 in a heat transferable manner.

The first member 62 including the heat receiving section 621 vaporizes the coolant in the liquid phase in the encapsulating space SP with the transferred heat of the liquid crystal layer 42 to thereby consume the heat of the liquid crystal layer 42 transferred to the first member 62. Consequently, the pixel substrate 47 and the emission side dustproof substrate 48 are cooled and the liquid crystal layer 42 is cooled.

The coolant in the gas phase flowing in the encapsulating space SP and reaching the first condensing section is condensed into the coolant in the liquid phase by the first condensing section. Heat received from the coolant in the gas phase by the first condensing section is transferred from the first heat radiating section 631 to the first heat radiating member 68 and radiated by the first heat radiating member 68.

Flow of the Cooling Gas Flowing to the Liquid Crystal Panel

The cooling gas circulated by a fan of the cooling device disposed in the exterior housing 2 flows in the +Y direction with respect to the liquid crystal panel 4A. Specifically, the cooling gas flowing to the liquid crystal panel 4A is divided, at the end portion in the −Y direction in the liquid crystal panel 4A, into the cooling gas flowing in a space on the light incident side with respect to the liquid crystal panel 4A and the cooling gas flowing in a space on the light emission side with respect to the liquid crystal panel 4A.

The cooling gas flowing in the space on the light incident side with respect to the liquid crystal panel 4A flows in the +Y direction and cools the incident side dustproof substrate 45 and the holding housing 50 in order. That is, the heat of the liquid crystal layer 42 transferred to the incident side dustproof substrate 45 and the holding housing 50 is transferred to the cooling gas. A part of the heat of electronic components such as the driver circuit 491 provided in the wire 49 is transferred to the holding housing 50. Since the cooling gas flowing in the space on the light emission side with respect to the liquid crystal panel 4A flows to the heat radiation fins 502 of the holding housing 50, a part of the heat of the electronic components is transferred to the cooling gas by the heat radiation fins 502. Consequently, the electronic components are also cooled.

The cooling gas flowing in the space on the light emission side with respect to the liquid crystal panel 4A flows in the +Y direction and cools the emission side dustproof substrate 48 and the first heat radiating member 68 in order. That is, the heat of the liquid crystal layer 42 transferred to the emission side dustproof substrate 48 and the first heat radiating member 68 is transferred to the cooling gas.

In this way, the cooling gas flows to the incident side dustproof substrate 45, the holding housing 50, the emission side dustproof substrate 48, and the first heat radiating member 68 to which the heat of the liquid crystal layer 42 is transferred, whereby the heat of the liquid crystal layer 42 is transferred to the cooling gas and the liquid crystal layer 42 is cooled. In this embodiment, since the driver circuit 491 is thermally coupled to the first member 62 of the emission side cooling member 6A, a part of the heat of the driver circuit 491 is transferred to the first member 62 and, thereafter, transferred to the first heat radiating member 68 by the first heat radiating section 631 of the second member 63 and transferred to the cooling gas flowing to the first heat radiating member 68. Consequently, the driver circuit 491 is cooled.

In the liquid crystal panel 4A, the first heat radiating section 631 is provided further in the +Y direction than a coupling portion to the pixel substrate 47 and a coupling portion to the emission side dustproof substrate 48 in the first member 62. In other words, the first heat radiating section 631 is provided in the +Y direction with respect to the opening section 64.

For this reason, the first condensing section that condenses the coolant in the gas phase into the coolant in the liquid phase is provided in the +Y direction with respect to the opening section 64.

Accordingly, when the liquid crystal panel 4A is disposed such that the +Y direction is the vertical direction upper side, the coolant in the liquid phase condensed by the first condensing section can be transported to, by not only the capillarity but also the gravity, the vaporizing section that receives transfer of the heat received by the heat receiving section 621 and vaporizes the coolant in the liquid phase with the heat. Consequently, the change from the coolant in the liquid phase to the coolant in the gas phase in the vaporizing section can be accelerated by the heat transferred from the liquid crystal layer 42 via the pixel substrate 47 and the emission side dustproof substrate 48. That is, it is possible to improve heat radiation efficiency of the heat of the liquid crystal layer 42 and cooling efficiency of the liquid crystal layer 42.

Effects of the First Embodiment

The projector 1 according to this embodiment explained above achieves the following effects.

The projector 1 includes the liquid crystal panel 4A functioning as a light modulation device that modulates light emitted from the light source. The liquid crystal panel 4A is a transmissive liquid crystal panel that emits modulated light along a traveling direction of light made incident on the liquid crystal panel.

The liquid crystal panel 4A includes the pixel region 41A, the liquid crystal layer 42, the incident section 43, the emission section 46, and the main body section 61A. The plurality of pixels are arrayed in the pixel region 41A. The liquid crystal layer 42 modulates light for each of the plurality of pixels. The incident section 43 makes the light incident on the liquid crystal layer 42. The emission section 46 emits, as image light, the light modulated by the liquid crystal layer 42. The main body section 61A is the vapor chamber configuring the emission side cooling member 6A. The main body section 61A includes the opening section 64, the heat receiving section 621, and the first heat radiating section 631. The opening section 64 is provided in the main body section 61A to correspond to the pixel region 41A. The heat receiving section 621 is provided around the opening section 64. The first heat radiating section 631 is equivalent to the heat radiating section and radiates heat received by the heat receiving section 621. The main body section 61A vaporizes, with the heat received by the heat receiving section 621, the coolant in the liquid phase encapsulated in the encapsulating space SP provided on the inside of the main body section 61A and radiates the heat of the coolant in the gas phase with the first heat radiating section 631 to thereby condense the coolant in the gas phase into the coolant in the liquid phase.

In the vapor chamber, a pipe for circulating the coolant and a wire for supplying driving power are unnecessary. With the configuration explained above, compared with when a cooling device in which the coolant flows is provided and when a thermoelectric conversion element such as a Peltier element for moving heat with electric power is provided, it is possible to simplify the configuration of the liquid crystal panel 4A. Therefore, it is possible to achieve a reduction in the size of the projector 1 functioning as the device on which the liquid crystal panel 4A is mounted. Since it is possible to attach and detach the liquid crystal panel 4A to and from the projector 1 without attaching and detaching the pipe and the wire, it is possible to easily carry out replacement of the liquid crystal panel 4A. Further, since the heat receiving section 621 provided around the opening section 64 corresponding to the pixel region 41A receives heat, it is possible to improve uniformity of the temperature in the pixel region 41A.

In the liquid crystal panel 4A, the emission section 46 includes the pixel substrate 47 that is coupled to the liquid crystal layer 42 in a heat transferable manner and through which image light passes. The pixel substrate 47 is the light transmissive emission side substrate. When viewed from the emitting direction of the image light emitted from the liquid crystal layer 42, the area of the pixel substrate 47 is larger than the area of the pixel region 41A. The main body section 61A, which is the vapor chamber, is provided on the pixel substrate 47 in a heat transferable manner.

With such a configuration, since the main body section 61A is provided, in a heat transferable manner, on the pixel substrate 47 coupled to the liquid crystal layer 42 in a heat transferable manner, the heat receiving section 821 easily receives the heat of the liquid crystal layer 42 via the pixel substrate 47. Therefore, it is possible to easily cool the liquid crystal layer 42.

In the liquid crystal panel 4A, the emission section 46 includes the pixel substrate 47. The pixel substrate 47 includes the emission side electrode electrically coupled to the liquid crystal layer 42. The pixel substrate 47 is the light transmissive emission side electrode substrate disposed on the light emission side with respect to the liquid crystal layer 42. The emission side substrate on which the main body section 61A of the emission side cooling member 6A is provided is the pixel substrate 47.

With such a configuration, since the pixel substrate 47 is the light transmissive substrate directly coupled to the liquid crystal layer 42 susceptible to heat, the heat receiving section 621 is coupled to the pixel substrate 47, whereby the heat generated by the liquid crystal layer 42 can be efficiently transferred to the heat receiving section 621. Therefore, it is possible to improve the cooling efficiency of the liquid crystal layer 42.

In the liquid crystal panel 4A, the emission section 46 includes the emission side dustproof substrate 48 provided on the light emission surface 472 of the pixel substrate 47. The light emission surface 472 is equivalent to the surface on the light emission side in the pixel substrate 47. The emission side dustproof substrate 48 includes the light incident surface 481, the light emission surface 482, and the side surface 483. The side surface 483 couples the light incident surface 481 and the light emission surface 482. The light incident surface 481 is equivalent to the surface on the light incident side in the emission side dustproof substrate 48. The light emission surface 482 is equivalent to the surface on the light emission side in the emission side dustproof substrate 48. The heat receiving section 621 receives heat from the light emission surface 472 in the pixel substrate 47 and the side surface 483 in the emission side dustproof substrate 48.

With such a configuration, since the heat receiving section 621 is coupled to each of the pixel substrate 47 and the emission side dustproof substrate 48, the heat of the liquid crystal layer 42 can be transferred to the heat receiving section 621 via each of the pixel substrate 47 and the emission side dustproof substrate 48. Therefore, since the heat of the liquid crystal layer 42 can be efficiently transferred to the heat receiving section 621, it is possible to improve the cooling efficiency of the liquid crystal layer 42.

In the liquid crystal panel 4A, the pixel substrate 47 includes, as the emission side electrode, the plurality of pixel electrodes provided to respectively correspond to the plurality of pixels. The pixel substrate 47 is the emission side electrode substrate disposed on the light emission side with respect to the liquid crystal layer 42.

In a general transmissive liquid crystal panel, a counter substrate is disposed on a light incident side with respect to a liquid crystal layer and a pixel substrate is disposed on a light emission side with respect to the liquid crystal layer.

Accordingly, since the emission side electrode substrate is the pixel substrate 47, by providing the main body section 61A having the configuration explained above in the general transmissive liquid crystal panel, it is possible to configure the liquid crystal panel 4A that can achieve the effects explained above. Therefore, it is possible to simply configure the liquid crystal panel 4A.

The liquid crystal panel 4A includes the wire 49 that supplies an image signal for driving the liquid crystal layer 42. The main body section 61A, which is the vapor chamber, extends from the opening section 64 in the extending direction of the wire 49 from the liquid crystal layer 42.

With such a configuration, compared with when the main body section 61A extends from the opening section 64 in the −Y direction, which is the opposite direction of the extending direction of the wire 49, it is possible to prevent an increase in the size of the liquid crystal panel 4A.

In the liquid crystal panel 4A, the emission side cooling member 6A includes the first heat radiating member 68 that is provided in the main body section 61A, which is the vapor chamber, and emits heat transferred from the first heat radiating section 631.

The first heat radiating member 68 is equivalent to the heat radiating member. The first heat radiating member 68 is provided, with respect to the opening section 64, in the +Y direction in which the main body section 61A extends from the opening section 64.

With such a configuration, it is possible to separate the pixel substrate 47 and the emission side dustproof substrate 48, which are the heat generating bodies coupled to the heat receiving section 621, and the first heat radiating member 68. Consequently, it is possible to prevent the heat transferred to the first heat radiating member 68 from affecting the pixel substrate 47 and the emission side dustproof substrate 48.

First Modification of the First Embodiment

In the liquid crystal panel 4A, the side surface 483 of the emission side dustproof substrate 48 is coupled to the inner circumferential surface of the opening section 64, which is a part of the heat receiving section 621, via a thermally conductive adhesive in a heat transferable manner. However, not only this, but the side surface 483 and the inner circumferential surface of the opening section 64 may not be coupled in a heat transferable manner. The side surface 483 and the inner circumferential surface of the opening section 64 may be coupled by a heat transfer member such as a leaf spring in a heat transferable manner. Besides, the entire side surface 483 is not always coupled to the inner circumferential surface of the opening section 64 in a heat transferable manner. A part of the side surface 483 may be coupled to the inner circumferential surface of the opening section 64 in a heat transferable manner.

Second Modification of the First Embodiment

In the liquid crystal panel 4A, the heat receiving section 621 of the emission side cooling member 6A is directly coupled to the light emission surface 472 of the pixel substrate 47 and coupled to the side surface 483 of the emission side dustproof substrate 48 via the thermally conductive adhesive or the like in a heat transferable manner. However, not only this, but the heat receiving section 621 may be directly coupled to the emission side dustproof substrate 48 and may not be directly coupled to the pixel substrate 47. For example, a heat transfer member capable of transferring heat from the pixel substrate 47 to the heat receiving section 621 may be provided between the pixel substrate 47 and the heat receiving section 621.

Figure 9:
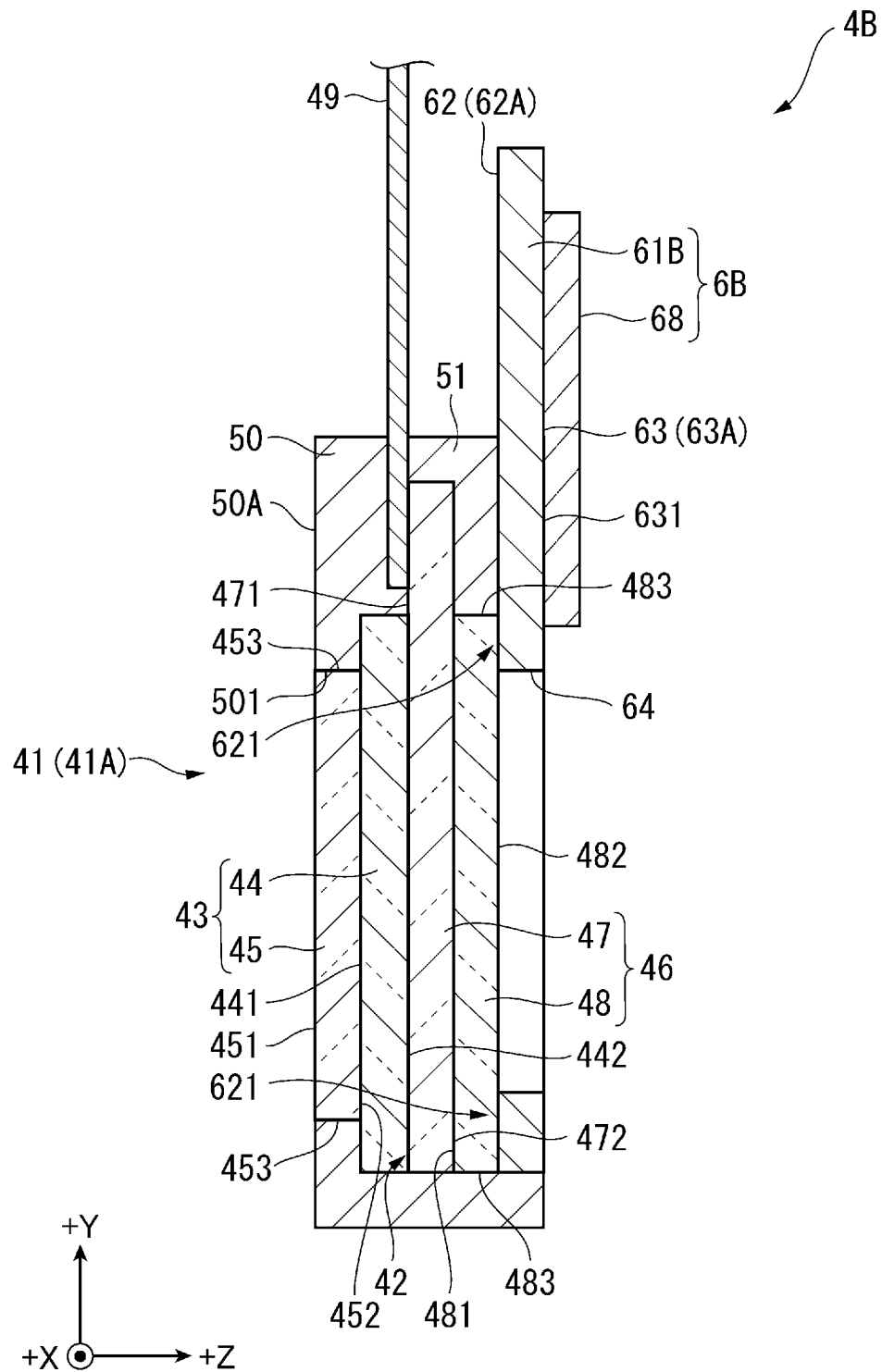
FIG. 9 is a schematic diagram showing a cross section of a modification of the liquid crystal panel according to the first embodiment.

FIG. 9 is a diagram schematically showing a cross section along a YZ plane of a liquid crystal panel 4B, which is a modification of the liquid crystal panel 4A.

For example, the liquid crystal panel 4B shown in FIG. 9 may be adopted instead of the liquid crystal panel 4A.

The liquid crystal panel 4B includes the same components and the same functions as the components and the functions of the liquid crystal panel 4A except that the liquid crystal panel 4B includes an emission side cooling member 6B and a clamping member 51 instead of the emission side cooling member 6A. That is, the liquid crystal panel 4B includes the panel main body 41, the wire 49, the holding housing 50, the clamping member 51, and the emission side cooling member 6B.

The clamping member 51 is combined with the holding housing 50 and clamps the panel main body 41 in the +Z direction in conjunction with the holding housing 50. That is, the clamping member 51 is disposed on the light emission side with respect to the liquid crystal layer 42. Specifically, a part of the clamping member 51 is disposed between the pixel substrate 47 and the heat receiving section 621. The clamping member 51 is formed by, for example, metal having satisfactory thermal conductivity.

The emission side cooling member 6B includes the same components and the same functions as the components and the functions of the emission side cooling member 6A except that the emission side cooling member 6B includes a main body section 61B instead of the main body section 61A. That is, the emission side cooling member 6B includes the main body section 61B and the first heat radiating member 68.

The main body section 61B includes the first member 62, the second member 63, and the opening section 64. The first member 62 includes the first surface 62A and the heat receiving section 621. The second member 63 includes the second surface 63A and the first heat radiating section 631.

In the emission side cooling member 6B, the first surface 62A of the first member 62 is not directly coupled to the pixel substrate 47 and is coupled to the pixel substrate 47 via the clamping member 51 in a heat transferable manner. The first surface 62A is coupled to the light emission surface 482 of the emission side dustproof substrate 48. That is, in the liquid crystal panel 4B, when viewed from a traveling direction of light made incident on the liquid crystal layer 42 (the +Z direction), the area of the emission side dustproof substrate 48 is larger than the area of the opening section 64 of the emission side cooling member 6B. Accordingly, the emission side dustproof substrate 48 is not disposed on the inner side of the opening section 64 and the main body section 61B is provided on the emission side dustproof substrate 48.

Heat transferred to the emission side dustproof substrate 48 is transferred to the first member 62 on the first surface 62A.

That is, the heat receiving section 621 of the main body section 61B is a portion coupled to the light emission surface 482 of the emission side dustproof substrate 48 in the first member 62 and is a portion coupled to the pixel substrate 47 via the clamping member 51 in a heat transferable manner.

In a heat quantity generated by the liquid crystal layer 42, a heat quantity transferred to the emission side dustproof substrate 48 via the pixel substrate 47 is larger than a heat quantity transferred to the clamping member 51 via the pixel substrate 47. Therefore, the heat receiving section 621 may not be coupled to the clamping member 51 in a heat transferable manner.

Effects of the Second Modification of the First Embodiment

Such a liquid crystal panel 4B achieves the following effects besides achieving the same effects as the effects of the liquid crystal panel 4A explained above.

In the liquid crystal panel 4B, the emission section 46 includes the pixel substrate 47 that includes the plurality of pixel electrodes electrically coupled to the liquid crystal layer 42 and is disposed on the light emission side with respect to the liquid crystal layer 42 and the emission side dustproof substrate 48 provided on the light emission surface 472 in the pixel substrate 47. The emission side substrate on which the main body section 61B of the emission side cooling member 6B is provided is the emission side dustproof substrate 48. The pixel substrate 47 is equivalent to the light transmissive emission side electrode substrate and the plurality of pixel electrodes are equivalent to the emission side electrode.

With such a configuration, the main body section 61B, which is the vapor chamber, is provided, in a heat transferable manner, on the emission side dustproof substrate 48 provided further on the light emission side than the pixel substrate 47. Therefore, compared with when the main body section 61B is provided on the pixel substrate 47 to avoid the emission side dustproof substrate 48, the main body section 61B can be easily coupled to the emission section 46.

Since heat generated by the liquid crystal layer 42 is transferred to the emission side dustproof substrate 48 via the pixel substrate 47, the heat of the liquid crystal layer 42 diffuses. In contrast, since the first member 62 of the main body section 61B is coupled to the light emission surface 482 of the emission side dustproof substrate 48, it is possible to make it easy to transfer the heat of the liquid crystal layer 42 to the heat receiving section 621 in the first member 62.

In the liquid crystal panel 4B, the main body section 61B, which is the vapor chamber, is provided on the light emission surface 482 of the emission side dustproof substrate 48. The light emission surface 482 is equivalent to the surface on the light emission side of the emission side dustproof substrate 48.

With such a configuration, for example, compared with when the emission side dustproof substrate 48 is disposed in the opening section 64 corresponding to the pixel region 41A, even when tolerance occurs in the main body section 61B, which is the vapor chamber, the main body section 61B can be easily attached to the emission section 46.

Third Modification of the First Embodiment

In the liquid crystal panel 4A, the heat receiving section 621 of the emission side cooling member 6A is coupled to the light emission surface 472 of the pixel substrate 47 and the side surface 483 of the emission side dustproof substrate 48 in a heat transferable manner. In the liquid crystal panel 4B, the heat receiving section 621 is coupled to the light emission surface 482 of the emission side dustproof substrate 48. However, the coupling portions to the pixel substrate 47 and the emission side dustproof substrate 48 in the heat receiving section 621 are not limited to the above.

Figure 10:
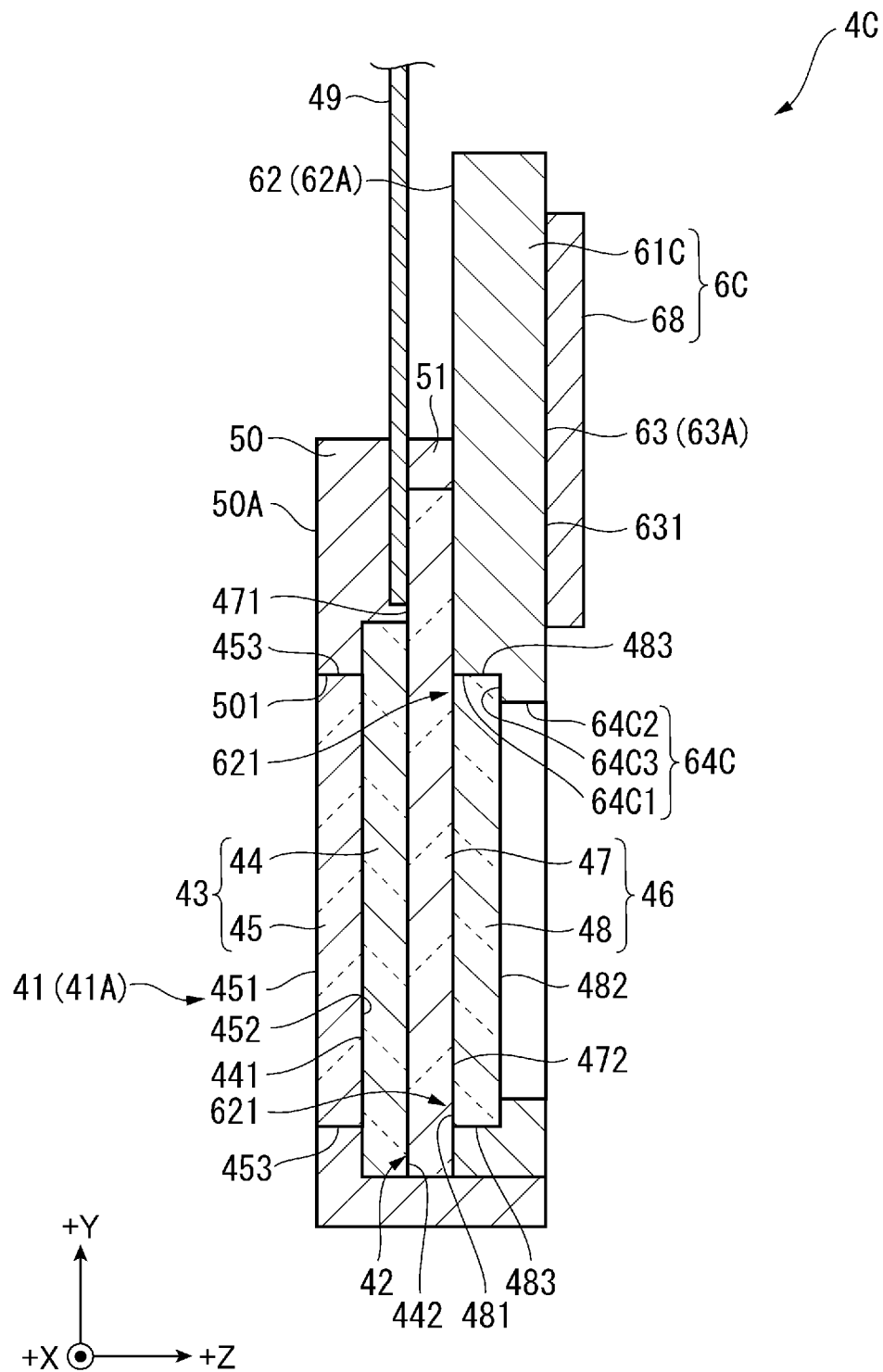
FIG. 10 is a schematic diagram showing a cross section of a modification of the liquid crystal panel according to the first embodiment.

FIG. 10 is a diagram schematically showing a cross section along a YZ plane of a liquid crystal panel 4C, which is a modification of the liquid crystal panel 4A.

For example, the liquid crystal panel 4C shown in FIG. 10 may be adopted instead of the liquid crystal panel 4A.

The liquid crystal panel 4C includes the same components and the same functions as the components and the functions of the liquid crystal panel 4A except that the liquid crystal panel 4C includes the clamping member 51 and an emission side cooling member 6C instead of the emission side cooling member 6A. That is, the liquid crystal panel 4C includes the panel main body 41, the wire 49, the holding housing 50, the clamping member 51, and the emission side cooling member 6C.

Like the emission side cooling member 6A, the emission side cooling member 6C vaporizes the coolant in the liquid phase into the coolant in the gas phase with heat transferred from the pixel substrate 47 and the emission side dustproof substrate 48 and radiates heat received from the coolant in the gas phase to the outside. The emission side cooling member 6C includes the same components and the same functions as the components and the functions of the emission side cooling member 6A except that the emission side cooling member 6C includes a main body section 61C instead of the main body section 61A. That is, the emission side cooling member 6C includes the main body section 61C and the first heat radiating member 68.

Like the main body section 61A, the main body section 61C includes the first member 62 and the second member 63 and is configured by combining the first member 62 and the second member 63. The main body section 61C is provided in the pixel substrate 47 such that the first surface 62A of the first member 62 is in contact with the light emission surface 472 of the pixel substrate 47. That is, a part of the heat receiving section 621 of the main body section 61C is coupled to the pixel substrate 47 in a heat transferable manner.

The main body section 61C includes an opening section 64C.

The opening section 64C is a two tier hole including a first opening section 64C1 provided on the light incident side (in the −Z direction) and a second opening section 64C2 provided on the light emission side (in the +Z direction).

The inner diameter of the first opening section 64C1 is larger than the inner diameter of the second opening section 64C2. The emission side dustproof substrate 48 is disposed on the inside of the first opening section 64C1. The side surface 483 of the emission side dustproof substrate 48 is coupled to the inner circumferential surface of the first opening section 64C1 via a thermally conductive adhesive or the like in a heat transferable manner.

A coupling section 64C3 coupling the inner circumferential surface of the first opening section 64C1 and the inner circumferential surface of the second opening section 64C2 is substantially parallel to a surface orthogonal to a traveling direction of light passing through the emission side dustproof substrate 48 (the +Z direction). A part of the light emission surface 482 is coupled to the coupling section 64C3 in a heat transferable manner. In other words, the main body section 61C includes a step section formed by the first opening section 64C1, the coupling section 64C3, and the second opening section 64C2. The inner circumferential surface of the first opening section 64C1 is equivalent to the inner circumferential surface of the step section. The coupling section 64C3 is equivalent to the bottom surface of the step section.

In the main body section 61C, the coupling portions to the pixel substrate 47 and the emission side dustproof substrate 48 are the heat receiving section 621. Accordingly, the inner circumferential surface of the first opening section 64C1 and the coupling section 64C3 are parts of the heat receiving section 621.

Effects of the Third Modification of the First Embodiment

Such a liquid crystal panel 4C achieves the following effects besides achieving the same effects as the effects of the liquid crystal panels 4A and 4B explained above.

In the liquid crystal panel 4C, the emission side dustproof substrate 48 includes the side surface 483 that couples the light incident surface 481 and the light emission surface 482. The light incident surface 481 is equivalent to the surface on the light incident side in the emission side dustproof substrate 48. The light emission surface 482 is equivalent to the surface on the light emission side in the emission side dustproof substrate 48.

The inner circumferential surface of the first opening section 64C1 of the main body section 61C is coupled to at least a part of the side surface 483 in the emission side dustproof substrate 48 in a heat transferable manner. The coupling section 64C3 of the main body section 61C is coupled to the light emission surface 482 of the emission side dustproof substrate 48 in a heat transferable manner. That is, the inner circumferential surface of the first opening section 64C1 and the coupling section 64C3 are parts of the heat receiving section 621.

With such a configuration, the heat of the liquid crystal layer 42 transferred to the emission side dustproof substrate 48 can be received by the inner circumferential surface of the first opening section 64C1 and the coupling section 64C3. Accordingly, compared with when a main body section, which is a vapor chamber, is provided on the light emission surface 482 in the emission side dustproof substrate 48, it is possible to prevent the dimension of the liquid crystal panel 4C in a light passing direction (the +Z direction) from increasing.

In the liquid crystal panel 4C, the heat receiving section 621 is coupled to the pixel substrate 47 in a heat transferable manner.

With such a configuration, not only heat is transferred to the heat receiving section 621 from the side surface 483 of the emission side dustproof substrate 48 but also heat is transferred to the heat receiving section 621 from the pixel substrate 47. Accordingly, it is possible to make it easy to transfer the heat of the liquid crystal layer 42 to the heat receiving section 621. Therefore, it is possible to improve the cooling efficiency of the liquid crystal layer 42.

In the liquid crystal panel 4C, the first member 62 including the heat receiving section 621 and the pixel substrate 47 may not be coupled in a heat transferable manner. In this case, the main body section 61C may be fixed to the emission side dustproof substrate 48.

Second Embodiment

A second embodiment of the present disclosure is explained.

A projector according to this embodiment has the same configuration as the configuration of the projector 1 according to the first embodiment but is different in the position of a first heat radiating member in an emission side cooling member configuring a liquid crystal panel. In the following explanation, the same or substantially the same portions as the portions explained above are denoted by the same reference numerals and signs and explanation of the portions is omitted.

Figure 11:
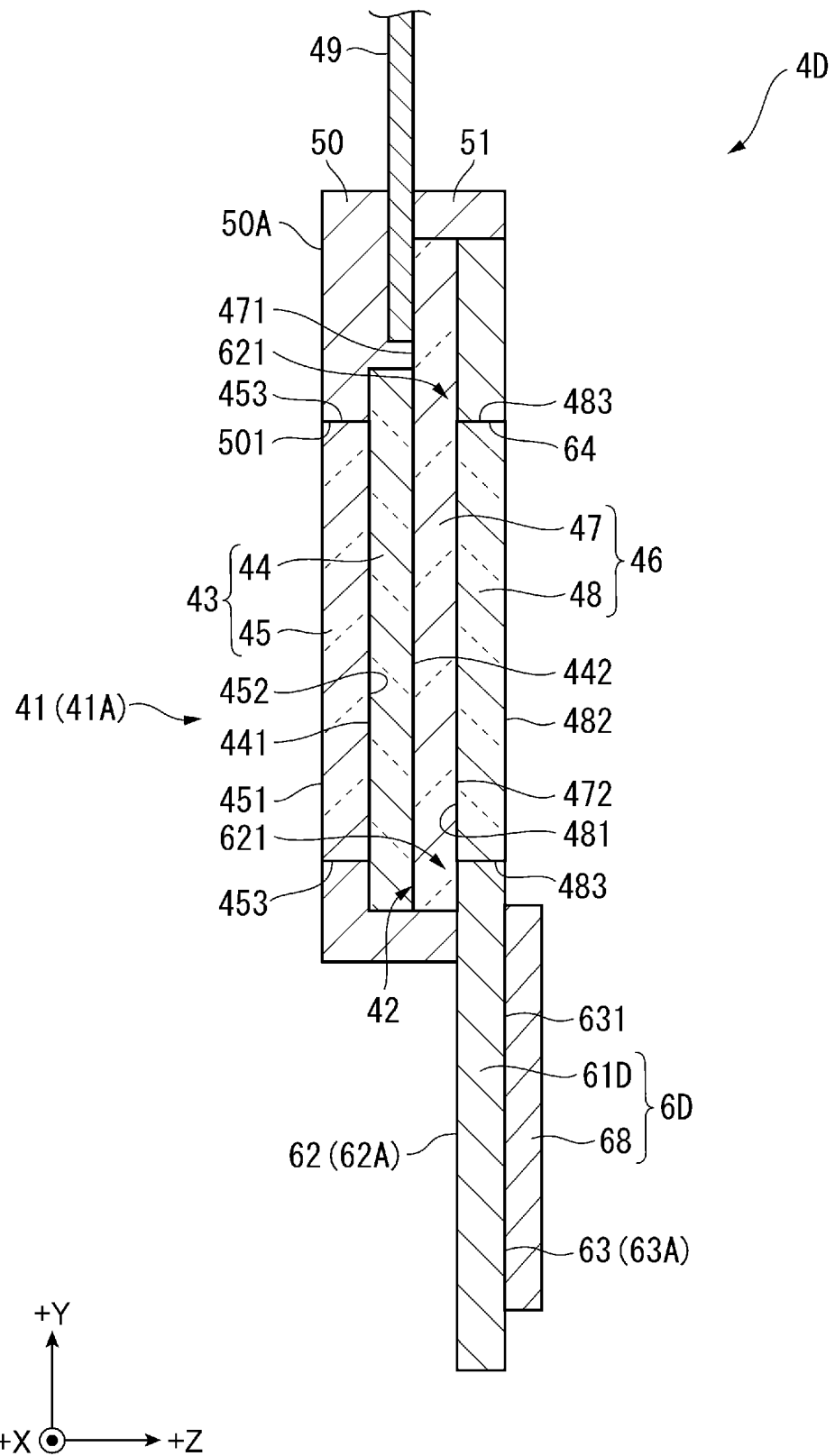
FIG. 11 is a schematic diagram showing a cross section of a liquid crystal panel included in a projector according to a second embodiment.

FIG. 11 is a diagram schematically showing a cross section along a YZ plane of a liquid crystal panel 4D included in the projector according to this embodiment.

The projector according to this embodiment includes the same components and the same functions as the components and the functions of the projector 1 according to the first embodiment except that the projector according to this embodiment includes the liquid crystal panel 4D shown in FIG. 11 instead of the liquid crystal panel 4A according to the first embodiment. The liquid crystal panel 4D includes the same components and the same functions as the components and the functions of the liquid crystal panel 4A except that the liquid crystal panel 4D includes an emission side cooling member 6D instead of the emission side cooling member 6A.

The emission side cooling member 6D includes the same components and the same functions as the components and the functions of the emission side cooling member 6A according to the first embodiment except that the emission side cooling member 6D includes a main body section 61D instead of the main body section 61A according to the first embodiment. That is, the emission side cooling member 6D includes the main body section 61D and the first heat radiating member 68.

The main body section 61D includes the first member 62 and the second member 63 and is configured by combining the first member 62 and the second member 63 in the +Z direction.

The main body section 61D includes the opening section 64. The main body section 61D extends from the opening section 64 in the −Y direction, which is the opposite direction of an extending direction of the wire 49 from the liquid crystal layer 42. Accordingly, in the second member 63 of the main body section 61D, the first heat radiating section 631 is disposed in the −Y direction with respect to the opening section 64. The first heat radiating member 68 is provided in a position corresponding to the first heat radiating section 631 on the second surface 63A of the second member 63.

The emission side dustproof substrate 48 is disposed on the inside of the opening section 64. The inner circumferential surface of the opening section 64 and the side surface 483 of the emission side dustproof substrate 48 are coupled by a thermally conductive adhesive or the like in a heat transferable manner. That is, in the main body section 61D, the heat receiving section 621 is coupled to the light emission surface 472 of the pixel substrate 47 and is coupled to the side surface 483 of the emission side dustproof substrate 48 in a heat transferable manner.

Flow of a Cooling Gas Flowing to the Liquid Crystal Panel

A cooling gas circulated by a fan of a cooling device disposed in the exterior housing 2 flows in the +Y direction with respect to the liquid crystal panel 4D. Although not illustrated, like the cooling gas flowing to the liquid crystal panel 4A, the cooling gas flowing to the liquid crystal panel 4D is divided, at the end portion in the −Y direction in the liquid crystal panel 4D, the cooling gas flowing in a space on a light incident side with respect to the liquid crystal panel 4D and the cooling gas flowing in a space on a light emission side with respect to the liquid crystal panel 4D.

The cooling gas flowing in the space on the light incident side with respect to the liquid crystal panel 4D flows in the +Y direction and cools the incident side dustproof substrate 45 and, thereafter, cools the holding housing 50.

The cooling gas flowing in the space on the light emission side with respect to the liquid crystal panel 4D flows in the +Y direction and cools the first heat radiating member 68 and, thereafter, cools the emission side dustproof substrate 48.

In this way, in the liquid crystal panel 4D, the cooling gas flows to the incident side dustproof substrate 45, the emission side dustproof substrate 48, the holding housing 50, and the emission side cooling member 6D. Consequently, the heat of the liquid crystal layer 42 is transferred to the cooling gas, the liquid crystal layer 42 is cooled, and the driver circuit 491 is cooled.

In the liquid crystal panel 4D, the first heat radiating section 631 and the first heat radiating member 68 are provided in the −Y direction with respect to the opening section 64. Accordingly, when the liquid crystal panel 4D is disposed such that the −Y direction is the vertical direction upper side, a coolant in a liquid phase condensed by the first condensing section corresponding to the first heat radiating section 631 can be transported to, by not only the capillarity but also the gravity, vaporizing sections corresponding to a coupling portion to the pixel substrate 47 and a coupling portion to the emission side dustproof substrate 48 in the heat receiving section 621.

Consequently, the change from the coolant in the liquid phase to the coolant in a gas phase in the vaporizing sections can be accelerated by the heat transferred from the liquid crystal layer 42 via the pixel substrate 47 and the emission side dustproof substrate 48. That is, it is possible to improve heat radiation efficiency of the heat of the liquid crystal layer 42 and cooling efficiency of the liquid crystal layer 42.

Effects of the Second Embodiment

The projector according to this embodiment explained above achieves the following effects besides achieving the same effects as the effects of the projector 1 according to the first embodiment. That is, the liquid crystal panel 4D according to this embodiment achieves the following effects besides achieving the same effects as the effects of the liquid crystal panel 4A according to the first embodiment.

The liquid crystal panel 4D includes the wire 49 that supplies an image signal to the liquid crystal layer 42. The main body section 61D, which is a vapor chamber, extends from the opening section 64 in the −Y direction, which is the opposite direction of the extending direction of the wire 49 from the liquid crystal layer 42.

With such a configuration, since it is possible to prevent the wire 49 and the main body section 61D from interfering with each other, it is possible to prevent the heat radiation by the main body section 61D from being hindered by the wire 49.

First Modification of the Second Embodiment

In the liquid crystal panel 4D, the side surface 483 of the emission side dustproof substrate 48 is coupled to the inner circumferential surface of the opening section 64, which is a part of the heat receiving section 621, via the thermally conducive adhesive in a heat transferable manner. However, not only this, but the side surface 483 and the inner circumferential surface of the opening section 64 may not be coupled in a heat transferable manner. The side surface 483 and the inner circumferential surface of the opening section 64 may be coupled by a heat transfer member such as a leaf spring in a heat transferable manner. Besides, the entire side surface 483 is not always coupled to the inner circumferential surface of the opening section 64 in a heat transferable manner. A part of the side surface 483 may be coupled to the inner circumferential surface of the opening section 64 in a heat transferable manner.

Second Modification of the Second Embodiment

In the liquid crystal panel 4D, the heat receiving section 621 is directly coupled to the light emission surface 472 of the pixel substrate 47 and is coupled to the side surface 483 of the emission side dustproof substrate 48 via the thermally conductive adhesive or the like in a heat transferable manner. However, not only this, but the heat receiving section 621 may be directly coupled to the emission side dustproof substrate 48 and may not be directly coupled to the pixel substrate 47. For example, a heat transfer member capable of transferring heat from the pixel substrate 47 to the heat receiving section 621 may be provided between the pixel substrate 47 and the heat receiving section 621.

Figure 12:
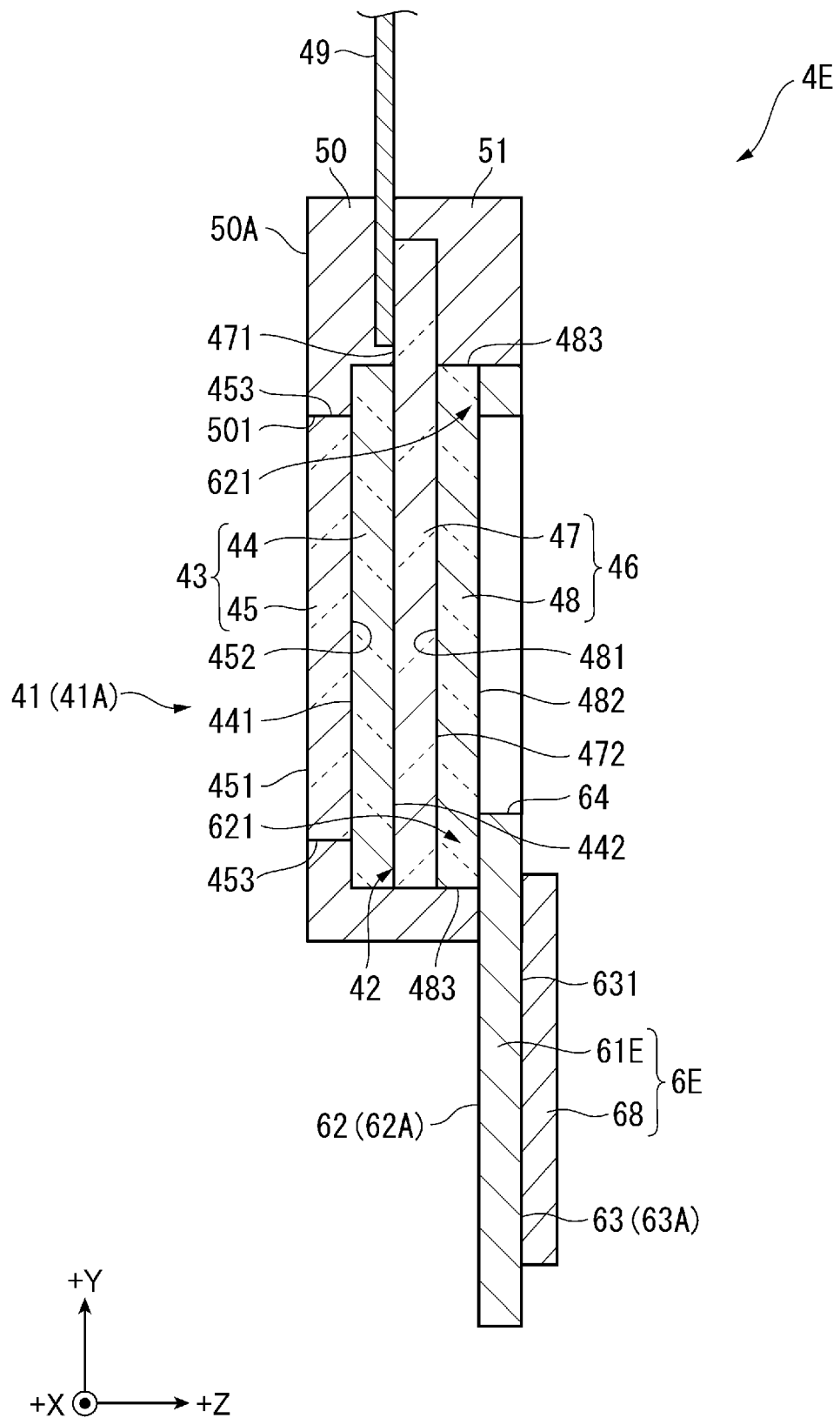
FIG. 12 is a schematic diagram showing a cross section of a modification of the liquid crystal panel according to the second embodiment.

FIG. 12 is a diagram schematically showing a cross section along a YZ plane of a liquid crystal panel 4E, which is a modification of the liquid crystal panel 4D.

For example, the liquid crystal panel 4E shown in FIG. 12 may be adopted instead of the liquid crystal panel 4D.

The liquid crystal panel 4E includes the same components and the same functions as the components and the functions of the liquid crystal panel 4D except that the liquid crystal panel 4E includes an emission side cooling member 6E and the clamping member 51 instead of the emission side cooling member 6D. That is, the liquid crystal panel 4E includes the panel main body 41, the wire 49, the holding housing 50, the clamping member 51, and the emission side cooling member 6E.

The emission side cooling member 6E includes the same components and the same functions as the components and the functions of the emission side cooling member 6D except that the emission side cooling member 6E includes a main body section 61E instead of the main body section 61D. That is, the emission side cooling member 6E includes the main body section 61E and the first heat radiating member 68.

The main body section 61E includes the first member 62 and the second member 63 and is configured by combining the first member 62 and the second member 63. The main body section 61E includes the opening section 64, the first member 62 includes the first surface 62A and the heat receiving section 621, and the second member 63 includes the second surface 63A and the first heat radiating section 631. Like the main body section 61D, the main body section 61E extends from the opening section 64 in the −Y direction, which is the opposite direction of the extending direction of the wire 49.

In the emission side cooling member 6E, the first surface 62A of the first member 62 is not directly coupled to the pixel substrate 47 and is coupled to the pixel substrate 47 via the clamping member 51 in a heat transferable manner. The main body section 61E is provided on the emission side dustproof substrate 48. The first surface 62A is coupled to the light emission surface 482 of the emission side dustproof substrate 48. That is, the emission side cooling member 6E is provided on the emission side dustproof substrate 48 such that a circumferential portion of the opening section 64 on the first surface 62A is coupled to the light emission surface 482. In other words, a part of the heat receiving section 621 provided around the opening section 64 is coupled to the light emission surface 482 of the emission side dustproof substrate 48 in a heat transferable manner. Another part of the heat receiving section 621 is coupled to the pixel substrate 47 via the clamping member 51 in a heat transferable manner.

In a heat quantity generated by the liquid crystal layer 42, a heat quantity transferred to the emission side dustproof substrate 48 via the pixel substrate 47 is larger than a heat quantity transferred to the clamping member 51 via the pixel substrate 47. Accordingly, the heat receiving section 621 may not be coupled to the clamping member 51 in a heat transferable manner.

Such a liquid crystal panel 4E achieves the same effects as the effects of the liquid crystal panels 4B and 4D explained above.

Third Modification of the Second Embodiment

In the liquid crystal panel 4D, the heat receiving section 621 of the emission side cooling member 6D is coupled to the light emission surface 472 of the pixel substrate 47 and the side surface 483 of the emission side dustproof substrate 48 in a heat transferable manner. In the liquid crystal panel 4E, the heat receiving section 621 is directly coupled to the light emission surface 482 of the emission side dustproof substrate 48. However, the coupling portions to the pixel substrate 47 and the emission side dustproof substrate 48 in the heat receiving section 621 are not limited to the above.

Figure 13:
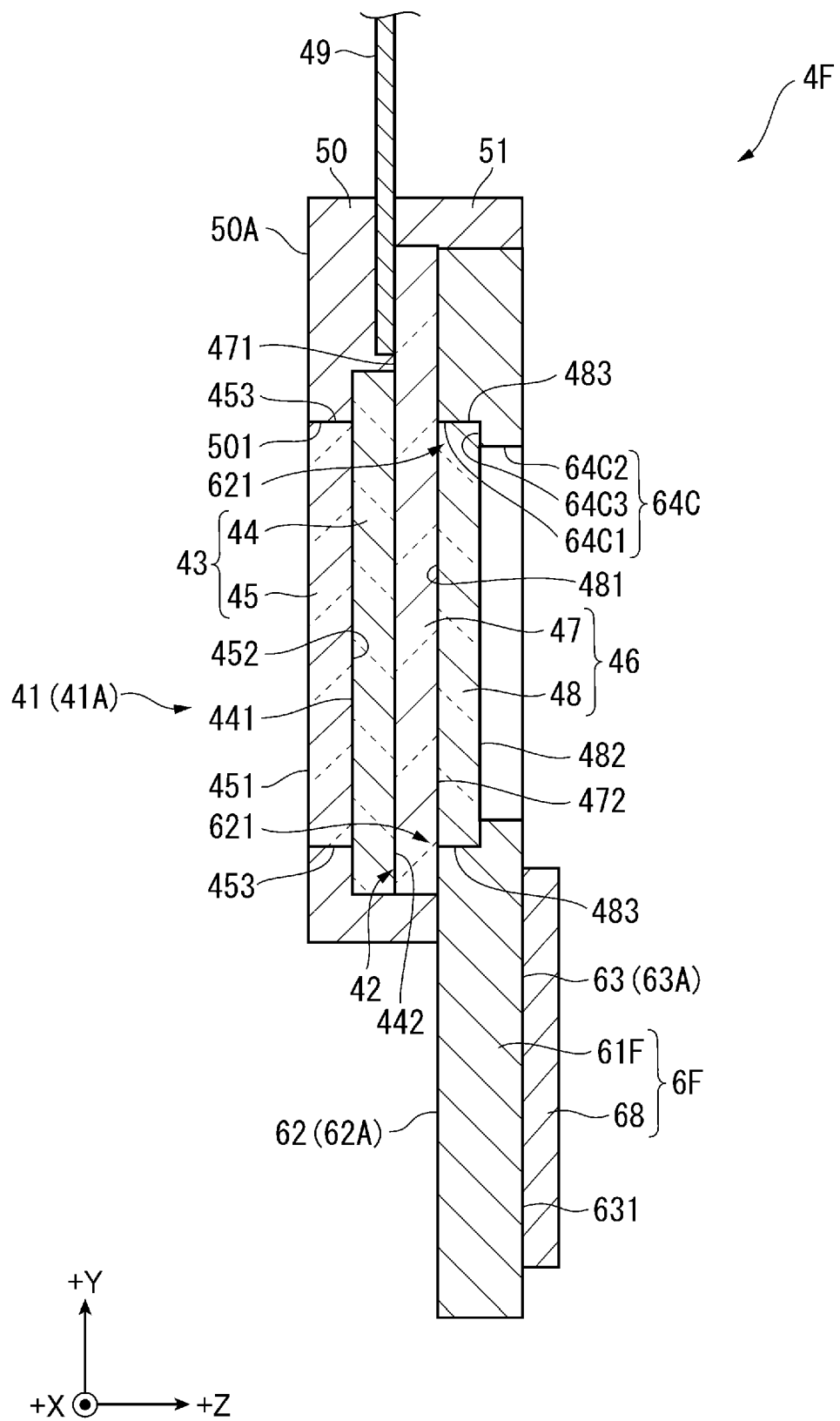
FIG. 13 is a schematic diagram showing a cross section of a modification of the liquid crystal panel according to the second embodiment.

FIG. 13 is a diagram schematically showing a cross section along a YZ plane of a liquid crystal panel 4F, which is a modification of the liquid crystal panel 4D.

For example, the liquid crystal panel 4F shown in FIG. 13 may be adopted instead of the liquid crystal panel 4D.

The liquid crystal panel 4F includes the same components and the same functions as the components and the functions of the liquid crystal panel 4D except that the liquid crystal panel 4F includes an emission side cooling member 6F instead of the emission side cooling member 6D. That is, the liquid crystal panel 4F includes the panel main body 41, the wire 49, the holding housing 50, the clamping member 51 and the emission side cooling member 6F.

Like the emission side cooling member 6D, the emission side cooling member 6F vaporizes the coolant in the liquid phase into the coolant in the gas phase with heat transferred from the pixel substrate 47 and the emission side dustproof substrate 48 and radiates heat received from the coolant in the gas phase to the outside. The emission side cooling member 6F includes the same components and the same functions as the components and the functions of the emission side cooling member 6D except that the emission side cooling member 6F includes a main body section 61F instead of the main body section 61D. That is, the emission side cooling member 6F includes the main body section 61F and the first heat radiating member 68.

Like the main body section 61D, the main body section 61F includes the first member 62 and the second member 63 and is configured by combining the first member 62 and the second member 63. The main body section 61F is provided on the pixel substrate 47 such that the first surface 62A of the first member 62 is in contact with the light emission surface 472 of the pixel substrate 47. That is, a part of the heat receiving section 621 of the main body section 61F is coupled to the pixel substrate 47 in a heat transferable manner.

The main body section 61F includes the opening section 64C.

As explained above, the opening section 64C is the two tier hole including the first opening section 64C1 provided on the light incident side and the second opening section 64C2 provided on the light emission side. The emission side dustproof substrate 48 is disposed on the inside of the first opening section 64C1. The side surface 483 of the emission side dustproof substrate 48 is coupled to the inner circumferential surface of the first opening section 64C1 via the thermally conductive adhesive or the like in a heat transferable manner. A part of the light emission surface 482 of the emission side dustproof substrate 48 is coupled, in a heat transferable manner, to the coupling section 64C3 that couples the inner circumferential surface of the first opening section 64C1 and the inner circumferential surface of the second opening section 64C2.

In other words, the main body section 61F includes a step section formed by the first opening section 64C1, the coupling section 64C3, and the second opening section 64C2. The inner circumferential surface of the first opening section 64C1 is equivalent to the inner circumferential surface of the step section. The coupling section 64C3 is equivalent to the bottom surface of the step section.

In the main body section 61F, the coupling portions to the pixel substrate 47 and the emission side dustproof substrate 48 are parts of the heat receiving section 621. Accordingly, the inner circumferential surface of the first opening section 64C1 and the coupling section 64C3 are parts of the heat receiving section 621.

Such a liquid crystal panel 4F can achieve the same effects as the effects of the liquid crystal panels 4C and 4D explained above.

In the liquid crystal panel 4F, as in the liquid crystal panel 4C, the first member 62 including the heat receiving section 621 and the pixel substrate 47 may not be coupled in a heat transferable manner. In this case, the main body section 61F may be fixed to the emission side dustproof substrate 48.

Third Embodiment

A third embodiment of the present disclosure is explained.

A projector according to this embodiment has the same configuration as the configuration of the projector 1 according to the first embodiment but is different in that a main body section of an emission side cooling member included in a liquid crystal panel extends from an opening section in an extending direction of the wire 49 and extends from the opening section in the opposite direction of the extending direction of the wire 49. In the following explanation, the same or substantially the same portions as the portions explained above are denoted by the same reference numerals and signs and explanation of the portions is omitted.

Figure 14:
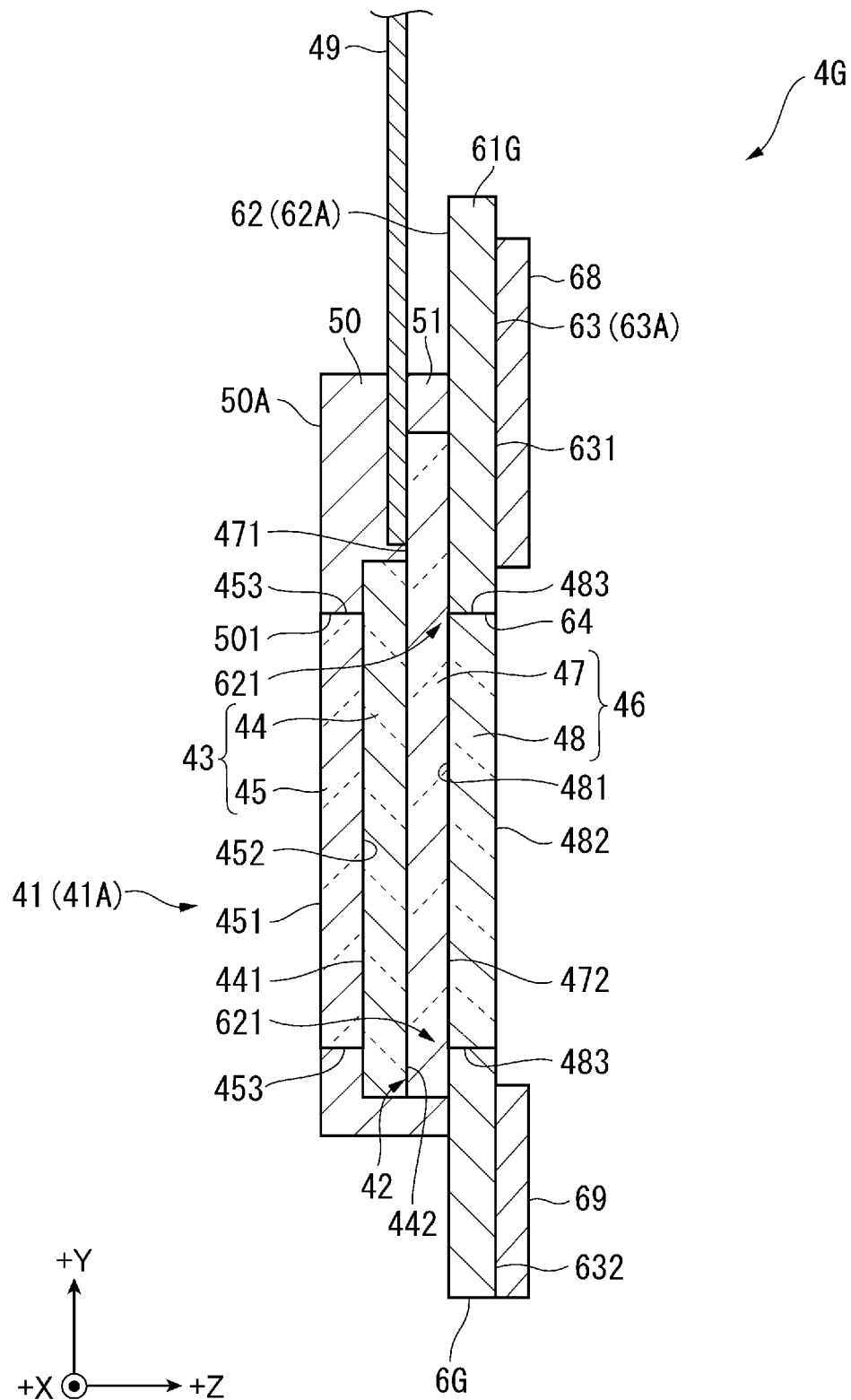
FIG. 14 is a schematic diagram showing a cross section of a liquid crystal panel included in a projector according to a third embodiment.

FIG. 14 is a diagram schematically showing a cross section along a YZ plane of a liquid crystal panel 4G included in the projector according to this embodiment.

The projector according to this embodiment includes the same components and the same functions as the components and the functions of the projector 1 according to the first embodiment except that the projector according to this embodiment includes the liquid crystal panel 4G shown in FIG. 14 instead of the liquid crystal panel 4A according to the first embodiment.

The liquid crystal panel 4G includes the same components and the same functions as the components and the functions of the liquid crystal panel 4A except that the liquid crystal panel 4G includes an emission side cooling member 6G instead of the emission side cooling member 6A. That is, the liquid crystal panel 4G includes the panel main body 41, the wire 49, the holding housing 50, and the emission side cooling member 6G. The panel main body 41 includes the liquid crystal layer 42, the incident section 43, and the emission section 46. The incident section 43 includes the counter substrate 44 and the incident side dustproof substrate 45. The emission section 46 includes the pixel substrate 47 and the emission side dustproof substrate 48. The panel main body 41 includes the pixel region 41A configured by the liquid crystal layer 42, the counter substrate 44, and the pixel substrate 47. A plurality of pixels are arrayed in the pixel region 41A.

The emission side cooling member 6G includes the same components as the components of the emission side cooling member 6A except that the emission side cooling member 6G further includes a second heat radiating member 69 and is formed larger in the +Y direction than the emission side cooling member 6A. That is, the emission side cooling member 6G includes a main body section 61G, the first heat radiating member 68, and the second heat radiating member 69.

The main body section 61G includes the first member 62, the second member 63, and the opening section 64. The first member 62 includes the first surface 62A and the heat receiving section 621. The second member 63 includes the second surface 63A, the first heat radiating section 631, and a second heat radiating section 632.

The main body section 61G is configured by combining the first member 62 and the second member 63. The main body section 61G extends from the opening section 64 along the +Y direction, which is the extending direction of the wire 49 from the liquid crystal layer 42, and extends from the opening section 64 along the −Y direction, which is the opposite direction of the extending direction of the wire 49 from the liquid crystal layer 42.

As explained above, the first heat radiating section 631 is disposed in the +Y direction with respect to the opening section 64 in the second member 63. The first heat radiating member 68 is provided in a position corresponding to the first heat radiating section 631 on the second surface 63A of the second member 63.

The second heat radiating section 632 is disposed in the −Y direction with respect to the opening section 64 in the second member 63. The second heat radiating member 69 is provided in a position corresponding to the second heat radiating section 632 on the second surface 63A of the second member 63.

The second heat radiating member 69 radiates heat transferred from the second heat radiating section 632 to a cooling gas flowing to the second heat radiating member 69. The second heat radiating member 69 may include the same plurality of fins as the plurality of fins 681 or may include a plurality of fins formed in another shape.

Flow of the Cooling Gas Flowing to the Liquid Crystal Panel

The cooling gas circulated by a fan of a cooling device disposed in the exterior housing 2 flows in the +Y direction with respect to the liquid crystal panel 4G. Although not illustrated, the cooling gas flowing to the liquid crystal panel 4G is divided, at the end portion in the −Y direction in the liquid crystal panel 4G, into the cooling gas flowing in a space on a light incident side with respect to the liquid crystal panel 4G and the cooling gas that flows in a space on a light emission side with respect to the liquid crystal panel 4G.

The cooling gas flowing in the space on the light incident side with respect to the liquid crystal panel 4G flows in the +Y direction and cools the incident side dustproof substrate 45 and, thereafter, cools the holding housing 50.

The cooling gas flowing in the space on the light emission side with respect to the liquid crystal panel 4G flows in the +Y direction and cools the second heat radiating member 69, the emission side dustproof substrate 48, and the first heat radiating member 68 in order.

In this way, the cooling gas flows to the incident side dustproof substrate 45, the holding housing 50, the emission side dustproof substrate 48, the first heat radiating member 68, and the second heat radiating member 69, whereby the heat of the liquid crystal layer 42 is transferred to the cooling gas, the liquid crystal layer 42 is cooled, and the driver circuit 491 is cooled.

In the liquid crystal panel 4G, the first heat radiating section 631 and the first heat radiating member 68 are provided in the +Y direction with respect to the opening section 64. The second heat radiating section 632 and the second heat radiating member 69 are provided in the −Y direction with respect to the opening section 64.

Accordingly, when the liquid crystal panel 4G is disposed such that the +Y direction is the vertical direction upper side, a coolant in a liquid phase condensed by the first condensing section corresponding to the first heat radiating section 631 can be transported to, by not only the capillarity but also the gravity, vaporizing sections corresponding to a coupling portion to the pixel substrate 47 and a coupling portion to the emission side dustproof substrate 48 in the heat receiving section 621.

When the liquid crystal panel 4G is disposed such that the −Y direction is the vertical direction upper side, the coolant in the liquid phase condensed by the second condensing section corresponding to the second heat radiating section 632 can be transported to, by not only the capillarity but also the gravity, the vaporizing sections corresponding to the coupling portion to the pixel substrate 47 and the coupling portion to the emission side dustproof substrate 48 in the heat receiving section 621.

Consequently, a change from the coolant in the liquid phase to the coolant in a gas phase in the vaporizing sections can be accelerated by the heat transferred from the liquid crystal layer 42 via the pixel substrate 47 and the emission side dustproof substrate 48. That is, it is possible to improve heat radiation efficiency of the heat of the liquid crystal layer 42 and cooling efficiency of the liquid crystal layer 42.

Effects of the Third Embodiment

The projector according to this embodiment explained above achieves the following effects besides achieving the same effects as the effects of the projector according to the first embodiment and the projector according to the second embodiment.

That is, the liquid crystal panel 4G according to this embodiment achieves the following effects besides achieving the same effects as the effects of the liquid crystal panel 4A according to the first embodiment and the liquid crystal panel 4D according to the second embodiment.

The liquid crystal panel 4G includes the wire 49 that supplies an image signal to the liquid crystal layer 42. The main body section 61G, which is a vapor chamber, extends from the opening section 64 in each of the +Y direction and the −Y direction. The +Y direction is equivalent to the extending direction of the wire 49 from the liquid crystal layer 42. The −Y direction is equivalent to the opposite direction of the extending direction of the wire 49 from the liquid crystal layer 42.

With such a configuration, since a heat radiation area of heat received from the coolant in the gas phase can be increased in the main body section 61G, it is possible to make it easy to condense the coolant in the gas phase into the coolant in the liquid phase. Therefore, it is possible to circulate the coolant in the liquid phase to the vaporizing sections without delay and accelerate the vaporization of the coolant in the liquid phase by the heat of the liquid crystal layer 42.

The liquid crystal panel 4G is disposed such that one direction of the +Y direction and the −Y direction is the vertical direction upper side, whereby the condensed coolant in the liquid phase can be transported to, by not only the capillarity but also the gravity, the vaporizing sections that vaporize the coolant in the liquid phase.

Consequently, the change from the coolant in the liquid phase to the coolant in the gas phase by the use of the heat received by the heat receiving section 621 can be accelerated. Therefore, it is possible to improve the heat radiation efficiency of the heat of the liquid crystal layer 42 and the cooling efficiency of the liquid crystal layer 42.

First Modification of the Third Embodiment

In the liquid crystal panel 4G, the side surface 483 of the emission side dustproof substrate 48 is coupled to the inner circumferential surface of the opening section 64, which is a part of the heat receiving section 621, via the thermally conductive adhesive in a heat transferable manner.

However, not only this, but the side surface 483 and the inner circumferential surface of the opening section 64 may not be coupled in a heat transferable manner. The side surface 483 and the inner circumferential surface of the opening section 64 may be coupled by a heat transfer member such as a leaf spring in a heat transferable manner. Besides, the entire side surface 483 is not always coupled to the inner circumferential surface of the opening section 64 in a heat transferable manner. A part of the side surface 483 may be coupled to the inner circumferential surface of the opening section 64 in a heat transferable manner.

Second Modification of the Third Embodiment

In the liquid crystal panel 4G, the heat receiving section 621 of the emission side cooling member 6G is directly coupled to the light emission surface 472 of the pixel substrate 47 and is coupled to the side surface 483 of the emission side dustproof substrate 48 via the thermally conductive adhesive or the like in a heat transferable manner.

However, not only this, but the heat receiving section 621 may be directly coupled to the emission side dustproof substrate 48 and may not be directly coupled to the pixel substrate 47. For example, a heat transfer member capable of transferring heat from the pixel substrate 47 to the heat receiving section 621 may be provided between the pixel substrate 47 and the heat receiving section 621.

Figure 15:
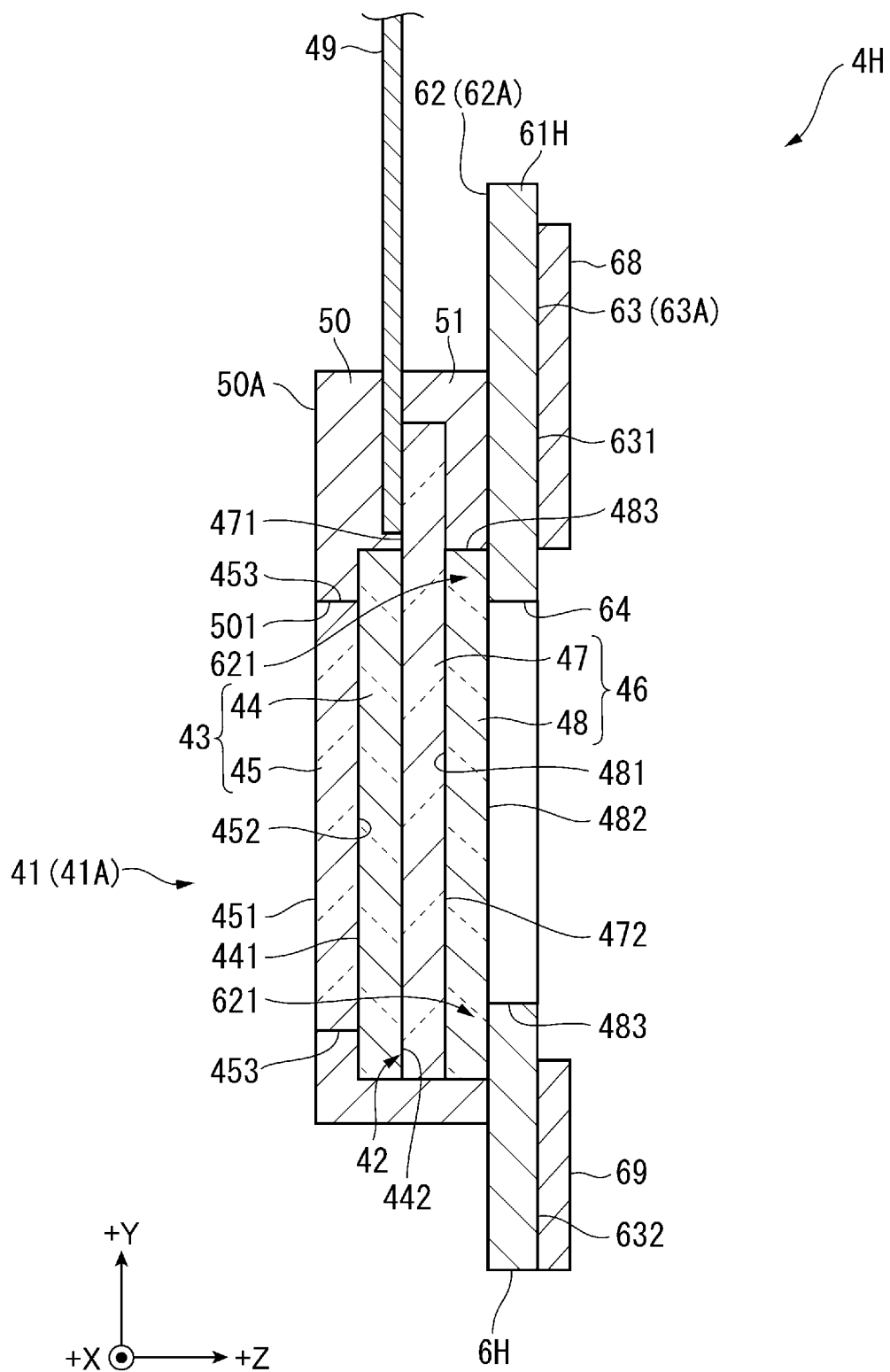
FIG. 15 is a schematic diagram showing a cross section of a modification of the liquid crystal panel according to the third embodiment.

FIG. 15 is a diagram schematically showing a cross section along a YZ plane of a liquid crystal panel 4H, which is a modification of the liquid crystal panel 4G.

For example, the liquid crystal panel 4H shown in FIG. 15 may be adopted instead of the liquid crystal panel 4G.

The liquid crystal panel 4H includes the same components and the same functions as the components and the functions of the liquid crystal panel 4G except that the liquid crystal panel 4H includes an emission side cooling member 6H and the clamping member 51 instead of the emission side cooling member 6G.

That is, the liquid crystal panel 4H includes the panel main body 41, the wire 49, the holding housing 50, the clamping member 51, and the emission side cooling member 6H.

The emission side cooling member 6H includes the same components and the same functions as the components and the functions of the emission side cooling member 6G except that the emission side cooling member 6H includes a main body section 61H instead of the main body section 61G. That is, the emission side cooling member 6H includes the main body section 61H, the first heat radiating member 68, and the second heat radiating member 69.

The main body section 61H includes the first member 62, the second member 63, and the opening section 64. The first member 62 includes the first surface 62A and the heat receiving section 621. The second member 63 includes the second surface 63A, the first heat radiating section 631, and the second heat radiating section 632. Like the main body section 61A, the main body section 61H extends from the opening section 64 in the +Y direction, which is the extending direction of the wire 49 from the liquid crystal layer 42. Like the main body section 61D, the main body section 61H extends from the opening section 64 in the −Y direction, which is the opposite direction of the extending direction of the wire 49 from the liquid crystal layer 42.

In the emission side cooling member 6H, the first surface 62A of the first member 62 is not directly coupled to the pixel substrate 47 and is coupled to the pixel substrate 47 via the clamping member 51 in a heat transferable manner and is coupled to the counter substrate 44 via the holding housing 50 in a heat transferable manner.

The first surface 62A is coupled to the light emission surface 482 of the emission side dustproof substrate 48. When viewed from an emitting direction of image light by the liquid crystal panel 4H, the area of the emission side dustproof substrate 48 is larger than the area of the opening section 64 of the emission side cooling member 6H. The emission side dustproof substrate 48 is not disposed on the inner side of the opening section 64. The first surface 62A is coupled to the light emission surface 482 of the emission side dustproof substrate 48 in a portion around the opening section 64.

That is, the emission side cooling member 6H is provided on the emission side dustproof substrate 48 such that a circumferential portion of the opening section 64 on the first surface 62A is coupled to the light emission surface 482.

In other words, a part of the heat receiving section 621 provided around the opening section 64 is coupled to the light emission surface 482 of the emission side dustproof substrate 48 in a heat transferable manner, another part of the heat receiving section 621 is coupled to the pixel substrate 47 via the clamping member 51 in a heat transferable manner, and still another part of the heat receiving section 621 is coupled to the counter substrate 44 via the holding housing 50 in a heat transferable manner. Heat transferred from the liquid crystal layer 42 to the emission side dustproof substrate 48 via the pixel substrate 47 is transferred to the heat receiving section 621.

As explained above, in a heat quantity generated by the liquid crystal layer 42, a heat quantity transferred to the emission side dustproof substrate 48 via the pixel substrate 47 is larger than a heat quantity transferred to the clamping member 51 via the pixel substrate 47. Accordingly, the heat receiving section 621 may not be coupled to the clamping member 51 in a heat transferable manner.

Such a liquid crystal panel 4H achieves the same effects as the effects of the liquid crystal panels 4B, 4E, and 4G explained above.

Third Modification of the Third Embodiment

In the liquid crystal panel 4G, the heat receiving section 621 of the emission side cooling member 6G is directly coupled to the light emission surface 472 of the pixel substrate 47 and the side surface 483 of the emission side dustproof substrate 48. In the liquid crystal panel 4H, the heat receiving section 621 is directly coupled to the light emission surface 482 of the emission side dustproof substrate 48.

However, the coupling portions to the pixel substrate 47 and the emission side dustproof substrate 48 in the heat receiving section 621 are not limited to the above.

Figure 16:
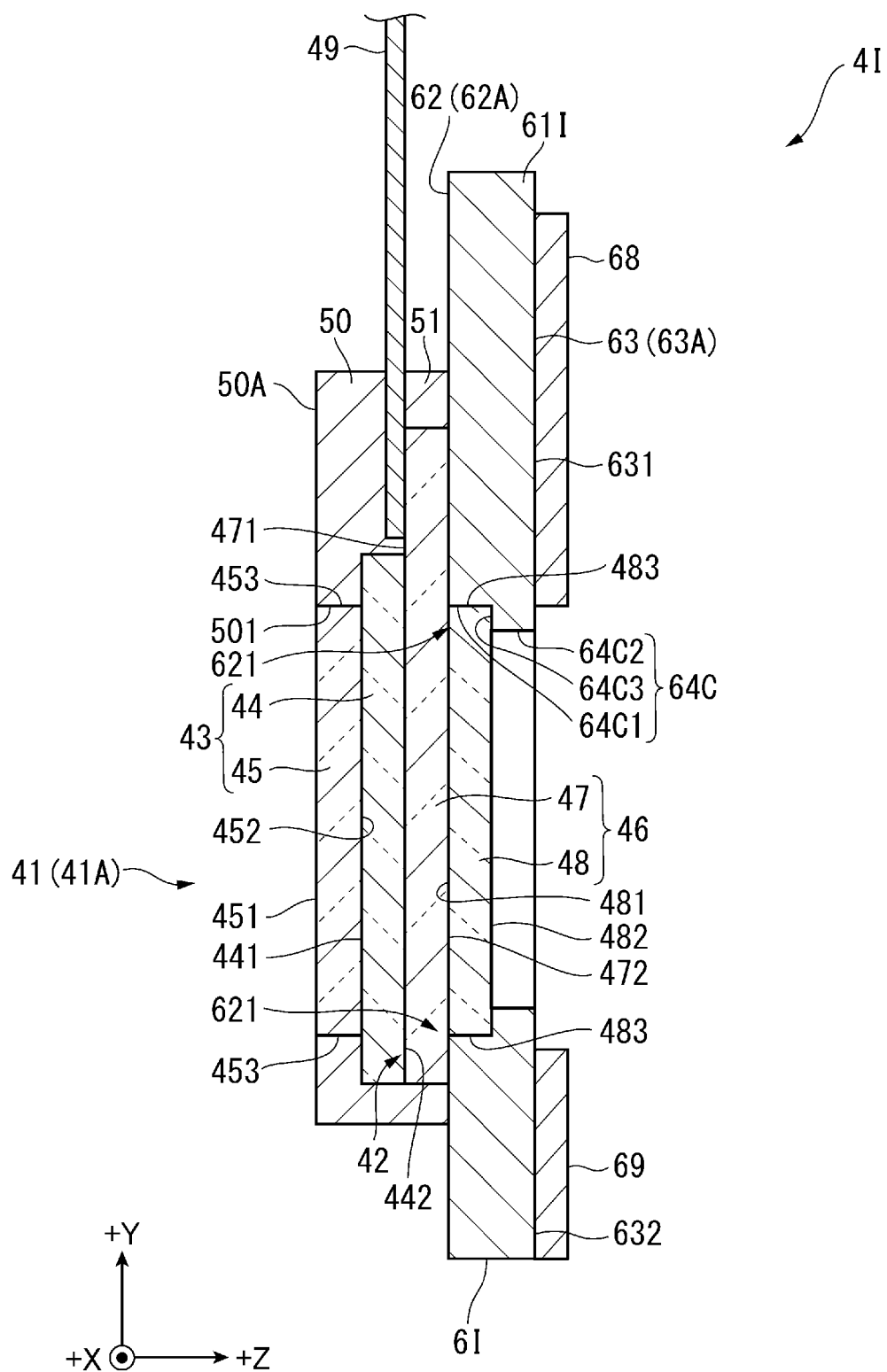
FIG. 16 is a schematic diagram showing a cross section of a modification of the liquid crystal panel according to the third embodiment.

FIG. 16 is a diagram schematically showing a cross section along a YZ plane of a liquid crystal panel 4I, which is a modification of the liquid crystal panel 4G.

For example, the liquid crystal panel 4I shown in FIG. 16 may be adopted instead of the liquid crystal panel 4G.

The liquid crystal panel 4I includes the same components and the same functions as the components and the functions of the liquid crystal panel 4G except that the liquid crystal panel 4I includes an emission side cooling member 6I instead of the emission side cooling member 6G. That is, the liquid crystal panel 4I includes the panel main body 41, the wire 49, the holding housing 50, the clamping member 51, and the emission side cooling member 6I.

Like the emission side cooling member 6G, the emission side cooling member 6I vaporizes the coolant in the liquid phase into the coolant in the gas phase with heat transferred from the pixel substrate 47 and the emission side dustproof substrate 48 and radiates heat received from the coolant in the gas phase to the outside. The emission side cooling member 6I includes the same components and the same functions as the components and the functions of the emission side cooling member 6G except that the emission side cooling member 6I includes a main body section 61I instead of the main body section 61G. That is, the emission side cooling member 6I includes the main body section 61I, the first heat radiating member 68, and the second heat radiating member 69.

Like the main body section 61G, the main body section 61I includes the first member 62 and the second member 63 and is configured by combining the first member 62 and the second member 63. The main body section 61I is provided on the pixel substrate 47 such that the first surface 62A of the first member 62 is in contact with the light emission surface 472 of the pixel substrate 47. That is, a part of the heat receiving section 621 of the main body section 61I is coupled to the pixel substrate 47 in a heat transferable manner.

The main body section 61I includes the opening section 64C.

As explained above, the opening section 64C is the two tier hole including the first opening section 64C1 provided on the light incident side and the second opening section 64C2 provided on the light emission side. The emission side dustproof substrate 48 is disposed on the inside of the first opening section 64C1. The side surface 483 of the emission side dustproof substrate 48 is coupled to the inner circumferential surface of the first opening section 64C1 via the thermally conductive adhesive or the like in a heat transferable manner. A part of the light emission surface 482 of the emission side dustproof substrate 48 is coupled, in a heat transferable manner, to the coupling section 64C3 that couples the inner circumferential surface of the first opening section 64C1 and the inner circumferential surface of the second opening section 64C2.

In other words, the main body section 61I includes a step section formed by the first opening section 64C1, the coupling section 64C3, and the second opening section 64C2. The inner circumferential surface of the first opening section 64C1 is equivalent to the inner circumferential surface of the step section. The coupling section 64C3 is equivalent to the bottom surface of the step section.

In the main body section 61I, the coupling portions to the pixel substrate 47 and the emission side dustproof substrate 48 are parts of the heat receiving section 621. Accordingly, the inner circumferential surface of the first opening section 64C1 and the coupling section 64C3 are parts of the heat receiving section 621.

Like the main body section 61G, the main body section 61I extends from the opening section 64C in the +Y direction, which is the extending direction of the wire 49 from the liquid crystal layer 42, and extends from the opening section 64C in the −Y direction, which is the opposite direction of the extending direction of the wire 49 from the liquid crystal layer 42. The first heat radiating section 631 and the first heat radiating member 68 are provided in a portion in the +Y direction with respect to the opening section 64C on the second surface 63A. The second heat radiating section 632 and the second heat radiating member 69 are provided in a portion in the −Y direction with respect to the opening section 64C on the second surface 63A.

Such a liquid crystal panel 4I can achieve the same effects as the effects of the liquid crystal panels 4C, 4F, and 4G explained above.

In the liquid crystal panel 4I, as in the liquid crystal panels 4C and 4F, the first member 62 including the heat receiving section 621 and the pixel substrate 47 may not be coupled in a heat transferable manner. In this case, the main body section 61I may be fixed to the emission side dustproof substrate 48.

Fourth Embodiment

A fourth embodiment of the present disclosure is explained.

A projector according to this embodiment has the same configuration as the configuration of the projector 1 according to the first embodiment but is different in disposition of a cooling member in a liquid crystal panel. In the following explanation, the same or substantially the same portions as the portions explained above are denoted by the same reference numerals and signs and explanation of the components is omitted.

Figure 17:
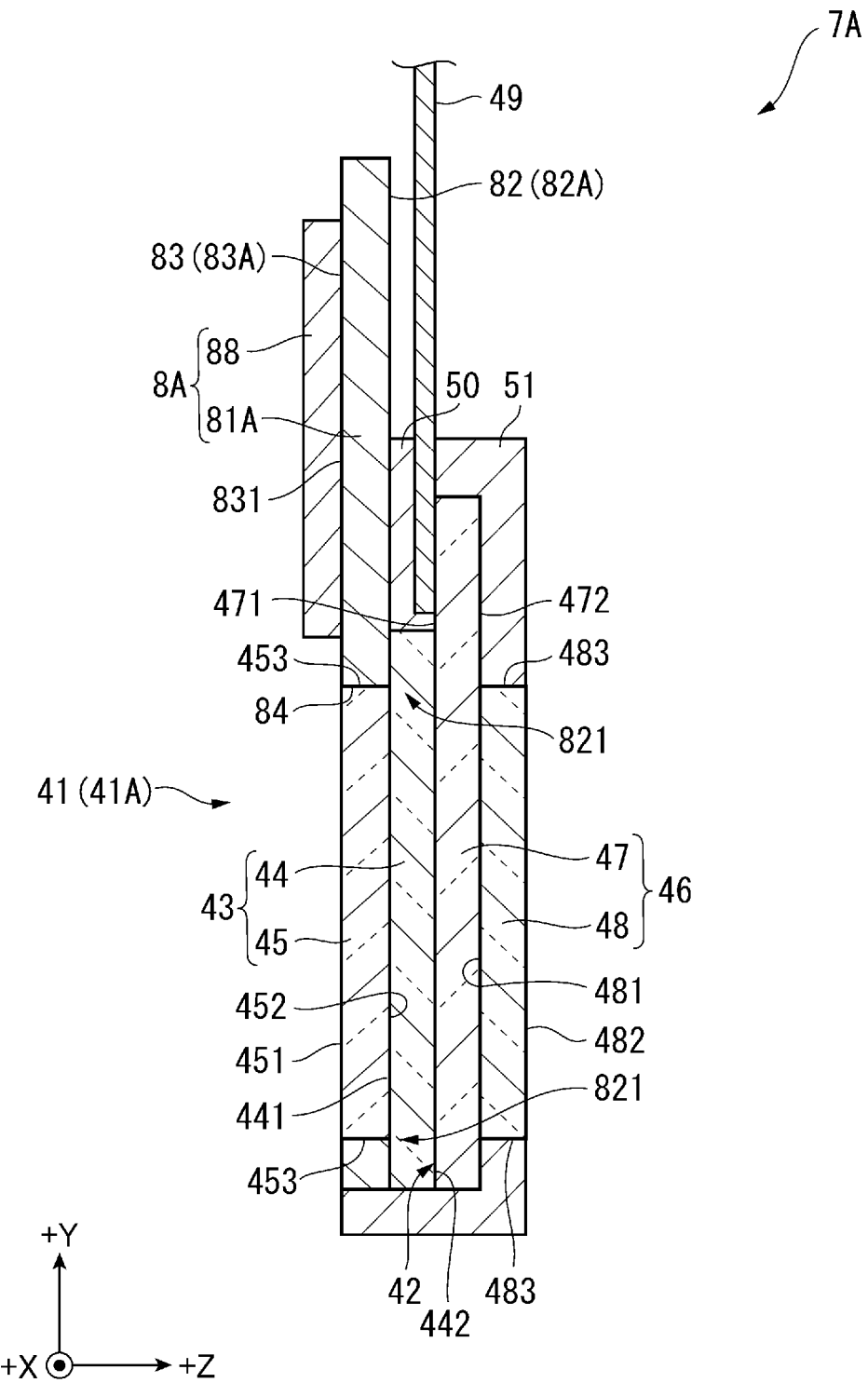
FIG. 17 is a schematic diagram showing a cross section of a liquid crystal panel included in a projector according to a fourth embodiment.

FIG. 17 is a diagram schematically showing a cross section along a YZ plane of a liquid crystal panel 7A included in the projector according to this embodiment.

The projector according to this embodiment includes the same components and the same functions as the components and the functions of the projector 1 according to the first embodiment except that the projector according to this embodiment includes the liquid crystal panel 7A shown in FIG. 17 instead of the liquid crystal panel 4A according to the first embodiment.

The liquid crystal panel 7A includes the same components as the components of the liquid crystal panel 4A except that the liquid crystal panel 7A includes the clamping member 51 and an incident side cooling member 8A instead of the emission side cooling member 6A. That is, the liquid crystal panel 7A includes the panel main body 41, the wire 49, the holding housing 50, the clamping member 51, and the incident side cooling member 8A. The panel main body 41 includes the liquid crystal layer 42, the incident section 43, and the emission section 46. The incident section 43 includes the counter substrate 44 and the incident side dustproof substrate 45. The emission section 46 includes the pixel substrate 47 and the emission side dustproof substrate 48. The panel main body 41 includes the pixel region 41A configured by the liquid crystal layer 42, the counter substrate 44, and the pixel substrate 47. A plurality of pixels are arrayed in the pixel region 41A.

As explained in the second modification of the first embodiment, the clamping member 51 clamps the panel main body 41 in conjunction with the holding housing 50. In this embodiment, the holding housing 50 does not include the heat radiation fins 502. The incident side cooling member 8A is provided on a surface 50A on a light incident side in the holding housing 50.

Configuration of the Incident Side Cooling Member

Like the emission side cooling member 6A, the incident side cooling member 8A vaporizes a coolant in a liquid phase encapsulated on the inside into the coolant in a gas phase with heat transferred from the liquid crystal layer 42 to thereby consume the heat transferred from the liquid crystal layer 42 and cool the liquid crystal layer 42, receives the heat of the coolant in the gas phase to condense the coolant in the gas phase into the coolant in the liquid phase, and radiates the received heat to the outside.

The incident side cooling member 8A includes a main body section 81A and a first heat radiating member 88. The main body section 81A includes a first member 82 and a second member 83 combined with each other and includes an opening section 84.

When viewed from an incident side of light made incident on the liquid crystal layer 42 (the −Z direction), the main body section 81A extends further to the outer side than the counter substrate 44 and the incident side dustproof substrate 45.

The first member 82 is a substrate formed in a flat shape and can be referred to as first substrate as well. The first member 82 has the same configuration as the configuration of the first member 62. The first member 82 includes a first surface 82A, which is a surface on the opposite side of the second member 83. The first surface 82A is a surface that is in contact with a heat generating body. In this embodiment, the first surface 82A is a flat surface.

The first member 82 includes a heat receiving section 821 that receives the heat of the heat generating body. That is, the main body section 81A, which is a vapor chamber according to this embodiment, includes the heat receiving section 821. The heat receiving section 821 is explained in detail below.

The second member 83 is a substrate formed in a flat shape and can be referred to as second substrate as well. The second member 83 has the same configuration as the configuration of the second member 63. The second member 83 is joined to the first member 82 and forms the encapsulating space SP in conjunction with the first member 82. The second member 83 includes a second surface 83A, which is a surface on the opposite side of the first member 82, and includes a first heat radiating section 831 provided on the second surface 83A.

The second member 83 receives heat from the coolant in the gas phase in the encapsulating space SP in the first heat radiating section 831 and radiates the heat of the coolant in the gas phase to the outside.

Although not illustrated, a first condensing section, which is a portion corresponding to the first heat radiating section 831 on the inner surface of the encapsulating space SP, condenses the coolant in the gas phase, the heat of which is received, into the coolant in the liquid phase.

The opening section 84 is a through-hole piercing through the main body section 81A along a direction in which the first member 82 and the second member 83 are opposed to each other (the +Z direction). The opening section 84 is a substantially rectangular opening section when viewed from the +Z direction. The inner circumferential surface of the opening section 84 is formed by a joining portion of the first member 82 and the second member 83.

The main body section 81A extends from the opening section 84 along the +Y direction, which is an extending direction of the wire 49 from the liquid crystal layer 42. That is, the first member 82 and the second member 83 extend from the opening section 84 in the extending direction of the wire 49 (the +Y direction).

Configuration of the Heat Receiving Section

The heat receiving section 821 is a portion that is coupled to the heat generating body and receives the heat of the heat generating body in the first member 82. That is, the heat receiving section 821 can be defined as a coupling portion coupled to the heat generating body in the first member 82. The heat receiving section 821 is provided around the opening section 84 in the first member 82.

In this embodiment, the heat receiving section 821 is coupled to the light incident surface 441 of the counter substrate 44 and the side surface 453 of the incident side dustproof substrate 45 and receives the heat of the counter substrate 44 and the heat of the incident side dustproof substrate 45.

Although not illustrated, a portion corresponding to the heat receiving section 821 on the inner surface of the encapsulating space SP can be referred to as a vaporizing section that vaporizes the coolant in the liquid phase with the heat received by the heat receiving section 821.

Specifically, in a portion coming into contact with the coolant in the liquid phase on the inner surface of the encapsulating space SP, a portion that receives transfer of the heat received by the heat receiving section 821 and vaporizes the coolant in the liquid phase with the heat is the vaporizing section.

Configuration of the First Heat Radiating Section

The first heat radiating section 831 is provided on the second surface 83A on the opposite side of the first member 82 in the second member 83. The first heat radiating section 831 radiates the heat of the coolant in the gas phase flowing in the encapsulating space SP.

Although not illustrated, a portion corresponding to the first heat radiating section 831 on the inner surface of the encapsulating space SP can be referred to as first condensing section that receives heat from the coolant in the gas phase and condenses the coolant in the gas phase into the coolant in the liquid phase.

Specifically, in a portion coming into contact with the coolant in the gas phase on the inner surface of the encapsulating space SP, a portion that receives the heat of the coolant in the gas phase and condenses the coolant in the gas phase into the coolant in the liquid phase is the first condensing section. The heat received from the coolant in the gas phase by such a first condensing section is radiated by the first heat radiating section 831.

The first heat radiating section 831 is provided in the extending direction of the wire 49 from the liquid crystal layer 42 with respect to the opening section 64. The first heat radiating member 88 is provided in a position corresponding to the first heat radiating section 831 on the second surface 83A. The first heat radiating member 88 is provided in the first heat radiating section 831, whereby the first heat radiating section 831 becomes a portion that easily radiates, to the outside of the main body section 81A, the heat received from the coolant in the gas phase in the second member 83.

Accordingly, in the incident side cooling member 8A, a portion where the first heat radiating member 88 is provided is configured as the first heat radiating section 831.

Disposition of the Incident Side Cooling Member with Respect to the Panel Main Body The incident side cooling member 8A is provided on the light incident side with respect to the liquid crystal layer 42. Specifically, the incident side cooling member 8A is provided on the light incident surface 441 of the counter substrate 44, which is an incident side substrate. The first surface 82A of the first member 82 is coupled to the light incident surface 441 of the counter substrate 44 in a heat transferable manner.

The incident side dustproof substrate 45 is disposed in the opening section 84. The side surface 453 of the incident side dustproof substrate 45 is coupled to the inner circumferential surface of the opening section 84 via the thermally conductive adhesive in a heat transferable manner.

That is, the inner circumferential surface of the opening section 84 is a part of the heat receiving section 821.

Transfer Route of Heat Generated by the Liquid Crystal Layer

A part of the heat transferred from the liquid crystal layer 42 to the counter substrate 44 is transferred to the heat receiving section 821 via the counter substrate 44. Another part of the heat is transferred from the counter substrate 44 to the heat receiving section 821 via the incident side dustproof substrate 45.

More specifically, in the incident side cooling member 8A shown in FIG. 17, the heat transferred from the liquid crystal layer 42 to the counter substrate 44 is transferred to the heat receiving section 821 that is in contact with the light incident surface 441 of the counter substrate 44. On the other hand, the heat transferred to the incident side dustproof substrate 45 is transferred to the inner circumferential surface of the opening section 84 coupled to the side surface 453 of the incident side dustproof substrate 45 in a heat transferable manner.

The first member 82 including the heat receiving section 821 vaporizes the coolant in the liquid phase in the encapsulating space SP with the transferred heat of the liquid crystal layer 42 to thereby consume the heat transferred to the first member 82. Consequently, the counter substrate 44 and the incident side dustproof substrate 45 are cooled and the liquid crystal layer 42 is cooled.

The coolant in the gas phase flowing in the encapsulating space SP and reaching the first condensing section is condensed into the coolant in the liquid phase by the first condensing section. Heat received from the coolant in the gas phase by the first condensing section is transferred from the first heat radiating section 831 to the first heat radiating member 88 and radiated by the first heat radiating member 88.

Flow of a Cooling Gas Flowing to the Liquid Crystal Panel

A cooling gas circulated by a fan of a cooling device disposed in the exterior housing 2 flows in the +Y direction with respect to the liquid crystal panel 7A. Although not illustrated, like the cooling gas flowing to the liquid crystal panel 4A is divided into, at the end portion in the −Y direction in the liquid crystal panel 7A, the cooling gas flowing in a space on the light incident side with respect to the liquid crystal panel 7A and the cooling gas flowing in a space on a light emission side with respect to the liquid crystal panel 7A.

The cooling gas flowing in the space on the light incident side with respect to the liquid crystal panel 7A flows in the +Y direction and cools the incident side dustproof substrate 45 and, thereafter, flows in the +Y direction along the second surface 83A and flows to the first heat radiating member 88. The first heat radiating member 88 transfers, to the cooling gas, heat transferred from the first heat radiating section 831.

The cooling gas flowing in the space on the light emission side with respect to the liquid crystal panel 7A flows in the +Y direction and cools the emission side dustproof substrate

48 and, thereafter, cools the clamping member 51 and cools circuit elements such as the driver circuit 491.

The cooling gas flows to the incident side dustproof substrate 45, the emission side dustproof substrate 48, the clamping member 51, and the first heat radiating member 88 to which the heat of the liquid crystal layer 42 is transferred in this way, whereby the heat of the liquid crystal layer 42 is transferred to the cooling gas and the liquid crystal layer 42 is cooled.

In the liquid crystal panel 7A as well, the first heat radiating section 831 is provided in the +Y direction with respect to the opening section 84. Accordingly, when the liquid crystal panel 7A is disposed such that the +Y direction is the vertical direction upper side, the coolant in the liquid phase condensed by the first condensing section can be transported to, by not only the capillarity but also the gravity, the vaporizing section that receives transfer of the heat received by the heat receiving section 821 and vaporizes the coolant in the liquid phase.

Consequently, the change from the coolant in the liquid phase to the coolant in the gas phase in the vaporizing section can be accelerated by the heat transferred from the liquid crystal layer 42 via the counter substrate 44 and the incident side dustproof substrate 45.

That is, it is possible to improve heat radiation efficiency of the heat of the liquid crystal layer 42 and cooling efficiency of the liquid crystal layer 42.

Effects of the Fourth Embodiment

The projector according to this embodiment explained above achieves the following effects besides achieving the same effects as the effects of the projector 1 according to the first embodiment. That is, the liquid crystal panel 7A according to this embodiment achieves the following effects besides achieving the same effects as the effects of the liquid crystal panel 4A according to the first embodiment.

The projector according to this embodiment includes the liquid crystal panel 7A functioning as a light modulation device that modulates light emitted from a light source. The liquid crystal panel 7A is a transmissive liquid crystal panel that emits modulated light along a traveling direction of light made incident on the liquid crystal panel.

The liquid crystal panel 7A includes the pixel region 41A, the liquid crystal layer 42, the incident section 43, the emission section 46, and the main body section 81A. The plurality of pixels are arrayed in the pixel region 41A. The liquid crystal layer 42 modulates light for each of the plurality of pixels. The incident section 43 makes the light incident on the liquid crystal layer 42. The emission section 46 emits, as image light, the light modulated by the liquid crystal layer 42. The main body section 81A is the vapor chamber configuring the incident side cooling member 8A. The main body section 81A includes the opening section 84, the heat receiving section 821, and the first heat radiating section 831. The opening section 84 is provided in the main body section 81A to correspond to the pixel region 41A. The heat receiving section 821 is provided around the opening section 64. The first heat radiating section 831 radiates heat received by the heat receiving section 821.

The main body section 81A vaporizes, with the heat received by the heat receiving section 821, the coolant in the liquid phase encapsulated in the encapsulating space SP provided on the inside of the main body section 81A and radiates the heat of the coolant in the gas phase with the first heat radiating section 831 to thereby condense the coolant in the gas phase into the coolant in the liquid phase.

In the vapor chamber, a pipe for circulating the coolant and a wire for supplying driving power are unnecessary.

With the configuration explained above, compared with when a cooling device in which the coolant flows is provided and when a thermoelectric conversion element such as a Peltier element for moving heat with electric power is provided, it is possible to simplify the configuration of the liquid crystal panel 7A.

Therefore, it is possible to achieve a reduction in the size of the projector functioning as the device on which the liquid crystal panel 7A is mounted. Since it is possible to attach and detach the liquid crystal panel 7A to and from the projector without attaching and detaching the pipe and the wire, it is possible to easily carry out replacement of the liquid crystal panel 7A.

Further, since the heat receiving section 821 provided around the opening section 84 corresponding to the pixel region 41A receives heat, it is possible to improve uniformity of the temperature in the pixel region 41A.

In the liquid crystal panel 7A, the incident section 43 includes the counter substrate 44 that is coupled to the liquid crystal layer 42 in a heat transferable manner and through which light made incident on the liquid crystal layer 42 passes. In this embodiment, the counter substrate 44 is equivalent to a light transmissive incident side substrate. The area of the counter substrate 44 is larger than the area of the pixel region 41A when viewed from the −Z direction. The −Z direction is equivalent to the opposite direction of a traveling direction of light made incident on the liquid crystal layer 42. The main body section 81A, which is the vapor chamber, is provided on the counter substrate 44 in a heat transferable manner.

With such a configuration, since the main body section 81A is provided, in a heat transferable manner, on the counter substrate 44 coupled to the liquid crystal layer 42 in a heat transferable manner, the heat receiving section 821 easily receives the heat of the liquid crystal layer 42 via the counter substrate 44.

Therefore, it is possible to make it easy to cool the liquid crystal layer 42.

In the liquid crystal panel 7A, the incident section 43 includes the counter substrate 44 that includes a common electrode electrically coupled to the liquid crystal layer 42 and is disposed on the light incident side with respect to the liquid crystal layer 42. The common electrode is equivalent to an incident side electrode. The counter substrate 44 is equivalent to a light transmissive incident side electrode substrate. The counter substrate 44 is the incident side substrate on which the main body section 81A, which is the vapor chamber, is provided.

With such a configuration, the counter substrate 44 is a light transmissive substrate directly coupled to the liquid crystal layer 42 susceptible to heat. Since the main body section 81A is provided on such a counter substrate 44, heat generated by the liquid crystal layer 42 can be efficiently transferred to the main body section 81A. Therefore, it is possible to improve cooling efficiency of the liquid crystal layer 42.

In the liquid crystal panel 7A, the incident section 43 includes the incident side dustproof substrate 45 provided on the light incident surface 441 in the counter substrate 44. The light incident surface 441 in the counter substrate 44 is equivalent to a surface on the light incident side. The incident side dustproof substrate 45 includes the light incident surface 451, the light emission surface 452, and the side surface 453. The light incident surface 451 is equivalent to a surface on the light incident side in the incident side dustproof substrate 45. The light emission surface 452 is equivalent to a surface on the light emission side in the incident side dustproof substrate 45. The side surface 453 couples the light incident surface 451 and the light emission surface 452.

The heat receiving section 821 receives heat from the light incident surface 441 in the counter substrate 44 and the side surface 453 in the incident side dustproof substrate 45.

With such a configuration, since the heat receiving section 821 receives heat from the counter substrate 44 and the incident side dustproof substrate 45, the heat of the liquid crystal layer 42 can be transferred to the heat receiving section 821 via each of the counter substrate 44 and the incident side dustproof substrate 45.

Therefore, since the heat of the liquid crystal layer 42 can be efficiently transferred to the heat receiving section 821, it is possible to improve the cooling efficiency of the liquid crystal layer 42.

In the liquid crystal panel 7A, the counter substrate 44 includes, as the incident side electrode, the common electrode provided to correspond to the pixel region 41A.

As explained above, in the general transmissive liquid crystal panel, the counter substrate is disposed on the light incident side with respect to the liquid crystal layer and the pixel substrate is disposed on the light emission side with respect to the liquid crystal layer.

Accordingly, the liquid crystal panel 7A that achieves the effects explained above can be configured by providing, in the general transmissive liquid crystal panel, the main body section 81A having the configuration explained above, that is, the main body section 81A, which is the vapor chamber.

The liquid crystal panel 7A includes the wire 49 that supplies an image signal for driving the liquid crystal layer 42. The main body section 81A, which is the vapor chamber, extends from the opening section 84 in the extending direction of the wire 49 from the liquid crystal layer 42.

With such a configuration, for example, compared with when the main body section extends in the opposite direction of the extending direction of the wire 49 from the opening section 84, it is possible to prevent an increase in the size of the liquid crystal panel 7A in the extending direction of the wire 49.

First Modification of the Fourth Embodiment

In the liquid crystal panel 7A, the side surface 453 of the incident side dustproof substrate 45 is coupled to the inner circumferential surface of the opening section 84, which is a part of the heat receiving section 821, via the thermally conductive adhesive in a heat transferable manner.

However, not only this, but the side surface 453 and the inner circumferential surface of the opening section 84 may not be coupled in a heat transferable manner. As explained above, the side surface 453 and the inner circumferential surface of the opening section 84 may be coupled by a component other than the thermally conductive adhesive, for example, a heat transfer member such as a leaf spring.

Besides, the entire side surface 453 is not always coupled to the inner circumferential surface of the opening section 84 in a heat transferable manner. A part of the side surface 453 may be coupled to the inner circumferential surface of the opening section 84 in a heat transferable manner.

Second Modification of the Fourth Embodiment

In the liquid crystal panel 7A, the heat receiving section 821 of the incident side cooling member 8A is directly coupled to the light incident surface 441 of the counter substrate 44 and is coupled to the side surface 453 of the incident side dustproof substrate 45 via the thermally conductive adhesive or the like in a heat transferable manner.

However, not only this, but the heat receiving section 821 may be directly coupled to the incident side dustproof substrate 45 and may not be directly coupled to the counter substrate 44. For example, a heat transfer member capable of transferring heat from the counter substrate 44 to the heat receiving section 821 may be provided between the counter substrate 44 and the heat receiving section 821.

Figure 18:
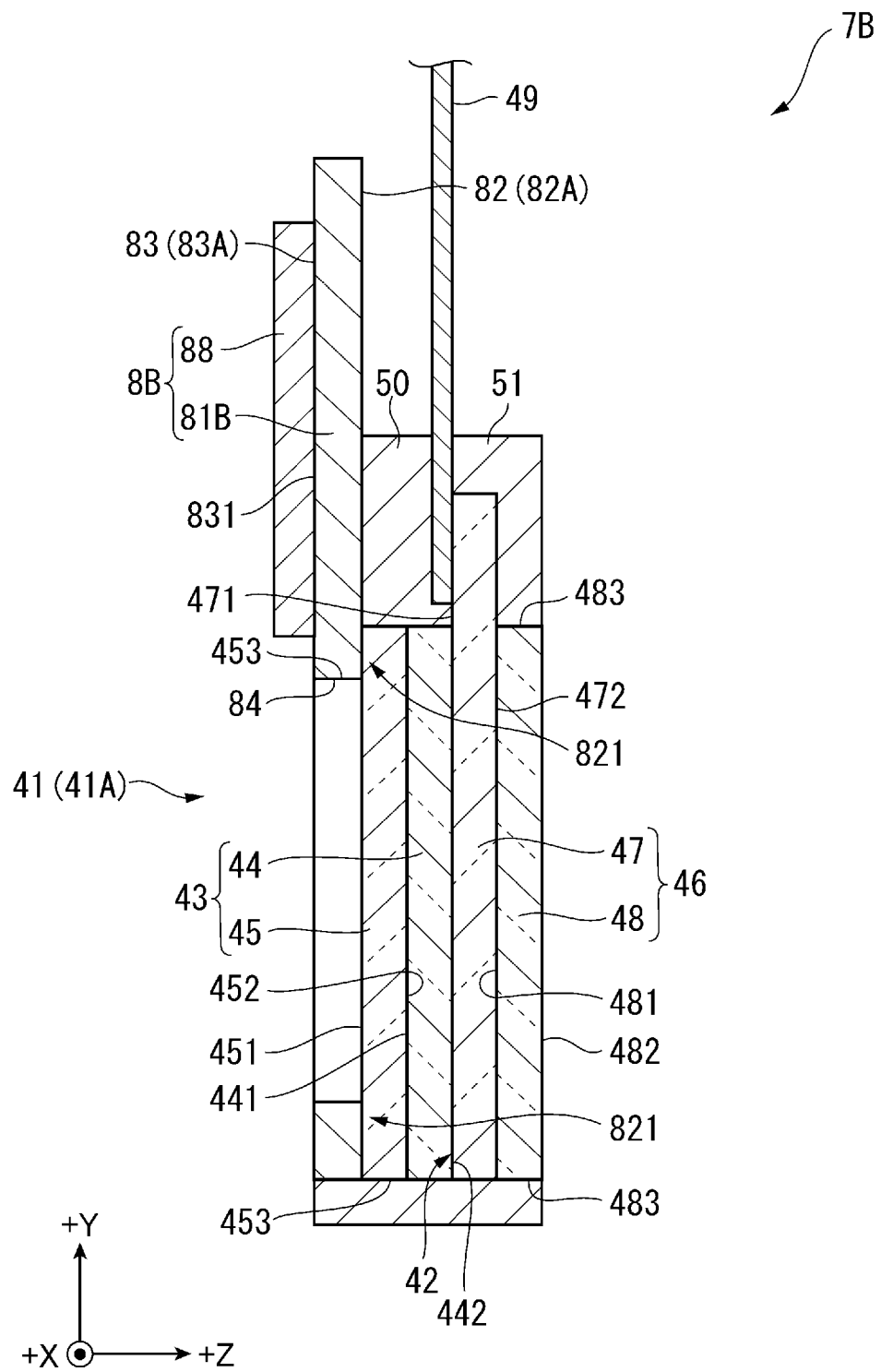
FIG. 18 is a schematic diagram showing a cross section of a modification of the liquid crystal panel according to the fourth embodiment.

FIG. 18 is a diagram schematically showing a cross section along a YZ plane of a liquid crystal panel 7B, which is a modification of the liquid crystal panel 7A.

For example, the liquid crystal panel 7B shown in FIG. 18 may be adopted instead of the liquid crystal panel 7A.

The liquid crystal panel 7B includes the same components and the same functions as the components and the functions of the liquid crystal panel 7A except that the liquid crystal panel 7B includes an incident side cooling member 8B instead of the incident side cooling member 8A.

That is, the liquid crystal panel 7B includes the panel main body 41, the wire 49, the holding housing 50, the clamping member 51, and the incident side cooling member 8B.

The incident side cooling member 8B includes a main body section 81B and the first heat radiating member 88. The main body section 81B includes the first member 82, the second member 83, and the opening section 84. The first member 82 includes the first surface 82A and the heat receiving section 821. The second member 83 includes the second surface 83A and the first heat radiating section 831.

In the incident side cooling member 8B, the first surface 82A of the first member 82 is not directly coupled to the counter substrate 44 and is coupled to the counter substrate 44 via the holding housing 50 in a heat transferable manner. The first surface 82A is coupled to the light incident surface 451 of the incident side dustproof substrate 45.

That is, in the liquid crystal panel 7B, when viewed from the opposite direction of the traveling direction of the light made incident on the liquid crystal layer 42 (the −Z direction), the area of the incident side dustproof substrate 45 is larger than the area of the opening section 84 of the incident side cooling member 8B.

Accordingly, the incident side dustproof substrate 45 is not disposed on the inner side of the opening section 84. The main body section 81B is provided on the incident side dustproof substrate 45.

Heat transferred to the incident side dustproof substrate 45 is transferred to the first member 82 on the first surface 82A.

That is, a part of the heat receiving section 821 of a main body section 81B is a portion coupled to the light incident surface 451 of the incident side dustproof substrate 45 in the first member 82. Besides, since heat transferred from the liquid crystal layer 42 to the holding housing 50 is transferred via the counter substrate 44 as well, another part of the heat receiving section 821 is a portion coupled to the counter substrate 44 via the holding housing 50 in a heat transferable manner.

In a heat quantity generated by the liquid crystal layer 42, a heat quantity transferred to the incident side dustproof substrate 45 via the counter substrate 44 is larger than a heat quantity transferred to the holding housing 50 via the counter substrate 44. Therefore, the heat receiving section 821 may not be coupled to the holding housing 50 in a heat transferable manner.

Effects of the Second Modification of the Fourth Embodiment

Such a liquid crystal panel 7B achieves the following effects besides achieving the same effects as the effects of the liquid crystal panel 7A explained above.

In the liquid crystal panel 7B, the incident section 43 includes the counter substrate 44 and the incident side dustproof substrate 45.

The counter substrate 44 is a light transmissive incident side electrode substrate that includes a common electrode electrically coupled to the liquid crystal layer 42 and is disposed on the light incident side with respect to the liquid crystal layer 42. The common electrode is equivalent to the incident side electrode. The incident side dustproof substrate 45 is provided on the light incident surface 441 in the counter substrate 44. The light incident surface 441 is equivalent to a surface on the light incident side in the counter substrate 44. The incident side dustproof substrate 45 is an incident side substrate on which the main body section 81B, which is a vapor chamber, is provided.

With such a configuration, the main body section 81B is provided, in a heat transferable manner, on the incident side dustproof substrate 45 provided further on the light incident side than the counter substrate 44. Accordingly, compared with when the main body section 81B is provided on the counter substrate 44 to avoid the incident side dustproof substrate 45, the main body section 81B can be easily coupled to the emission section 46.

Since heat generated by the liquid crystal layer 42 is transferred to the incident side dustproof substrate 45 via the counter substrate 44, the heat of the liquid crystal layer 42 diffuses.

In contrast, since the first member 82 of the main body section 81B is coupled to the light incident surface 451 of the incident side dustproof substrate 45, it is possible to make it easy to transfer the heat of the liquid crystal layer 42 to the heat receiving section 821 in the first member 82.

In the liquid crystal panel 7B, the main body section 81B, which is the vapor chamber, is provided on the light incident surface 451 of the incident side dustproof substrate 45. The light incident surface 451 is equivalent to the surface on the light incident side of the incident side dustproof substrate 45.

With such a configuration, for example, compared with when the incident side dustproof substrate 45 is disposed in the opening section 84 corresponding to the pixel region 41A, even when tolerance occurs in the main body section 81B, which is the vapor chamber, the main body section 81B can be easily attached to the incident section 43.

Third Modification of the Fourth Embodiment

In the liquid crystal panel 7A, the heat receiving section 821 of the incident side cooling member 8A is coupled to the light incident surface 441 of the counter substrate 44 and the side surface 453 of the incident side dustproof substrate 45 in a heat transferable manner. In the liquid crystal panel 7B, the heat receiving section 821 is directly coupled to the light incident surface 451 of the incident side dustproof substrate 45. However, the coupling portions to the counter substrate 44 and the incident side dustproof substrate 45 in the heat receiving section 821 are not limited to the above.

Figure 19:
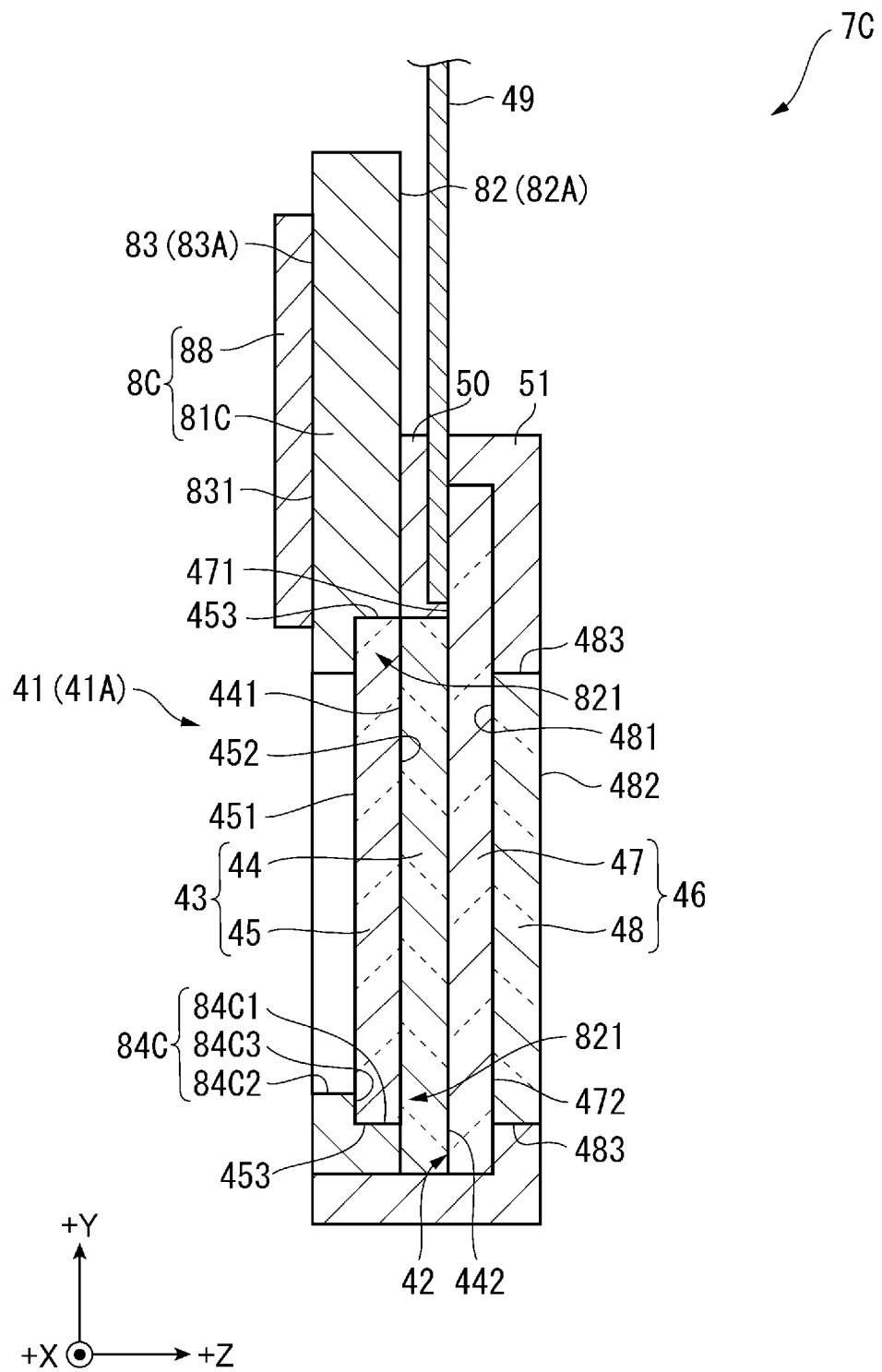
FIG. 19 is a schematic diagram showing a cross section of a modification of the liquid crystal panel according to the fourth embodiment.

FIG. 19 is a diagram schematically showing a cross section along a YZ plane of a liquid crystal panel 7C, which is a modification of the liquid crystal panel 7A.

For example, the liquid crystal panel 7C shown in FIG. 19 may be adopted instead of the liquid crystal panel 7A.

The liquid crystal panel 7C includes the same components and the same functions as the components and the functions of the liquid crystal panel 7A except that the liquid crystal panel 7C includes an incident side cooling member 8C instead of the incident side cooling member 8A. That is, the liquid crystal panel 7C includes the panel main body 41, the wire 49, the holding housing 50, the clamping member 51, and the incident side cooling member 8C.

Like the incident side cooling member 8A, the incident side cooling member 8C vaporizes the coolant in the liquid phase into the coolant in the gas phase with heat transferred from the counter substrate 44 and the incident side dustproof substrate 45 and radiates heat received from the coolant in the gas phase to the outside. The incident side cooling member 8C includes the same components and the same functions as the components and the functions of the incident side cooling member 8A except that the incident side cooling member 8C includes a main body section 81C instead of the main body section 81A. That is, the incident side cooling member 8C includes the main body section 81C and the first heat radiating member 88.

Like the main body section 81A, the main body section 81C includes the first member 82 and the second member 83 and is configured by combining the first member 82 and the second member 83. The first member 82 includes the first surface 82A and the heat receiving section 821. The second member 83 includes the second surface 83A and the first heat radiating section 831.

The main body section 81C includes an opening section 84C.

The opening section 84C is a two tier hole like the opening section 64C and includes a first opening section 84C1 provided on the light emission side (in the +Z direction) and a second opening section 84C2 provided on the light incident side (in the −Z direction).

The inner diameter of the first opening section 84C1 is larger than the inner diameter of the second opening section 84C2. The incident side dustproof substrate 45 is disposed on the inside of the first opening section 84C1. The side surface 453 of the incident side dustproof substrate 45 is coupled to the inner circumferential surface of the first opening section 84C1 via a thermally conductive adhesive or the like in a heat transferable manner.

A coupling section 84C3 coupling the inner circumferential surface of the first opening section 84C1 and the inner circumferential surface of the second opening section 84C2 is substantially parallel to a surface orthogonal to a traveling direction of light passing through the incident side dustproof substrate 45 (the +Z direction). A part of the light incident surface 451 of the incident side dustproof substrate 45 is coupled to the coupling section 84C3 in a heat transferable manner. In other words, the main body section 81C includes a step section formed by the first opening section 84C1, the coupling section 84C3, and the second opening section 84C2. The inner circumferential surface of the first opening section 84C1 is equivalent to the inner circumferential surface of the step section. The coupling section 84C3 is equivalent to the bottom surface of the step section.

In the main body section 81C, coupling portions to the counter substrate 44 and the incident side dustproof substrate 45 are parts of the heat receiving section 821. Accordingly, the inner circumferential surface of the first opening section 84C1 and the coupling section 84C3 are parts of the heat receiving section 821.

Effects of the Third Modification of the Fourth Embodiment

Such a liquid crystal panel 7C achieves the following effects besides achieving the same effects as the effects of the liquid crystal panels 7A and 7B explained above.

In the liquid crystal panel 7C, the incident side dustproof substrate 45 includes the side surface 453 that couples the light incident surface 451 and the light emission surface 452. The light incident surface 451 is equivalent to the surface on the light incident side in the incident side dustproof substrate 45. The light emission surface 452 is equivalent to the surface on the light emission side in the incident side dustproof substrate 45.

The inner circumferential surface of the first opening section 84C1 of the main body section 81C is coupled to at least a part of the side surface 453 in the incident side dustproof substrate 45 in a heat transferable manner. The coupling section 84C3 of the main body section 81C is coupled to the light incident surface 451 of the incident side dustproof substrate 45 in a heat transferable manner. That is, the inner circumferential surface of the first opening section 84C1 and the coupling section 84C3 are parts of the heat receiving section 821.

With such a configuration, the heat of the liquid crystal layer 42 transferred to the incident side dustproof substrate 45 can be received by the inner circumferential surface of the first opening section 84C1 and the coupling section 84C3.

Accordingly, compared with when a main body section, which is a vapor chamber, is provided on the light incident surface 451 in the incident side dustproof substrate 45, it is possible to prevent the dimension of the liquid crystal panel 7C in a light passing direction (the +Z direction) from increasing.

In the liquid crystal panel 7C, the heat receiving section 821 is coupled to the counter substrate 44 in a heat transferable manner.

With such a configuration, not only heat is transferred from the side surface 453 of the incident side dustproof substrate 45 but also heat is transferred from the counter substrate 44 to the heat receiving section 821. Accordingly, it is possible to make it easy to transfer the heat of the liquid crystal layer 42 to the heat receiving section 821. Therefore, it is possible to improve cooling efficiency of the liquid crystal layer 42.

In the liquid crystal panel 7C, the first member 82 including the heat receiving section 821 and the counter substrate 44 may not be coupled in a heat transferable manner. In this case, the main body section 81C may be fixed to the incident side dustproof substrate 45.

Fifth Embodiment

A fifth embodiment of the present disclosure is explained.

A projector according to this embodiment has the same configuration as the configuration of the projector according to the fourth embodiment but is different in the position of a first heat radiating member in an incident side cooling member of a liquid crystal panel. In the following explanation, the same or substantially the same portions as the portions explained above are denoted by the same reference numerals and signs and explanation of the portions is omitted.

Figure 20:
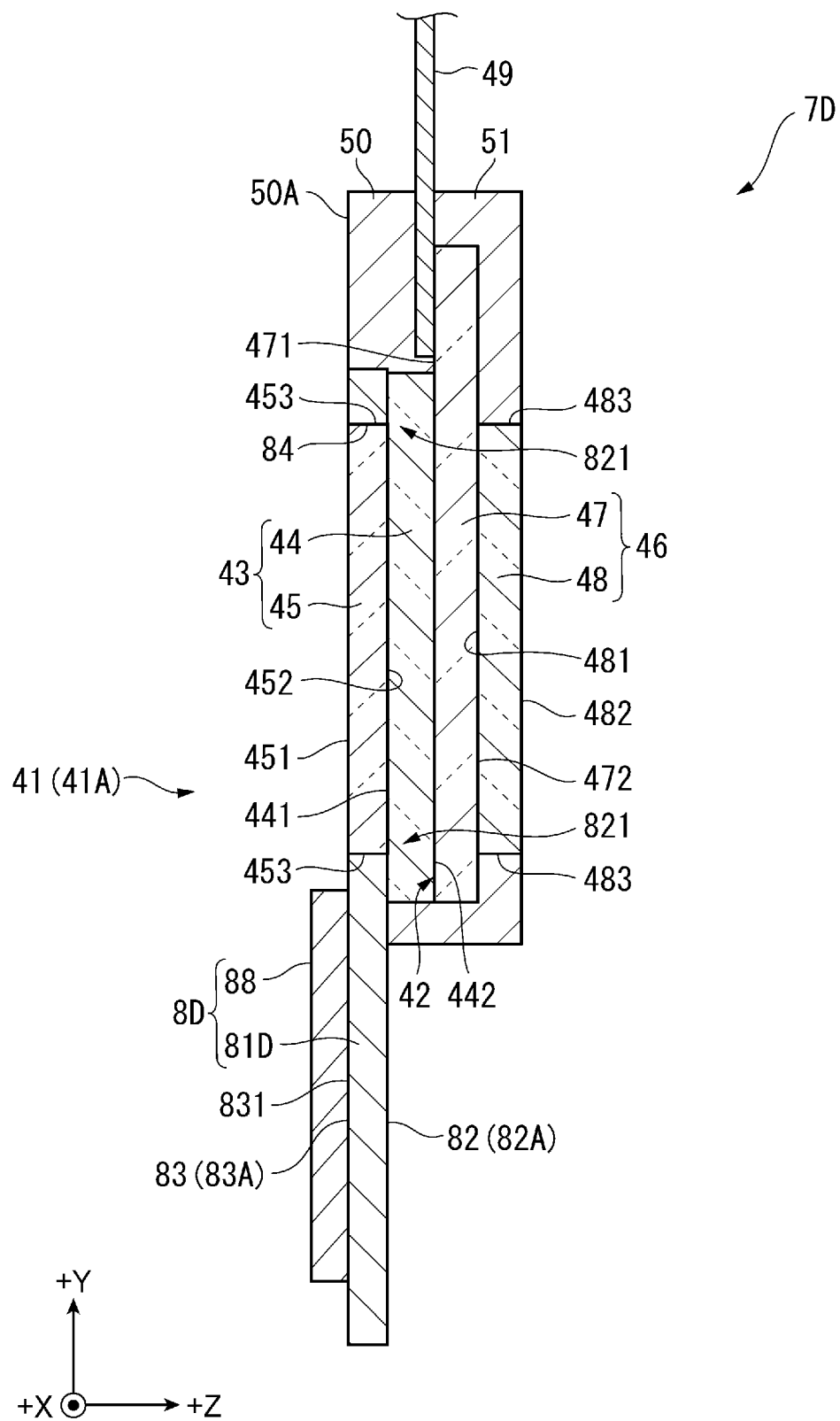
FIG. 20 is a schematic diagram showing a cross section of a liquid crystal panel included in a projector according to a fifth embodiment.

FIG. 20 is a schematic diagram schematically showing a cross section along a YZ plane of a liquid crystal panel 7D included in the projector according to this embodiment.

The projector according to this embodiment includes the same components and the same functions as the components and the functions of the projector according to this embodiment except that the projector according to this embodiment includes the liquid crystal panel 7D shown in FIG. 20 instead of the liquid crystal panel 7A according to the fourth embodiment.

The liquid crystal panel 7D includes the same components as the components of the liquid crystal panel 7A according to the fourth embodiment except that the liquid crystal panel 7D includes an incident side cooling member 8D instead of the incident side cooling member 8A. That is, the liquid crystal panel 7D includes the panel main body 41, the wire 49, the holding housing 50, the clamping member 51, and the incident side cooling member 8D.

Like the incident side cooling member 8A, the incident side cooling member 8D vaporizes a coolant in a liquid phase encapsulated on the inside using the heat of the liquid crystal layer 42 transferred from the counter substrate 44 and the incident side dustproof substrate 45, cools the liquid crystal layer 42, and radiates heat received from the coolant in a gas phase. The incident side cooling member 8D includes the main body section 81D and the first heat radiating member 88.

The main body section 81D includes the first member 82 and the second member 83 and is configured by combining the first member 82 and the second member 83. The main body section 81D includes the opening section 84.

The main body section 81D extends from the opening section 84 in the −Y direction, which is the opposite direction of an extending direction of the wire 49 from the liquid crystal layer 42. Accordingly, on the second surface 83A of the second member 83, the first heat radiating section 831 is provided in the −Y direction with respect to the opening section 84. The first heat radiating member 88 is provided in a position corresponding to the first heat radiating section 831 on the second surface 83A.

The incident side dustproof substrate 45 is disposed on the inside of the opening section 84. The inner circumferential surface of the opening section 84 and the side surface 453 of the incident side dustproof substrate 45 are coupled by a thermally conductive adhesive or the like in a heat transferable manner.

That is, in the main body section 81D, the heat receiving section 821 is coupled to the light incident surface 451 of the counter substrate 44 and coupled to the side surface 453 of the incident side dustproof substrate 45 in a heat transferable manner.

Flow of a Cooling Gas Flowing to the Liquid Crystal Panel

A cooling gas circulated by a fan of a cooling device disposed in the exterior housing 2 flows in the +Y direction with respect to the liquid crystal panel 7D.

The cooling gas flowing in a space on a light incident side with respect to the liquid crystal panel 7D flows in the +Y direction and cools the first heat radiating member 88 and the incident side dustproof substrate 45 and, thereafter, cools the holding housing 50.

The cooling gas flowing in a space on a light emission side with respect to the liquid crystal panel 7D flows in the +Y direction and cools the emission side dustproof substrate 48 and, thereafter, cools the clamping member 51.

In this way, in the liquid crystal panel 7D, the cooling gas flows to the incident side dustproof substrate 45, the emission side dustproof substrate 48, the holding housing 50, the clamping member 51, and the first heat radiating member 88. Consequently, the heat of the liquid crystal layer 42 is transferred to the cooling gas, the liquid crystal layer 42 is cooled, and the driver circuit 491 is cooled.

In the liquid crystal panel 7D, the first heat radiating section 831 and the first heat radiating member 88 are provided in the −Y direction with respect to the opening section 84. Accordingly, when the liquid crystal panel 7D is disposed such that the −Y direction is the vertical direction upper side, the coolant in the liquid phase condensed by the first condensing section corresponding to the first heat radiating section 831 can be transported to, by not only the capillarity but also the gravity, vaporizing sections corresponding to a coupling portion to the counter substrate 44 and a coupling portion to the incident side dustproof substrate 45 in the heat receiving section 821.

Consequently, the change from the coolant in the liquid phase to the coolant in the gas phase in the vaporizing sections can be accelerated by the heat transferred from the liquid crystal layer 42 via the counter substrate 44 and the incident side dustproof substrate 45. That is, it is possible to improve heat radiation efficiency of the heat of the liquid crystal layer 42 and cooling efficiency of the liquid crystal layer 42.

Effects of the Fifth Embodiment

The projector according to this embodiment explained above achieves the following effects besides achieving the same effects as the effects of the projector according to the fourth embodiment. That is, the liquid crystal panel 7D according to this embodiment achieves the following effects besides achieving the same effects as the effects of the liquid crystal panel 7A according to the fourth embodiment.

The liquid crystal panel 7D includes the wire 49 that supplies an image signal to the liquid crystal layer 42. The main body section 81D, which is a vapor chamber, extends from the opening section 84 in the −Y direction. The −Y direction is the opposite direction of the extending direction of the wire 49 from the liquid crystal layer 42.

With such a configuration, since it is possible to prevent the wire 49 and the main body section 81D from interfering with each other, it is possible to prevent heat radiation by the main body section 81D from being hindered by the wire 49.

First Modification of the Fifth Embodiment

In the liquid crystal panel 7D, the side surface 453 of the incident side dustproof substrate 45 is coupled to the inner circumferential surface of the opening section 84, which is a part of the heat receiving section 821, via the thermally conducive adhesive in a heat transferable manner.

However, not only this, but the side surface 453 and the inner circumferential surface of the opening section 84 may not be coupled in a heat transferable manner. The side surface 453 and the inner circumferential surface of the opening section 84 may be coupled via a heat transfer member such as a leaf spring in a heat transferable manner.

Besides, the entire side surface 453 is not always coupled to the inner circumferential surface of the opening section 84 in a heat transferable manner. A part of the side surface 453 may be coupled to the inner circumferential surface of the opening section 84 in a heat transferable manner.

Second Modification of the Fifth Embodiment

In the liquid crystal panel 7D, the heat receiving section 821 is directly coupled to the light incident surface 441 of the counter substrate 44 and coupled to the side surface 453 of the incident side dustproof substrate 45 via the thermally conductive adhesive or the like in a heat transferable manner.

However, not only this, but the heat receiving section 821 may be directly coupled to the incident side dustproof substrate 45 and may not be directly coupled to the counter substrate 44. For example, a heat transfer member capable of transferring heat from the counter substrate 44 to the heat receiving section 821 may be provided between the counter substrate 44 and the heat receiving section 821.

Figure 21:
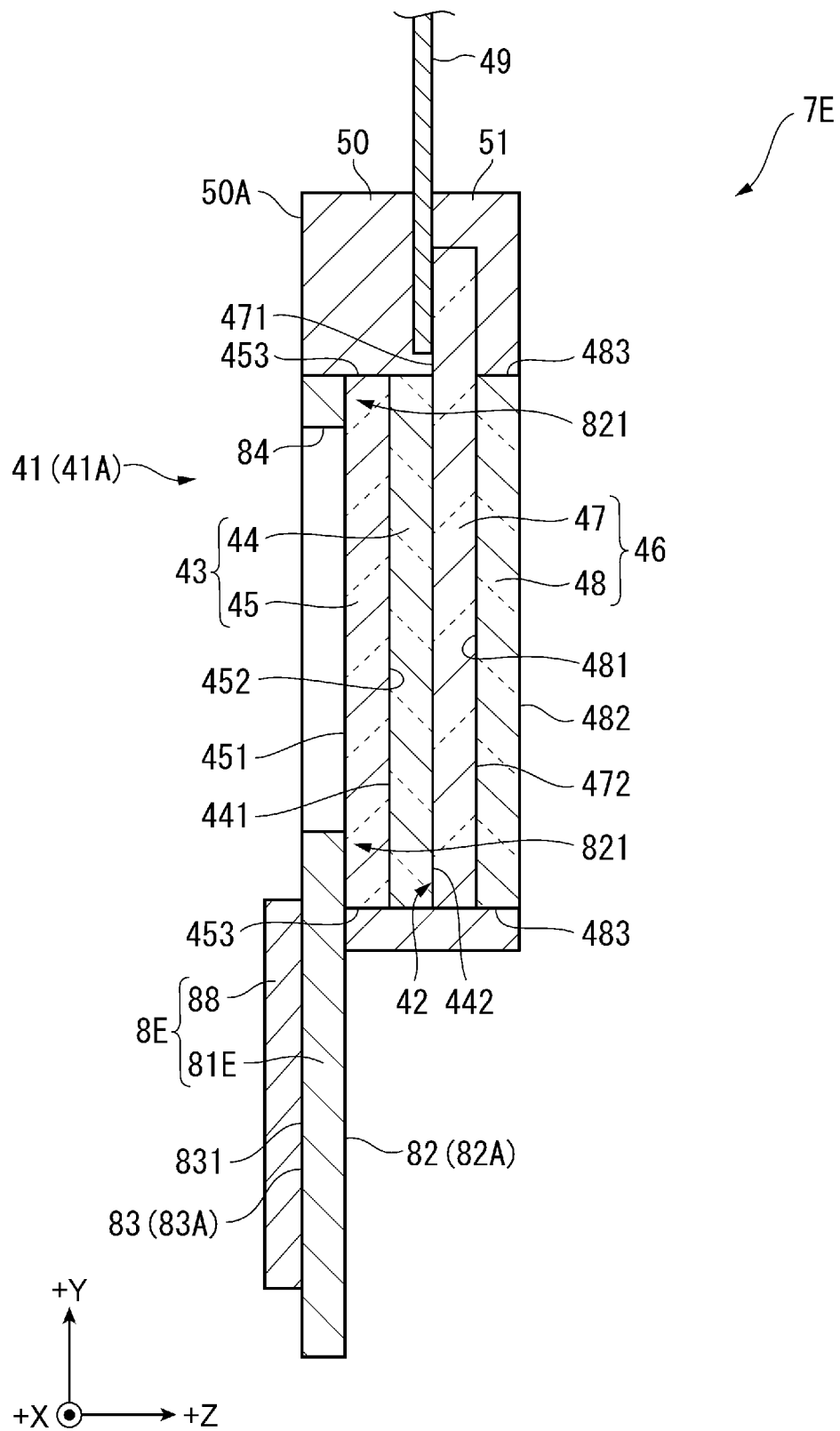
FIG. 21 is a schematic diagram showing a cross section of a modification of the liquid crystal panel according to the fifth embodiment.

FIG. 21 is a diagram schematically showing a cross section along a YZ plane of a liquid crystal panel 7E, which is a modification of the liquid crystal panel 7D.

For example, the liquid crystal panel 7E shown in FIG. 21 may be adopted instead of the liquid crystal panel 7D.

The liquid crystal panel 7E includes the same components and the same functions as the components and the functions of the liquid crystal panel 7D except that the liquid crystal panel 7E includes an incident side cooling member 8E instead of the incident side cooling member 8D. That is, the liquid crystal panel 7E includes the panel main body 41, the wire 49, the holding housing 50, the clamping member 51, and the incident side cooling member 8E.

The incident side cooling member 8E includes a main body section 81E and the first heat radiating member 88. Like the main body section 81D, the main body section 81E includes the first member 82, the second member 83, and the opening section 84. The first member 82 includes the first surface 82A and the heat receiving section 821. The second member 83 includes the second surface 83A and the first heat radiating section 831. Like the main body section 81D, the main body section 81E extends from the opening section 84 in the −Y direction, which is the opposite direction of the extending direction of the wire 49 from the liquid crystal layer 42.

In the incident side cooling member 8E, the first surface 82A of the first member 82 is not directly coupled to the counter substrate 44 and is coupled to the counter substrate 44 via the holding housing 50 in a heat transferable manner. The main body section 81E is provided on the incident side dustproof substrate 45. The first surface 82A is directly coupled to the light incident surface 451 of the incident side dustproof substrate 45.

That is, the incident side cooling member 8E is provided on the incident side dustproof substrate 45 such that a circumferential portion of the opening section 84 on the first surface 82A is coupled to the light incident surface 451.

In other words, a part of the heat receiving section 821 provided around the opening section 84 is coupled to the light incident surface 451 of the incident side dustproof substrate 45 in a heat transferable manner. Another part of the heat receiving section 821 is coupled to the counter substrate 44 via the holding housing 50 in a heat transferable manner. Heat transferred from the liquid crystal layer 42 to the holding housing 50 is transferred via the pixel substrate 47 as well.

In a heat quantity generated by the liquid crystal layer 42, a heat quantity transferred to the incident side dustproof substrate 45 via the counter substrate 44 is larger than a heat quantity transferred to the holding housing 50 via the counter substrate 44 and the pixel substrate 47.

Accordingly, the heat receiving section 821 may not be coupled to the holding housing 50 in a heat transferable manner.

Such a liquid crystal panel 7E achieves the same effects as the effects of the liquid crystal panels 7B and 7D explained above.

Third Modification of the Fifth Embodiment

In the liquid crystal panel 7D, the heat receiving section 821 of the incident side cooling member 8D is coupled to the light incident surface 441 of the counter substrate 44 and the side surface 453 of the incident side dustproof substrate 45 in a heat transferable manner. In the liquid crystal panel 7E, the heat receiving section 821 is directly coupled to the light incident surface 451 of the incident side dustproof substrate 45.

However, in the heat receiving section 821, the coupling portions to the counter substrate 44 and the incident side dustproof substrate 45 are not limited to the above.

Figure 22:
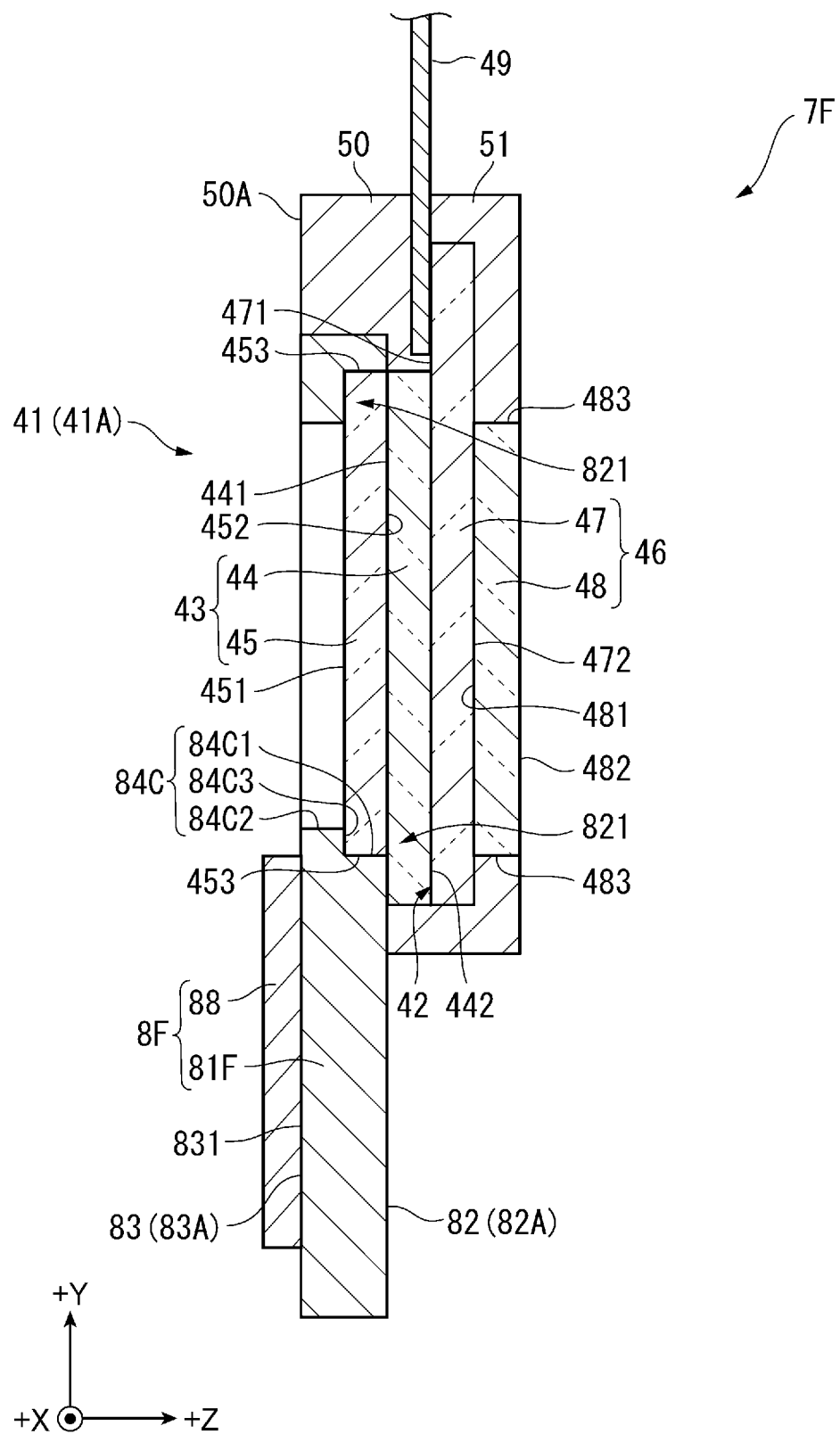
FIG. 22 is a schematic diagram showing a cross section of a modification of the liquid crystal panel according to the fifth embodiment.

FIG. 22 is a diagram schematically showing a cross section along a YZ plane of a liquid crystal panel 7F, which is a modification of the liquid crystal panel 7D.

For example, the liquid crystal panel 7F shown in FIG. 22 may be adopted instead of the liquid crystal panel 7D.

The liquid crystal panel 7F includes the same components and the same functions as the components and the functions of the liquid crystal panel 7D except that the liquid crystal panel 7F includes an incident side cooling member 8F instead of the incident side cooling member 8D. That is, the liquid crystal panel 7F includes the panel main body 41, the wire 49, the holding housing 50, the clamping member 51, and the incident side cooling member 8F.

Like the incident side cooling member 8D, the incident side cooling member 8F vaporizes the coolant in the liquid phase into the coolant in the gas phase with heat transferred from the counter substrate 44 and the incident side dustproof substrate 45 and radiates heat received from the coolant in the gas phase to the outside. The incident side cooling member 8F includes the same components and the same functions as the components and the functions of the incident side cooling member 8D except that the incident side cooling member 8F includes a main body section 81F instead of the main body section 81D. That is, the incident side cooling member 8F includes the main body section 81F and the first heat radiating member 88.

The main body section 81F includes the first member 82, the second member 83, and the opening section 84C. Like the main body section 81D, the main body section 81F extends from the opening section 84C in the −Y direction, which is the opposite direction of the extending direction of the wire 49 from the liquid crystal layer 42.

As explained in the third modification of the fourth embodiment, the opening section 84C is the two tier hole including the first opening section 84C1 provided on the light emission side and the second opening section 84C2 provided on the light incident side. The inner diameter of the first opening section 84C1 is larger than the inner diameter of the second opening section 84C2. The incident side dustproof substrate 45 is disposed on the inside of the first opening section 84C1. The side surface 453 of the incident side dustproof substrate 45 is coupled to the inner circumferential surface of the first opening section 84C1 via a thermally conductive adhesive or the like in a heat transferable manner. A part of the light incident surface 451 of the incident side dustproof substrate 45 is coupled to the coupling section 84C3 in a heat transferable manner.

In other words, the main body section 81F includes a step section formed by the first opening section 84C1, the coupling section 84C3, and the second opening section 84C2. The inner circumferential surface of the first opening section 84C1 is equivalent to the inner circumferential surface of the step section. The coupling section 84C3 is equivalent to the bottom surface of the step section.

In the main body section 81F, the coupling portions to the counter substrate 44 and the incident side dustproof substrate 45 are parts of the heat receiving section 821. Accordingly, the inner circumferential surface of the first opening section 84C1 and the coupling section 84C3 are parts of the heat receiving section 821.

Such a liquid crystal panel 7F achieves the same effects as the effects of the liquid crystal panels 7C and 7D explained above.

In the liquid crystal panel 7F, as in the liquid crystal panel 7C, the first member 82 including the heat receiving section 821 and the counter substrate 44 may not be coupled in a heat transferable manner. In this case, the main body section 81F may be fixed to the incident side dustproof substrate 45.

Sixth Embodiment

A sixth embodiment of the present disclosure is explained.

A projector according to this embodiment has the same configuration as the configuration of the projector according to the fourth embodiment but is different in that a main body section of an incident side cooling member included in a liquid crystal panel extends in an extending direction of the wire 49 from an opening section and extends in the opposite direction of the extending direction of the wire 49 from the opening section.

In the following explanation, the same or substantially the same portions as the portions explained above are denoted by the same reference numerals and signs and explanation of the portions is omitted.

Figure 23:
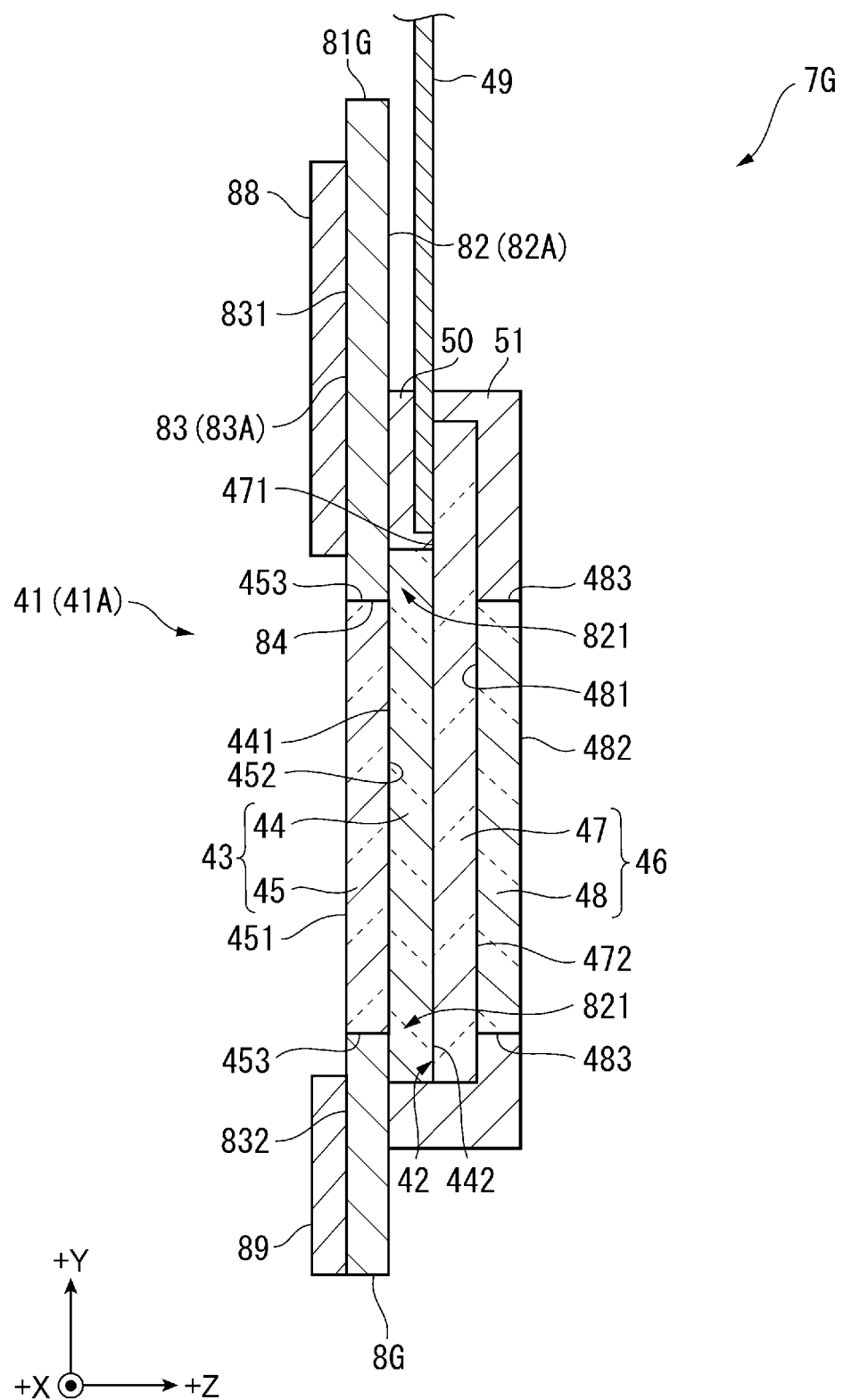
FIG. 23 is a schematic diagram showing a cross section of a liquid crystal panel included in a projector according to a sixth embodiment.

FIG. 23 is a diagram schematically showing a cross section along a YZ plane of a liquid crystal panel 7G included in the projector according to this embodiment.

The projector according to this embodiment includes the same components and the same functions as the components and the functions of the projector according to the fourth embodiment except that the projector according to this embodiment includes the liquid crystal panel 7G shown in FIG. 23 instead of the liquid crystal panel 7A according to the fourth embodiment.

The liquid crystal panel 7G includes the same components as the components of the liquid crystal panel 7A according to the fourth embodiment except that the liquid crystal panel 7G includes an incident side cooling member 8G instead of the incident side cooling member 8A. That is, the liquid crystal panel 7G includes the panel main body 41, the wire 49, the holding housing 50, the clamping member 51, and the incident side cooling member 8G. The panel main body 41 includes the liquid crystal layer 42, the incident section 43, and the emission section 46. The incident section 43 includes the counter substrate 44 and the incident side dustproof substrate 45. The emission section 46 includes the pixel substrate 47 and the emission side dustproof substrate 48.

The panel main body 41 includes the pixel region 41A configured by the liquid crystal layer 42, the counter substrate 44, and the pixel substrate 47. A plurality of pixels are arrayed in the pixel region 41A.

The incident side cooling member 8G includes the same components as the components of the incident side cooling member 8A except that the incident side cooling member 8G further includes a second heat radiating member 89 and is formed larger in the +Y direction than the incident side cooling member 8A. That is, the incident side cooling member 8G includes a main body section 81G, the first heat radiating member 88, and the second heat radiating member 89.

The main body section 81G includes the first member 82, the second member 83, and the opening section 84. The first member 82 includes the first surface 82A and the heat receiving section 821. The second member 83 includes the second surface 83A, the first heat radiating section 831, and a second heat radiating section 832.

The main body section 81G is configured by combining the first member 82 and the second member 83. The main body section 81G extends from the opening section 84 along the +Y direction, which is the extending direction of the wire 49 from the liquid crystal layer 42, and extends from the opening section 84 along the −Y direction, which is the opposite direction of the extending direction of the wire 49 from the liquid crystal layer 42.

As explained above, the first heat radiating section 831 is disposed in the +Y direction with respect to the opening section 84 in the second member 83. The first heat radiating member 88 is provided in a position corresponding to the first heat radiating section 831 on the second surface 83A of the second member 83.

The second heat radiating section 832 is disposed in the −Y direction with respect to the opening section 84 in the second member 83. The second heat radiating member 89 is provided in a position corresponding to the second heat radiating section 832 on the second surface 83A of the second member 83.

The second heat radiating member 89 radiates, to a cooling gas flowing to the second heat radiating member 89, heat transferred from the second heat radiating section 832. For example, the second heat radiating member 89 may include the same plurality of fins as the plurality of fins 681 or may include a plurality of fins formed in another shape.

Flow of the Cooling Gas Flowing to the Liquid Crystal Panel

The cooling gas circulated by a fan of a cooling device disposed in the exterior housing 2 flows in the +Y direction with respect to the liquid crystal panel 7G.

The cooling gas flowing in a space on a light incident side with respect to the liquid crystal panel 7G flows in the +Y direction and cools the second heat radiating member 89, the incident side dustproof substrate 45, and the first heat radiating member 88 in order.

The cooling gas flowing in a space on a light emission side with respect to the liquid crystal panel 7G flows in the +Y direction and cools the emission side dustproof substrate 48 and, thereafter, cools the clamping member 51.

In this way, the cooling gas flows to the incident side dustproof substrate 45, the emission side dustproof substrate 48, the clamping member 51, the first heat radiating member 88, and the second heat radiating member 89 to which the heat of the liquid crystal layer 42 is transferred. Consequently, the heat of the liquid crystal layer 42 is transferred to the cooling gas, the liquid crystal layer 42 is cooled, and the driver circuit 491 is cooled.

In the liquid crystal panel 7G, the first heat radiating section 831 and the first heat radiating member 88 are provided in the +Y direction with respect to the opening section 84 and the second heat radiating section 832 and the second heat radiating member 89 are provided in the −Y direction with respect to the opening section 84.

Accordingly, when the liquid crystal panel 7G is disposed such that the +Y direction is the vertical direction upper side, a coolant in a liquid phase condensed by the first condensing section corresponding to the first heat radiating section 831 can be transported to, by not only the capillarity but also the gravity, vaporizing sections corresponding to a coupling portion to the counter substrate 44 and a coupling portion to the incident side dustproof substrate 45 in the heat receiving section 821.

When the liquid crystal panel 7G is disposed such that the −Y direction is the vertical direction upper side, the coolant in the liquid phase condensed by the second condensing section corresponding to the second heat radiating section 832 can be transported to, by not only the capillarity but also the gravity, the vaporizing sections corresponding to the coupling portion to the counter substrate 44 and the coupling portion to the incident side dustproof substrate 45 in the heat receiving section 821.

Consequently, a change from the coolant in the liquid phase to the coolant in a gas phase in the vaporizing sections can be accelerated by the heat transferred from the liquid crystal layer 42 via the counter substrate 44 and the incident side dustproof substrate 45.

That is, it is possible to improve heat radiation efficiency of the heat of the liquid crystal layer 42 and cooling efficiency of the liquid crystal layer 42.

Effects of the Sixth Embodiment

The projector according to this embodiment explained above achieves the following effects besides achieving the same effects as the effects of the projector according to the fourth embodiment and the projector according to the fifth embodiment.

That is, the liquid crystal panel 7G according to this embodiment achieves the following effects besides achieving the same effects as the effects of the liquid crystal panel 7A according to the fourth embodiment and the liquid crystal panel 7D according to the fifth embodiment.

The liquid crystal panel 7G includes the wire 49 that supplies an image signal to the liquid crystal layer 42. The main body section 81G, which is a vapor chamber, extends from the opening section 84 in each of the +Y direction and the −Y direction. The +Y direction is equivalent to the extending direction of the wire 49 from the liquid crystal layer 42. The −Y direction is equivalent to the opposite direction of the extending direction of the wire 49 from the liquid crystal layer 42.

With such a configuration, since a heat radiation area of heat received from the coolant in the gas phase can be increased in the main body section 81G, it is possible to make it easy to condense the coolant in the gas phase into the coolant in the liquid phase. Therefore, it is possible to circulate the coolant in the liquid phase to the vaporizing sections without delay and accelerate the vaporization of the coolant in the liquid phase by the heat of the liquid crystal layer 42.

The liquid crystal panel 7G is disposed such that one direction of the +Y direction and the −Y direction is the vertical direction upper side, whereby the condensed coolant in the liquid phase can be transported to, by not only the capillarity but also the gravity, the vaporizing sections that vaporize the coolant in the liquid phase.

Consequently, the change from the coolant in the liquid phase to the coolant in the gas phase by the use of the heat received by the heat receiving section 821 can be accelerated. Therefore, it is possible to improve the heat radiation efficiency of the heat of the liquid crystal layer 42 and the cooling efficiency of the liquid crystal layer 42.

First Modification of the Sixth Embodiment

In the liquid crystal panel 7G, the side surface 453 of the incident side dustproof substrate 45 is coupled to the inner circumferential surface of the opening section 84, which is a part of the heat receiving section 821, via the thermally conductive adhesive in a heat transferable manner.

However, not only this, but the side surface 453 and the inner circumferential surface of the opening section 84 may not be coupled in a heat transferable manner. The side surface 453 and the inner circumferential surface of the opening section 84 may be coupled via a heat transfer member such as a leaf spring in a heat transferable manner.

Besides, the entire side surface 453 is not always coupled to the inner circumferential surface of the opening section 84 in a heat transferable manner. A part of the side surface 453 may be coupled to the inner circumferential surface of the opening section 84 in a heat transferable manner.

Second Modification of the Sixth Embodiment

In the liquid crystal panel 7G, the heat receiving section 821 of the incident side cooling member 8G is directly coupled to the light incident surface 441 of the counter substrate 44 and is coupled to the side surface 453 of the incident side dustproof substrate 45 via the thermally conductive adhesive or the like in a heat transferable manner.

However, not only this, but the heat receiving section 821 may be directly coupled to the incident side dustproof substrate 45 and may not be directly coupled to the counter substrate 44.

For example, a heat transfer member capable of transferring heat from the counter substrate 44 to the heat receiving section 821 may be provided between the counter substrate 44 and the heat receiving section 821.

Figure 24:
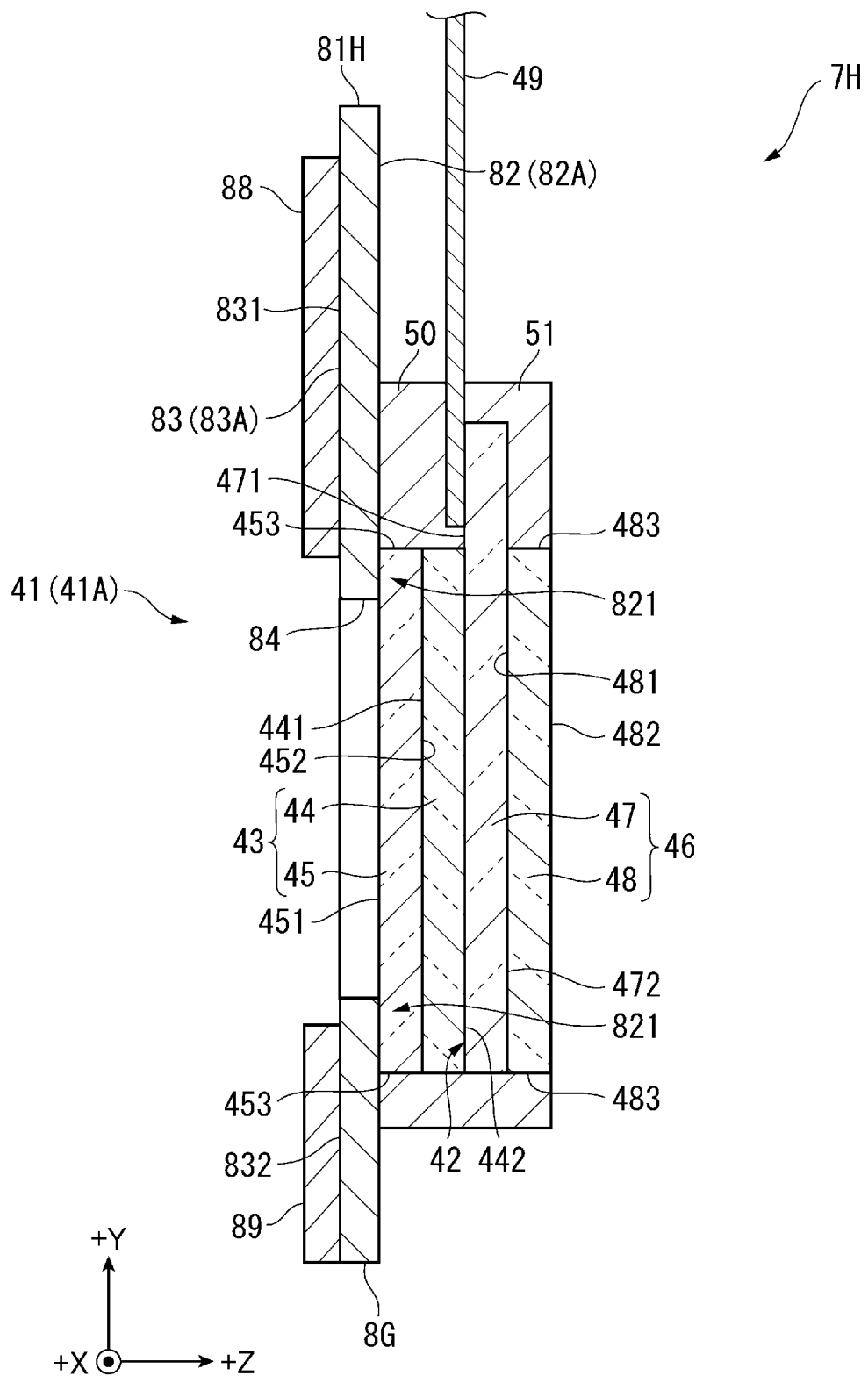
FIG. 24 is a schematic diagram showing a cross section of a modification of the liquid crystal panel according to the sixth embodiment.

FIG. 24 is a diagram schematically showing a cross section along a YZ plane of a liquid crystal panel 7H, which is a modification of the liquid crystal panel 7G.

For example, the liquid crystal panel 7H shown in FIG. 24 may be adopted instead of the liquid crystal panel 7G.

The liquid crystal panel 7H includes the same components and the same functions as the components and the functions of the liquid crystal panel 7G except that the liquid crystal panel 7H includes an incident side cooling member 8H instead of the incident side cooling member 8G. That is, the liquid crystal panel 7H includes the panel main body 41, the wire 49, the holding housing 50, the clamping member 51, and the incident side cooling member 8H.

The incident side cooling member 8H includes a main body section 81H, the first heat radiating member 88, and the second heat radiating member 89. The main body section 81H includes the first member 82, the second member 83, and the opening section 84. The first member 82 includes the first surface 82A and the heat receiving section 821. The second member 83 includes the second surface 83A, the first heat radiating section 831, and the second heat radiating section 832. Like the main body section 81A, the main body section 81H extends from the opening section 84 in the +Y direction, which is the extending direction of the wire 49 from the liquid crystal layer 42. Besides, like the main body section 81D, the main body section 81H extends from the opening section 84 in the −Y direction, which is the opposite direction of the extending direction of the wire 49.

In the incident side cooling member 8H, the first surface 82A of the first member 82 is not directly coupled to the counter substrate 44 and is coupled to the counter substrate 44 via the holding housing 50 in a heat transferable manner. The first surface 82A is coupled to the light incident surface 451 of the incident side dustproof substrate 45.

That is, when viewed from the opposite direction of a traveling direction of light made incident on the liquid crystal layer 42 (the −Z direction), the area of the incident side dustproof substrate 45 is larger than the area of the opening section 84 of the incident side cooling member 8H. Accordingly, the incident side dustproof substrate 45 is not disposed on the inner side of the opening section 84. The first surface 82A is coupled to the light incident surface 451 of the incident side dustproof substrate 45 in a portion around the opening section 84.

That is, the incident side cooling member 8H is provided on the incident side dustproof substrate 45 such that a circumferential portion of the opening section 84 on the first surface 82A is coupled to the light incident surface 451.

In other words, a part of the heat receiving section 821 provided around the opening section 84 is coupled to the light incident surface 451 of the incident side dustproof substrate 45 in a heat transferable manner, another part of the heat receiving section 821 is coupled to the counter substrate 44 via the holding housing 50 in a heat transferable manner, and still another part of the heat receiving section 821 is coupled to the counter substrate 44 via the holding housing 50 in a heat transferable manner.

The heat transferred from the liquid crystal layer 42 to the incident side dustproof substrate 45 via the counter substrate 44 is transferred to the heat receiving section 821.

As explained above, in a heat quantity generated by the liquid crystal layer 42, a heat quantity transferred to the incident side dustproof substrate 45 via the counter substrate 44 is larger than a heat quantity transferred to the holding housing 50 via the counter substrate 44. Accordingly, the heat receiving section 821 may not be coupled to the holding housing 50 in a heat transferable manner.

Such a liquid crystal panel 7H achieves the same effects as the effects of the liquid crystal panels 7B, 7E, and 7G explained above.

Third Modification of the Sixth Embodiment

In the liquid crystal panel 7G, the heat receiving section 821 of the incident side cooling member 8G is coupled to the light incident surface 441 of the counter substrate 44 and the side surface 453 of the incident side dustproof substrate 45 in a heat transferable manner. In the liquid crystal panel 7H, the heat receiving section 821 is coupled to the light incident surface 451 of the incident side dustproof substrate 45 in a heat transferable manner.

However, in the heat receiving section 821, the coupling portions to the counter substrate 44 and the incident side dustproof substrate 45 are not limited to the above.

Figure 25:
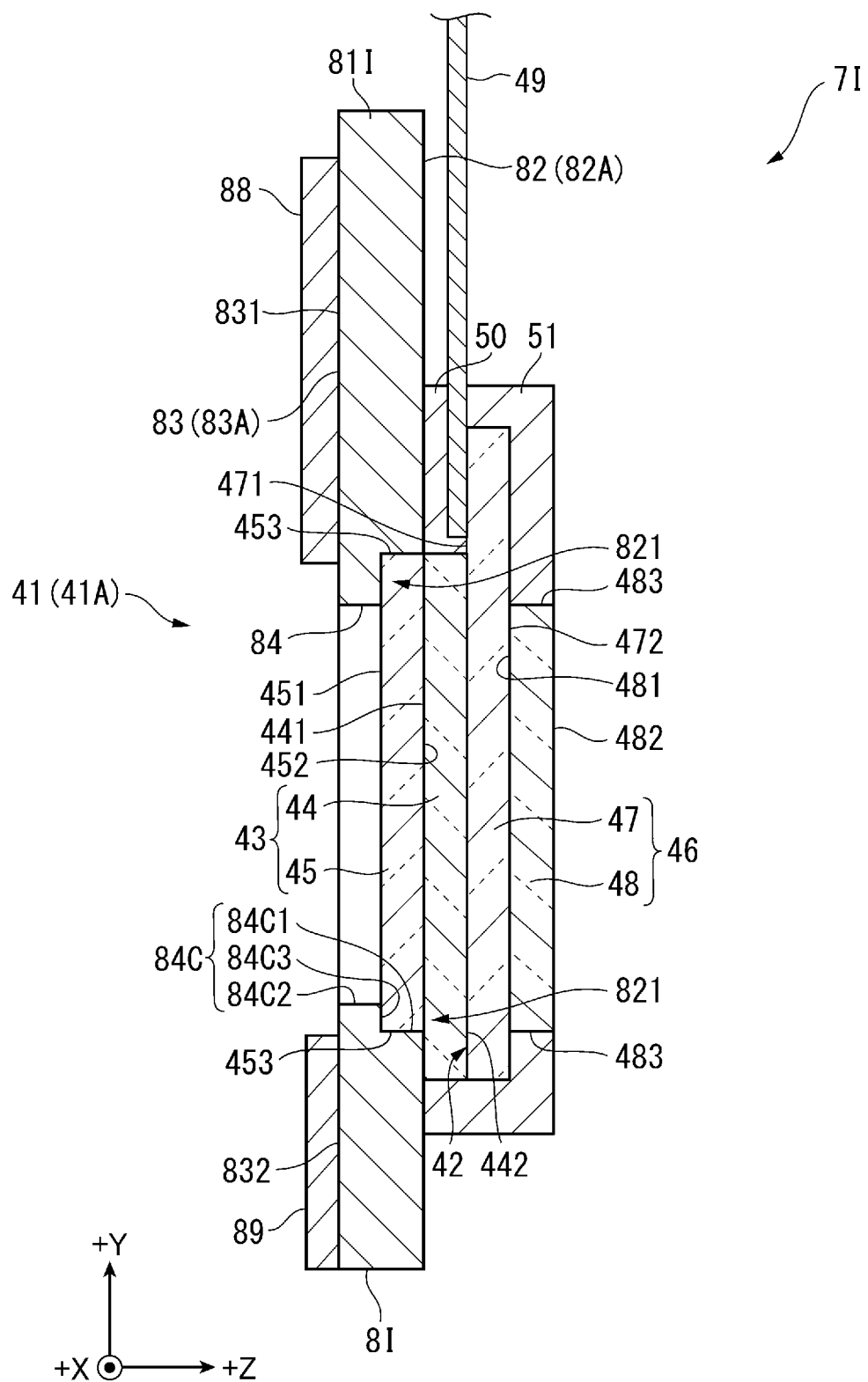
FIG. 25 is a schematic diagram showing a cross section of a modification of the liquid crystal panel according to the sixth embodiment.

FIG. 25 is a diagram schematically showing a cross section along a YZ plane of a liquid crystal panel 7I, which is a modification of the liquid crystal panel 7G.

For example, the liquid crystal panel 7I shown in FIG. 25 may be adopted instead of the liquid crystal panel 7G.

The liquid crystal panel 7I includes the same components and the same functions as the components and the functions of the liquid crystal panel 7G except that the liquid crystal panel 7I includes an incident side cooling member 8I instead of the incident side cooling member 8G. That is, the liquid crystal panel 7I includes the panel main body 41, the wire 49, the holding housing 50, the clamping member 51, and the incident side cooling member 8I.

Like the incident side cooling member 8G, the incident side cooling member 8I vaporizes the coolant in the liquid phase into the coolant in the gas phase with heat transferred from the counter substrate 44 and the incident side dustproof substrate 45 and radiates heat received from the coolant in the gas phase to the outside. The incident side cooling member 8I includes the same components and the same functions as the components and the functions of the incident side cooling member 8G except that the incident side cooling member 8I includes a main body section 81I instead of the main body section 81G.

That is, the incident side cooling member 8I includes the main body section 81I, the first heat radiating member 88, and the second heat radiating member 89.

Like the main body section 81G, the main body section 81I includes the first member 82 and the second member 83 and is configured by combining the first member 82 and the second member 83. The main body section 81I is provided on the counter substrate 44 such that the first surface 82A of the first member 82 is in contact with the light incident surface 441 of the counter substrate 44.

That is, a part of the heat receiving section 821 of the main body section 81I is coupled to the counter substrate 44 in a heat transferable manner.

The main body section 81I includes the opening section 84C.

As explained in the third modification of the fourth embodiment, the opening section 84C is the two tier hole including the first opening section 84C1 provided on the light emission side and the second opening section 84C2 provided on the light incident side. The incident side dustproof substrate 45 is disposed on the inside of the first opening section 84C1. The side surface 453 of the incident side dustproof substrate 45 is coupled to the inner circumferential surface of the first opening section 84C1 via the thermally conductive adhesive or the like in a heat transferable manner. A part of the light incident surface 451 of the incident side dustproof substrate 45 is coupled to the coupling section 84C3 in a heat transferable manner.

In other words, the main body section 81I includes a step section formed by the first opening section 84C1, the coupling section 84C3, and the second opening section 84C2. The inner circumferential surface of the first opening section 84C1 is equivalent to the inner circumferential surface of the step section. The coupling section 84C3 is equivalent to the bottom surface of the step section.

In the main body section 81I, the coupling portions to the counter substrate 44 and the incident side dustproof substrate 45 are parts of the heat receiving section 821. Accordingly, the inner circumferential surface of the first opening section 84C1 and the coupling section 84C3 are parts of the heat receiving section 821.

Like the main body section 81G, the main body section 81I extends from the opening section 84C in the +Y direction, which is the extending direction of the wire 49 from the liquid crystal layer 42, and extends from the opening section 84C in the −Y direction, which is the opposite direction of the extending direction of the wire 49 from the liquid crystal layer 42. The first heat radiating section 831 and the first heat radiating member 88 are provided in the +Y direction with respect to the opening section 84C on the second surface 83A. The second heat radiating section 832 and the second heat radiating member 89 are provided in the −Y direction with respect to the opening section 84C on the second surface 83A.

Such a liquid crystal panel 7I achieves the same effects as the effects of the liquid crystal panels 7C, 7F, and 7G explained above.

In the liquid crystal panel 7I, as in the liquid crystal panels 7C and 7F, the first member 82 including the heat receiving section 821 and the counter substrate 44 may not be coupled in a heat transferable manner. In this case, the main body section 81I may be fixed to the incident side dustproof substrate 45.

Seventh Embodiment

A seventh embodiment of the present disclosure is explained.

A projector according to this embodiment has the same configuration as the configuration of the projector according to the first embodiment but is different in that a liquid crystal panel includes an incident side cooling member and an emission side cooling member. In the following explanation, the same or substantially the same portions as the portions explained above are denoted by the same reference numerals and signs and explanation of the portions is omitted.

Figure 26:
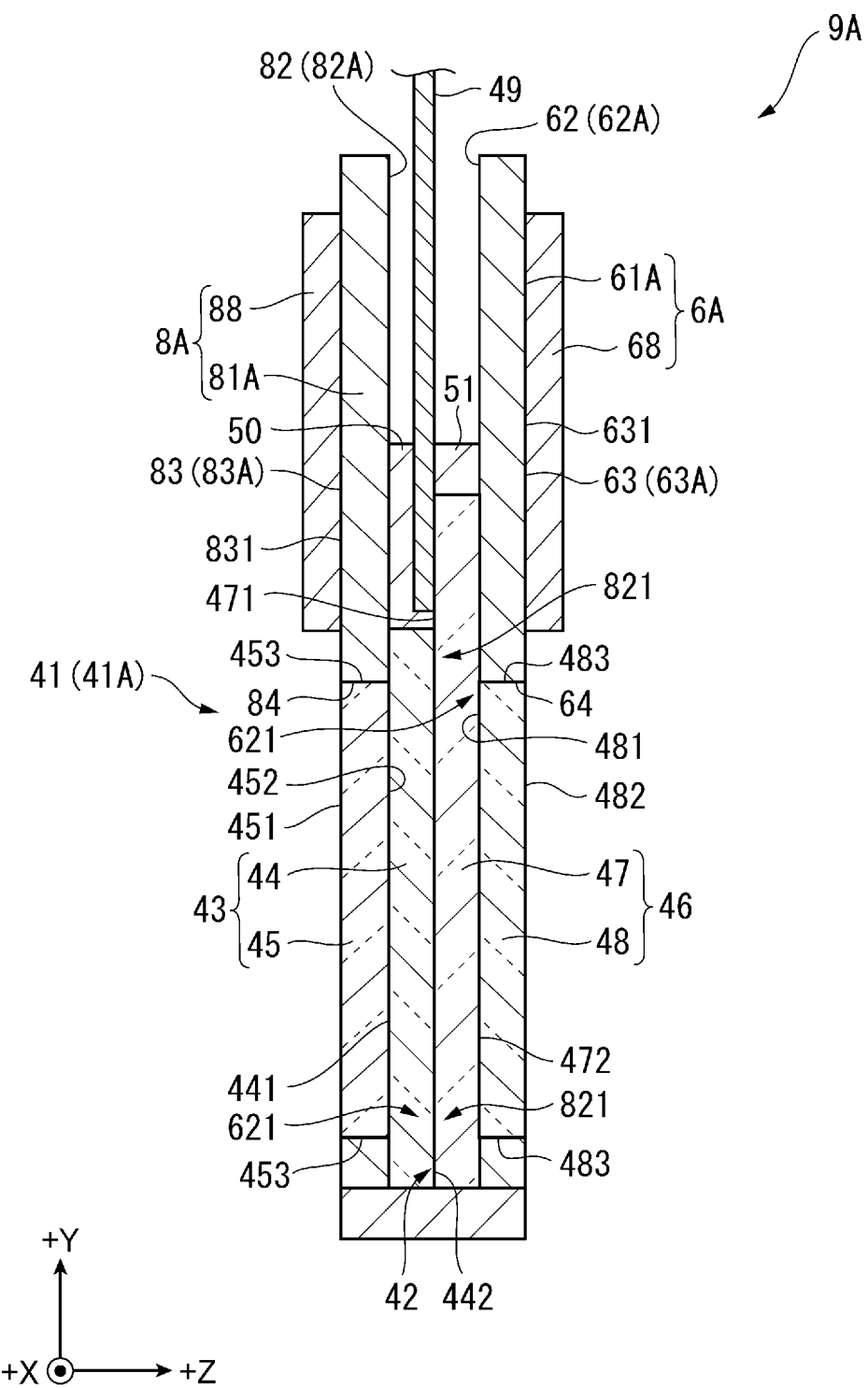
FIG. 26 is a schematic diagram showing a cross section of a liquid crystal panel included in a projector according to a seventh embodiment.

FIG. 26 is a diagram schematically showing a cross section along a YZ plane of a liquid crystal panel 9A included in the projector according to this embodiment.

The projector according to this embodiment includes the same components as the components of the projector 1 according to the first embodiment except that the projector according to this embodiment includes the liquid crystal panel 9A shown in FIG. 26 instead of the liquid crystal panel 4A according to the first embodiment.

The liquid crystal panel 9A includes the incident side cooling member 8A in addition to the components of the liquid crystal panel 4A according to the first embodiment. In other words, the liquid crystal panel 9A includes the emission side cooling member 6A in addition to the components of the liquid crystal panel 7A according to the fourth embodiment.

That is, the liquid crystal panel 9A includes the panel main body 41, the wire 49, the holding housing 50, the emission side cooling member 6A, and the incident side cooling member 8A. As explained in the first embodiment, the panel main body 41 includes the liquid crystal layer 42, the incident section 43, and the emission section 46. The incident section 43 includes the counter substrate 44 and the incident side dustproof substrate 45. The emission section 46 includes the pixel substrate 47 and the emission side dustproof substrate 48.

In this embodiment, the incident side dustproof substrate 45 is equivalent to the first dustproof substrate and the emission side dustproof substrate 48 is equivalent to the second dustproof substrate.

The main body section 81A configuring the incident side cooling member 8A is equivalent to the first vapor chamber. The first member 82, the second member 83, and the opening section 84 configuring the main body section 81A are equivalent to the first heat receiving section, the first heat radiating section, and the first opening section. When viewed from an incident side of light made incident on the liquid crystal layer 42 (the −Z direction), the main body section 81A extends further to the outer side than the counter substrate 44 and the incident side dustproof substrate 45.

The main body section 61A configuring the emission side cooling member 6A is equivalent to the second vapor chamber. The first member 62, the second member 63, and the opening section 64 configuring the main body section 61A are equivalent to the second heat receiving section, the second heat radiating section, and the second opening section. When viewed from an emission side of light emitted from the liquid crystal layer 42 (the +Z direction), the main body section 61A extends further to the outer side than the pixel substrate 47 and the emission side dustproof substrate 48.

The main body section 81A and the main body section 61A are opposed to each other in an incident direction of light on the liquid crystal layer 42 (the +Z direction).

In the liquid crystal panel 9A, a part of the heat receiving section 621 of the emission side cooling member 6A is coupled to, in a heat transferable manner, the light emission surface 472 of the pixel substrate 47 configuring the panel main body 41. The inner circumferential surface of the opening section 64 of the emission side cooling member 6A is coupled to the side surface 483 of the emission side dustproof substrate 48 via a thermally conductive adhesive or the like in a heat transferable manner. The inner circumferential surface of the opening section 64 is a part of the heat receiving section 621.

The emission side cooling member 6A may be provided on the pixel substrate 47 or may be provided on the emission side dustproof substrate 48.

In the liquid crystal panel 9A, a part of the heat receiving section 821 of the incident side cooling member 8A is coupled to, in a heat transferable manner, the light incident surface 441 of the counter substrate 44 configuring the panel main body 41. The inner circumferential surface of the opening section 84 of the incident side cooling member 8A is coupled to the side surface 453 of the incident side dustproof substrate 45 via a thermally conductive adhesive or the like in a heat transferable manner. The inner circumferential surface of the opening section 84 is a part of the heat receiving section 821.

The incident side cooling member 8A may be provided on the counter substrate 44 or may be provided on the incident side dustproof substrate 45.

A cooling gas flows from a cooling device to such a liquid crystal panel 9A along the +Y direction in the same manner as the cooling gas flows to the liquid crystal panels 4A to 4I and 7A to 7I explained above.

The cooling gas flowing in a space on a light incident side with respect to the liquid crystal panel 9A flows in the +Y direction and cools the incident side dustproof substrate 45 and the first heat radiating member 88.

The cooling gas flowing in a space on a light emission side with respect to the liquid crystal panel 9A flows in the +Y direction and cools the emission side dustproof substrate 48 and the first heat radiating member 68.

In this way, in the liquid crystal panel 9A, the heat of the liquid crystal layer 42 is radiated to the outside of the liquid crystal panel 9A by the incident side dustproof substrate 45, the emission side dustproof substrate 48, the emission side cooling member 6A, and the incident side cooling member 8A, the liquid crystal layer 42 is cooled, and the driver circuit 491 is cooled.

Effects of the Seventh Embodiment

The projector according to this embodiment explained above achieves the same effects as the effects of the projector 1 according to the first embodiment and the projector according to the fourth embodiment. That is, the liquid crystal panel 9A according to this embodiment can achieve the same effects as the effects of the liquid crystal panel 4A according to the first embodiment and the liquid crystal panel 7A according to the fourth embodiment.

Specifically, the liquid crystal panel 9A is a transmissive liquid crystal panel that emits modulated light along a traveling direction of light made incident on the liquid crystal panel. The liquid crystal panel 9A includes the pixel region 41A, the liquid crystal layer 42, the counter substrate 44, the incident side dustproof substrate 45, the pixel substrate 47, the emission side dustproof substrate 48, and the main body sections 61A and 81A. A plurality of pixels are arrayed in the pixel region 41A.

The liquid crystal layer 42 modulates light for each of the plurality of pixels. The counter substrate 44 includes a common electrode provided to correspond to the pixel region 41A. The pixel substrate 47 includes a plurality of pixel electrodes provided to respectively correspond to the plurality of pixels and carries the liquid crystal layer 42 between the pixel substrate 47 and the counter substrate 44.

The incident side dustproof substrate 45 is equivalent to the first dustproof substrate and is provided on a surface on the opposite side of the pixel substrate 47 in the counter substrate 44. The emission side dustproof substrate 48 is equivalent to the second dustproof substrate and is provided on a surface on the opposite side of the counter substrate 44 in the pixel electrode 47.

The main body section 81A is equivalent to the first vapor chamber and includes the opening section 84 functioning as the first opening section, the heat receiving section 821 functioning as the first heat receiving section, and the first heat radiating section 831 functioning as the first heat radiating section. The opening section 84 is an opening section corresponding to the pixel region 41A. The heat receiving section 821 is provided around the opening section 84 and is coupled to at least one of the counter substrate 44 and the incident side dustproof substrate 45 in a heat transferable manner. The first heat radiating section 831 radiates heat received by the heat receiving section 821. The main body section 81A vaporizes, with the heat received by the heat receiving section 821, the coolant in the liquid phase encapsulated on the inside and radiates the heat of the coolant in the gas phase with the first heat radiating section 831 to thereby condense the coolant in the gas phase into the coolant in the liquid phase. The coolant encapsulated in the encapsulating space SP of the main body section 81A is equivalent to the first coolant.

The main body section 61A is equivalent to the second vapor chamber and includes the opening section 64 functioning as the second opening section, the heat receiving section 621 functioning as the second heat receiving section, and the first heat radiating section 631 functioning as the second heat radiating section. The opening section 64 is an opening section corresponding to the pixel region 41A. The heat receiving section 621 is provided around the opening section 64 and is coupled to at least one of the pixel substrate 47 and the emission side dustproof substrate 48 in a heat transferable manner. The first heat radiating section 631 radiates heat received by the heat receiving section 621. The main body section 61A vaporizes, with the heat received by the heat receiving section 621, the coolant in the liquid phase encapsulated on the inside and radiates the heat of the coolant in the gas phase with the first heat radiating section 631 to thereby condense the coolant in the gas phase into the coolant in the liquid phase. The coolant encapsulated in the encapsulating space SP of the main body section 61A is equivalent to the second coolant.

With such a configuration, the same effects as the effects of the liquid crystal panels 4A and 7A can be achieved.

The liquid crystal panel 9A includes the main body section 81A coupled to at least one of the counter substrate 44 and the incident side dustproof substrate 45 in a heat transferable manner and the main body section 61A coupled to at least one of the pixel substrate 47 and the emission side dustproof substrate 48 in a heat transferable manner. Consequently, it is possible to further improve cooling efficiency of the liquid crystal layer 42.

In the liquid crystal panel 9A, when viewed from an incident side of light made incident on the liquid crystal layer 42, the main body section 81A functioning as the first vapor chamber extends further to the outer side than the counter substrate 44 and the incident side dustproof substrate 45. When viewed from an emission side of light emitted from the liquid crystal layer 42, the main body section 61A functioning as the second vapor chamber extends further to the outer side than the pixel substrate 47 and the emission side dustproof substrate 48. The main body section 81A and the main body section 61A are opposed to each other in an incident direction of light with respect to the liquid crystal layer 42.

With such a configuration, compared with when the main body section 81A and the main body section 61A are not opposed to each other, it is possible to prevent an increase in the size of the liquid crystal panel 9A.

First Modification of the Seventh Embodiment

In the liquid crystal panel 9A, the side surface 453 of the incident side dustproof substrate 45 is coupled to the inner circumferential surface of the opening section 84, which is a part of the heat receiving section 821, in the main body section 81A of the incident side cooling member 8A via the thermally conductive adhesive in a heat transferable manner. The side surface 483 of the emission side dustproof substrate 48 is coupled to the inner circumferential surface of the opening section 64, which is a part of the heat receiving section 621, in the main body section 61A of the emission side cooling member 6A via the thermally conductive adhesive in a heat transferable manner.

However, not only this, but at least one side surface of the side surface 453 of the incident side dustproof substrate 45 and the side surface 483 of the emission side dustproof substrate 48 may not be coupled to the inner circumferential surface of an opening section corresponding thereto of the opening section 84 of the incident side cooling member 8A and the opening section 64 of the emission side cooling member 6A.

At least one side surface of the side surface 453 of the incident side dustproof substrate 45 and the side surface 483 of the emission side dustproof substrate 48 may be coupled to the inner circumferential surface of an opening section corresponding thereto of the opening section 84 of the incident side cooling member 8A and the opening section 64 of the emission side cooling member 6A via a heat transfer member such as a leaf spring in a heat transferable manner.

Besides, as explained above, a part of the side surface 453 may be coupled to the inner circumferential surface of the opening section 84 in a heat transferable manner or a part of the side surface 483 may be coupled to the inner circumferential surface of the opening section 64 in a heat transferable manner.

Second Modification of the Seventh Embodiment

In the liquid crystal panel 9A, the emission side cooling member 6A is adopted as the emission side cooling member and the incident side cooling member 8A is adopted as the incident side cooling member.

However, not only this, but the configuration of the incident side cooling member and the configuration of the emission side cooling member are not limited to the above. For example, a liquid crystal panel may include one of the emission side cooling members 6A to 6I as the emission side cooling member and include one of the incident side cooling members 8A to 8I as the incident side cooling member.

In this case, the emission side cooling member may be configured such that, when viewed from an emission side of light emitted from the liquid crystal layer 42 (the +Z direction), the main body section extends further to the outer side than the pixel substrate 47 and the emission side dustproof substrate 48.

The incident side cooling member may be configured such that, when viewed from an incident side of light made incident on the liquid crystal layer 42 (the −Z direction), the main body section extends further to the outer side than the counter substrate 44 and the incident side dustproof substrate 45.

The emission side cooling member and the incident side cooling member may be disposed such that the main body section of the emission side cooling member and the main body section of the incident side cooling member are opposed to each other in an incident direction of light made incident on the liquid crystal layer 42 (the +Z direction).

Figure 27:
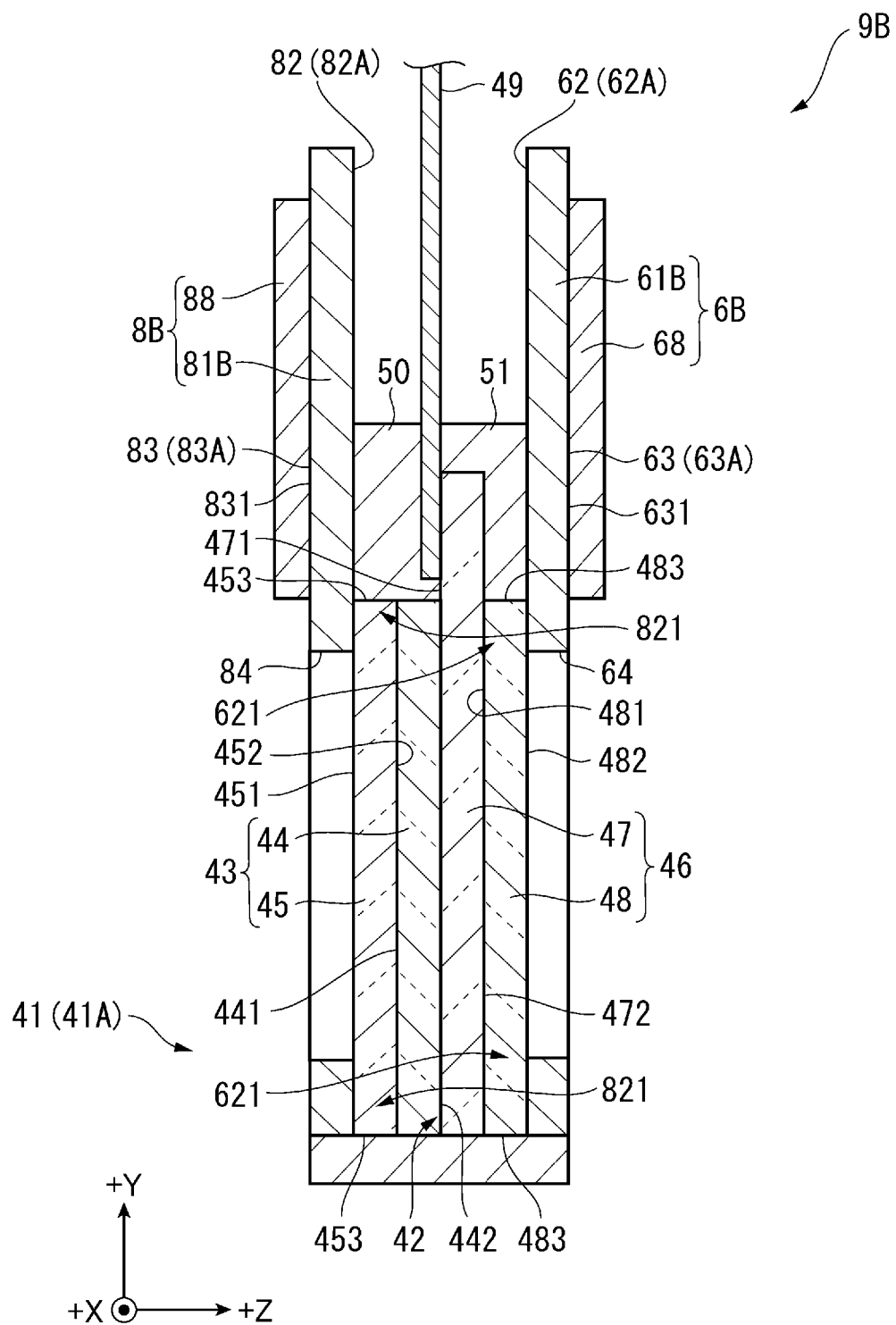
FIG. 27 is a schematic diagram showing a cross section of a modification of the liquid crystal panel according to the seventh embodiment.

FIG. 27 is a diagram schematically showing a cross section along a YZ plane of a liquid crystal panel 9B, which is a modification of the liquid crystal panel 9A.

For example, the liquid crystal panel 9B shown in FIG. 27 may be adopted instead of the liquid crystal panel 9A.

The liquid crystal panel 9B has a configuration in which the liquid crystal panel 4B explained in the second modification of the first embodiment and the liquid crystal panel 7B explained in the second modification of the fourth embodiment are combined. That is, the liquid crystal panel 9B includes the panel main body 41, the wire 49, the holding housing 50, the clamping member 51, the emission side cooling member 6B, and the incident side cooling member 8B.

In the liquid crystal panel 9B, the emission side cooling member 6B is provided on the emission side dustproof substrate 48 such that the heat receiving section 621 provided around the opening section 64 is coupled to the light emission surface 482. Another part of the heat receiving section 621 is coupled to the pixel substrate 47 via the clamping member 51 in a heat transferable manner.

In the liquid crystal panel 9B, the incident side cooling member 8B is provided on the incident side dustproof substrate 45 such that the heat receiving section 821 provided around the opening section 84 is coupled to the light incident surface 451. Another part of the heat receiving section 821 is coupled to the counter substrate 44 via the holding housing 50 in a heat transferable manner.

The heat receiving section 621 may not be coupled to the clamping member 51 in a heat transferable manner. The heat receiving section 821 may not be coupled to the holding housing 50 in a heat transferable manner.

Such a liquid crystal panel 9B achieves the same effects as the effects of the liquid crystal panels 4B, 7B, and 9A.

Third Modification of the Seventh Embodiment

Figure 28:
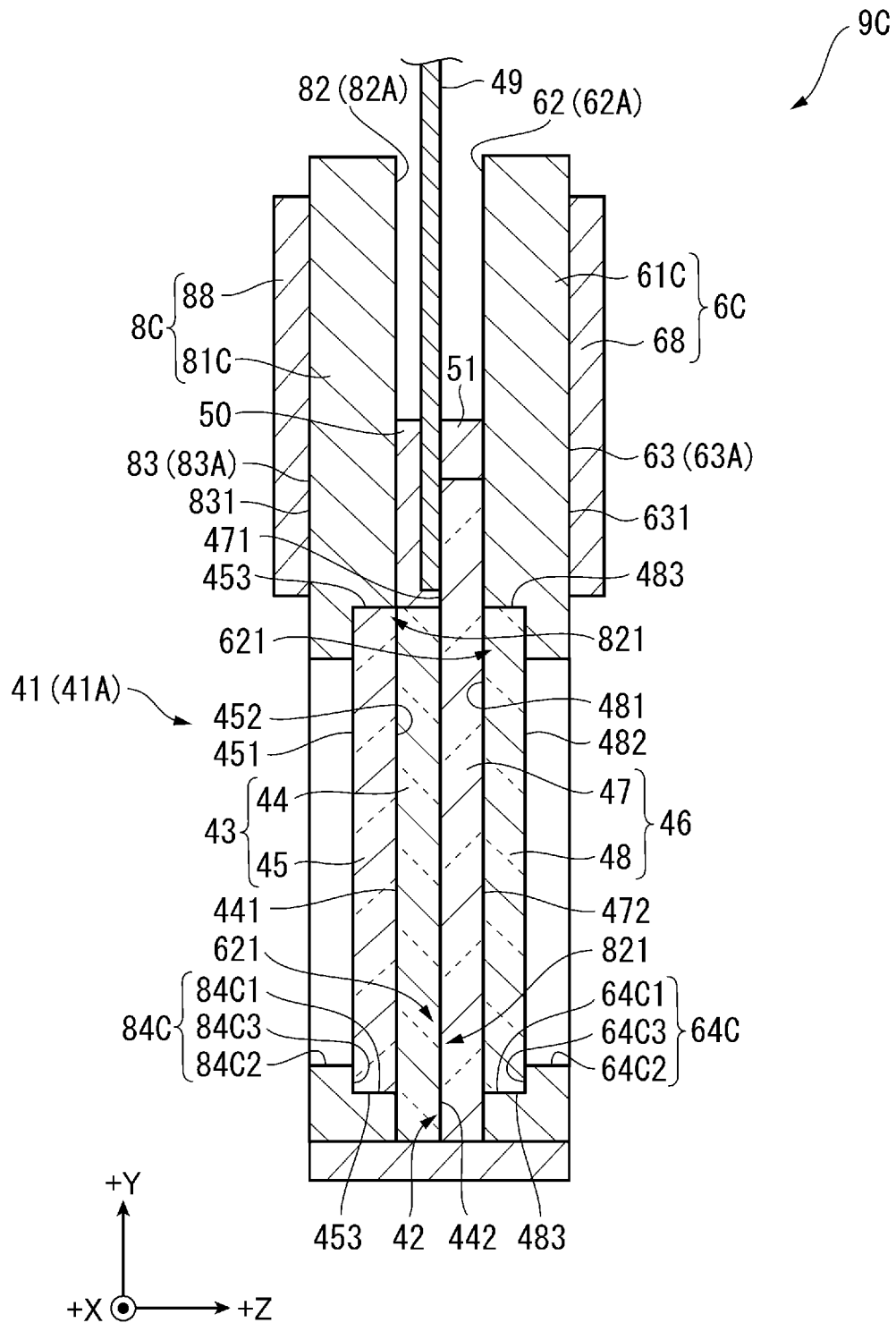
FIG. 28 is a schematic diagram showing a cross section of a modification of the liquid crystal panel according to the seventh embodiment.

FIG. 28 is a diagram schematically showing a cross section along a YZ plane of a liquid crystal panel 9C, which is a modification of the liquid crystal panel 9A.

For example, the liquid crystal panel 9C shown in FIG. 28 may be adopted instead of the liquid crystal panel 9A.

The liquid crystal panel 9C has a configuration in which the liquid crystal panel 4C explained in the third modification of the first embodiment and the liquid crystal panel 7C explained in the third modification of the fourth embodiment are combined.

That is, the liquid crystal panel 9C includes the panel main body 41, the wire 49, the holding housing 50, the clamping member 51, the emission side cooling member 6C, and the incident side cooling member 8C.

In the liquid crystal panel 9C, the emission side dustproof substrate 48 is disposed in the first opening section 64C1 of the emission side cooling member 6C. The inner edge of the first opening section 64C1 is coupled to the side surface 483 of the emission side dustproof substrate 48. The coupling section 64C3 is coupled to a part of the light emission surface 482 of the emission side dustproof substrate 48.

The heat receiving section 621 of the first member 62 is coupled to the pixel substrate 47.

In the liquid crystal panel 9C, the incident side dustproof substrate 45 is disposed in the first opening section 84C1 of the incident side cooling member 8C. The inner edge of the first opening section 84C1 is coupled to the side surface 453 of the incident side dustproof substrate 45. The coupling section 84C3 is coupled to a part of the light incident surface 451 of the incident side dustproof substrate 45.

The heat receiving section 821 of the first member 82 is coupled to the counter substrate 44 via the holding housing 50 in a heat transferable manner.

The heat receiving section 621 may not be coupled to the clamping member 51 in a heat transferable manner. The heat receiving section 821 may not be coupled to the holding housing 50 in a heat transferable manner.

Such a liquid crystal panel 9C achieves the same effects as the effects of the liquid crystal panels 4C, 7C, and 9A.

Fourth Modification of the Seventh Embodiment

Figure 29:
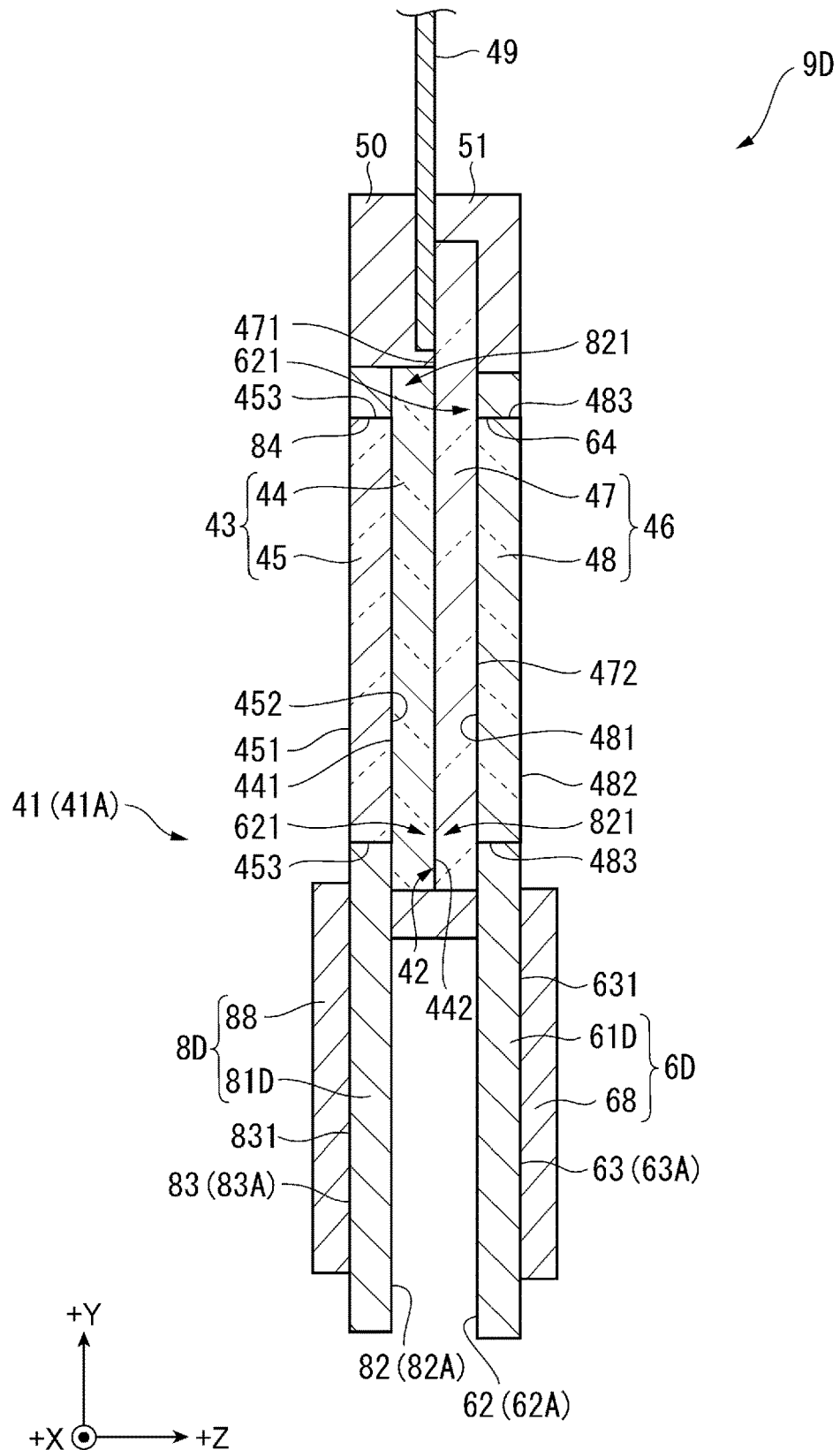
FIG. 29 is a schematic diagram showing a cross section of a modification of the liquid crystal panel according to the seventh embodiment.

FIG. 29 is a diagram schematically showing a cross section along a YZ plane of a liquid crystal panel 9D, which is a modification of the liquid crystal panel 9A.

For example, the liquid crystal panel 9D shown in FIG. 29 may be adopted instead of the liquid crystal panel 9A.

The liquid crystal panel 9D has a configuration in which the liquid crystal panel 4D explained in the second embodiment and the liquid crystal panel 7D explained in the fifth embodiment are combined.

That is, the liquid crystal panel 9D includes the panel main body 41, the wire 49, the holding housing 50, the emission side cooling member 6D, and the incident side cooling member 8D.

The main body section 61D of the emission side cooling member 6D extends from the opening section 64 in the −Y direction, which is the opposite direction of the extending direction of the wire 49 from the liquid crystal layer 42. The main body section 81D of the incident side cooling member 8D extends from the opening section 84 in the −Y direction, which is the opposite direction of the extending direction of the wire 49 from the liquid crystal layer 42.

In the liquid crystal panel 9D, the heat receiving section 621 of the emission side cooling member 6D is coupled to the light emission surface 472 of the pixel substrate 47. The emission side dustproof substrate 48 is disposed on the inner side of the opening section 64. The side surface 483 of the emission side dustproof substrate 48 is coupled to the inner circumferential surface of the opening section 64 of the emission side cooling member 6G via a thermally conductive adhesive or the like in a heat transferable manner. The inner circumferential surface of the opening section 64 is a part of the heat receiving section 621.

The main body section 61D of the emission side cooling member 6D may be provided on the pixel substrate 47 or may be provided on the emission side dustproof substrate 48.

In the liquid crystal panel 9D, the heat receiving section 821 of the incident side cooling member 8D is coupled to the light incident surface 441 of the counter substrate 44. The incident side dustproof substrate 45 is disposed on the inner side of the opening section 84. The side surface 453 of the incident side dustproof substrate 45 is coupled to the inner circumferential surface of the opening section 84 of the incident side cooling member 8D via a thermally conductive adhesive or the like in a heat transferable manner. The inner circumferential surface of the opening section 84 is a part of the heat receiving section 821.

The main body section 81D of the incident side cooling member 8D may be provided on the counter substrate 44 or may be provided on the incident side dustproof substrate 45.

A cooling gas flows from a cooling device to such a liquid crystal panel 9D along the +Y direction in the same manner as the cooling gas flows to the liquid crystal panels 4A to 4I and 7A to 7I.

The cooling gas flowing in a space on the light incident side with respect to the liquid crystal panel 9D flows in the +Y direction and cools the first heat radiating member 88 and the incident side dustproof substrate 45 in order and, thereafter, cools the holding housing 50.

The cooling gas flowing in a space on the light emission side with respect to the liquid crystal panel 9D flows in the +Y direction and cools the first heat radiating member 68 and the emission side dustproof substrate 48 in order and, thereafter, cools the clamping member 51.

In this way, in the liquid crystal panel 9D, the heat of the liquid crystal layer 42 is radiated to the outside of the liquid crystal panel 9D by the incident side dustproof substrate 45, the emission side dustproof substrate 48, the emission side cooling member 6D, and the incident side cooling member 8D, the liquid crystal layer 42 is cooled, and the driver circuit 491 is cooled.

Such a liquid crystal panel 9D achieves the same effects as the effects of the liquid crystal panels 4D, 7D, and 9A.

Fifth Modification of the Seventh Embodiment

Figure 30:
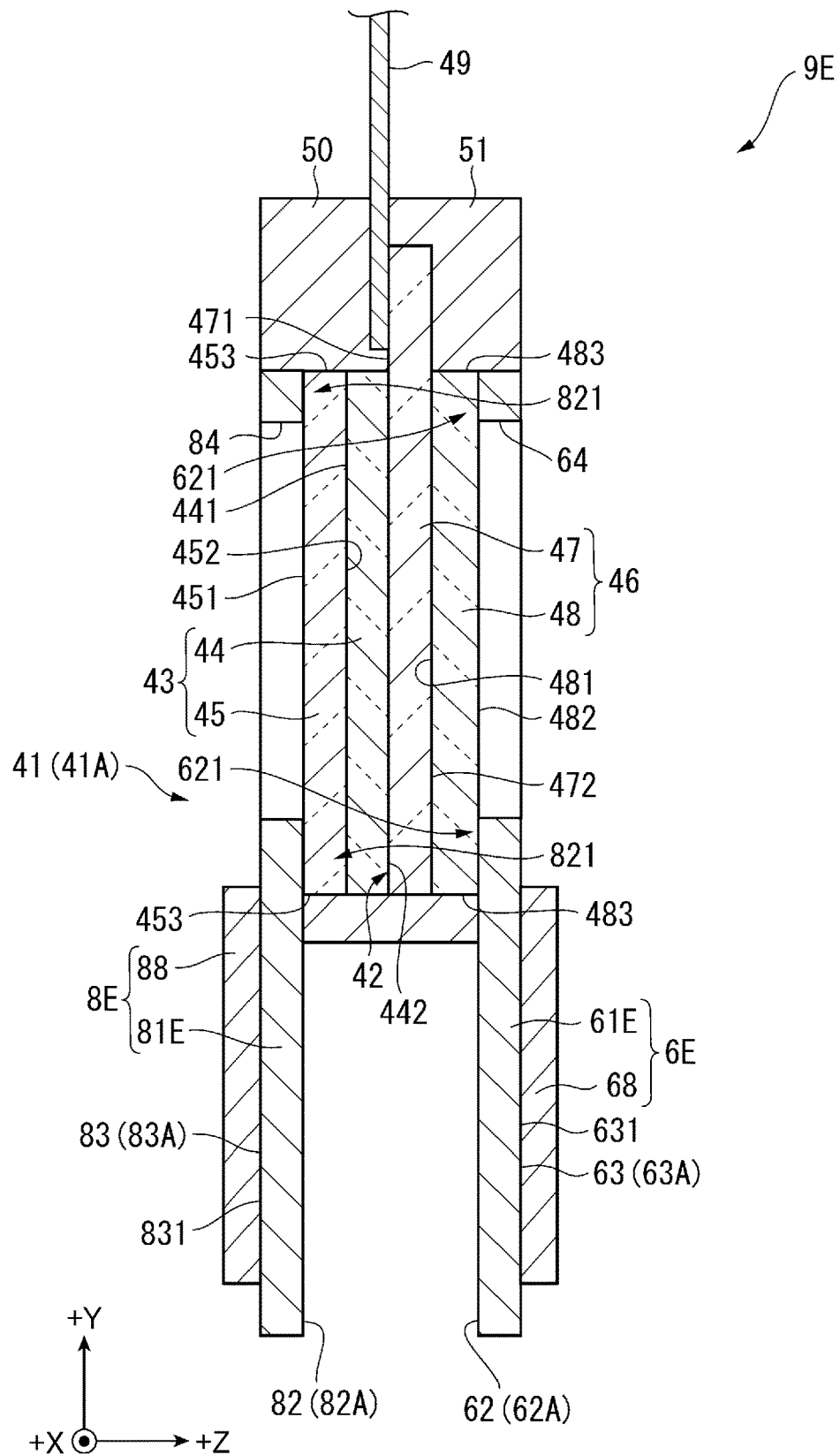
FIG. 30 is a schematic diagram showing a cross section of a modification of the liquid crystal panel according to the seventh embodiment.

FIG. 30 is a diagram schematically showing a cross section along a YZ plane of a liquid crystal panel 9E, which is a modification of the liquid crystal panel 9A.

For example, the liquid crystal panel 9E shown in FIG. 30 may be adopted instead of the liquid crystal panel 9A.

The liquid crystal panel 9E has a configuration in which the liquid crystal panel 4E explained in the second modification of the second embodiment and the liquid crystal panel 7E explained in the second modification of the fifth embodiment are combined.

That is, the liquid crystal panel 9E includes the panel main body 41, the wire 49, the holding housing 50, the clamping member 51, the emission side cooling member 6E, and the incident side cooling member 8E.

In the liquid crystal panel 9E, the main body section 61E of the emission side cooling member 6E is provided on the emission side dustproof substrate 48 such that a part of the heat receiving section 621 provided around the opening section 64 on the first surface 62A is coupled to the light emission surface 482. Another part of the heat receiving section 621 is coupled to the pixel substrate 47 via the clamping member 51 in a heat transferable manner.

In the liquid crystal panel 9E, the main body section 81E of the incident side cooling member 8E is provided on the incident side dustproof substrate 45 such that a part of the heat receiving section 821 provided around the opening section 84 on the first surface 82A is coupled to the light incident surface 451. Another part of the heat receiving section 821 is coupled to the counter substrate 44 via the holding housing 50 in a heat transferable manner.

The heat receiving section 621 may not be coupled to the clamping member 51 in a heat transferable manner. The heat receiving section 821 may not be coupled to the holding housing 50 in a heat transferable manner.

Such a liquid crystal panel 9E achieves the same effects as the effects of the liquid crystal panels 4E, 7E and 9D.

Sixth Modification of the Seventh Embodiment

Figure 31:
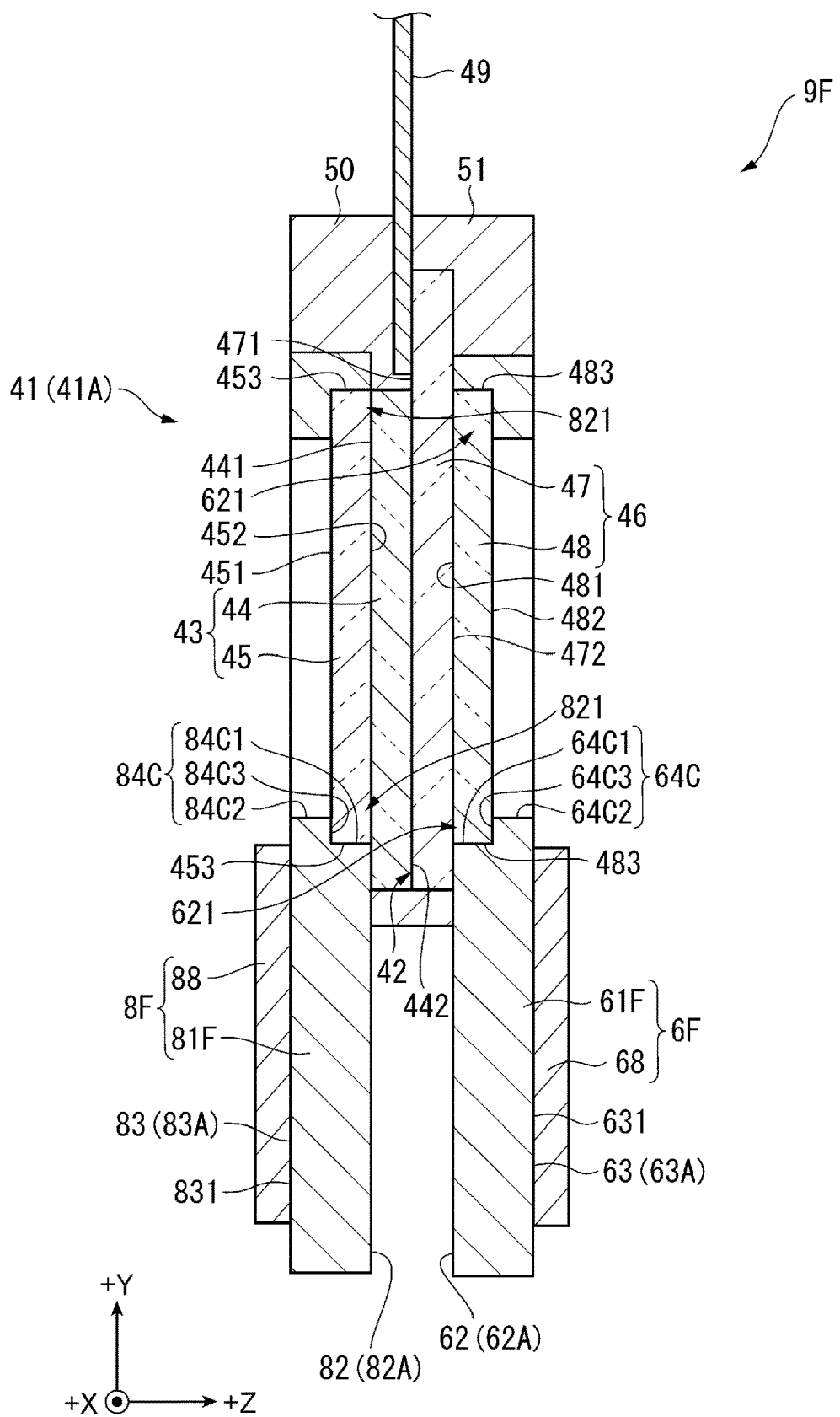
FIG. 31 is a schematic diagram showing a cross section of a modification of the liquid crystal panel according to the seventh embodiment.

FIG. 31 is a diagram schematically showing a cross section along a YZ plane of a liquid crystal panel 9F, which is a modification of the liquid crystal panel 9A.

For example, the liquid crystal panel 9F shown in FIG. 31 may be adopted instead of the liquid crystal panel 9A.

The liquid crystal panel 9F has a configuration in which the liquid crystal panel 4F explained in the third modification of the second embodiment and the liquid crystal panel 7F explained in the third modification of the fifth embodiment are combined.

That is, the liquid crystal panel 9F includes the panel main body 41, the wire 49, the holding housing 50, the clamping member 51, the emission side cooling member 6F, and the incident side cooling member 8F.

In the liquid crystal panel 9F, the emission side dustproof substrate 48 is disposed in the first opening section 64C1 of the emission side cooling member 6F. The inner circumferential surface of the first opening section 64C1 is coupled to the side surface 483 of the emission side dustproof substrate 48 in a heat transferable manner. The coupling section 64C3 is coupled to a part of the light emission surface 482 of the emission side dustproof substrate 48. The heat receiving section 621 is coupled to the pixel substrate 47.

The heat receiving section 621 may not always be coupled to the pixel substrate 47.

In the liquid crystal panel 9F, the incident side dustproof substrate 45 is disposed in the first opening section 84C1 of the incident side cooling member 8F. The inner circumferential surface of the first opening section 84C1 is coupled to the side surface 453 of the incident side dustproof substrate 45 in a heat transferable manner. The coupling section 84C3 is coupled to a part of the light incident surface 451 of the incident side dustproof substrate 45. The heat receiving section 821 is coupled to the counter substrate 44 via the holding housing 50 in a heat transferable manner.

The heat receiving section 621 may not be coupled to the clamping member 51 in a heat transferable manner. The heat receiving section 821 may not be coupled to the holding housing 50 in a heat transferable manner.

Such a liquid crystal panel 9F achieves the same effects as the effects of the liquid crystal panels 4F, 7F, and 9D.

Seventh Modification of the Seventh Embodiment

Figure 32:
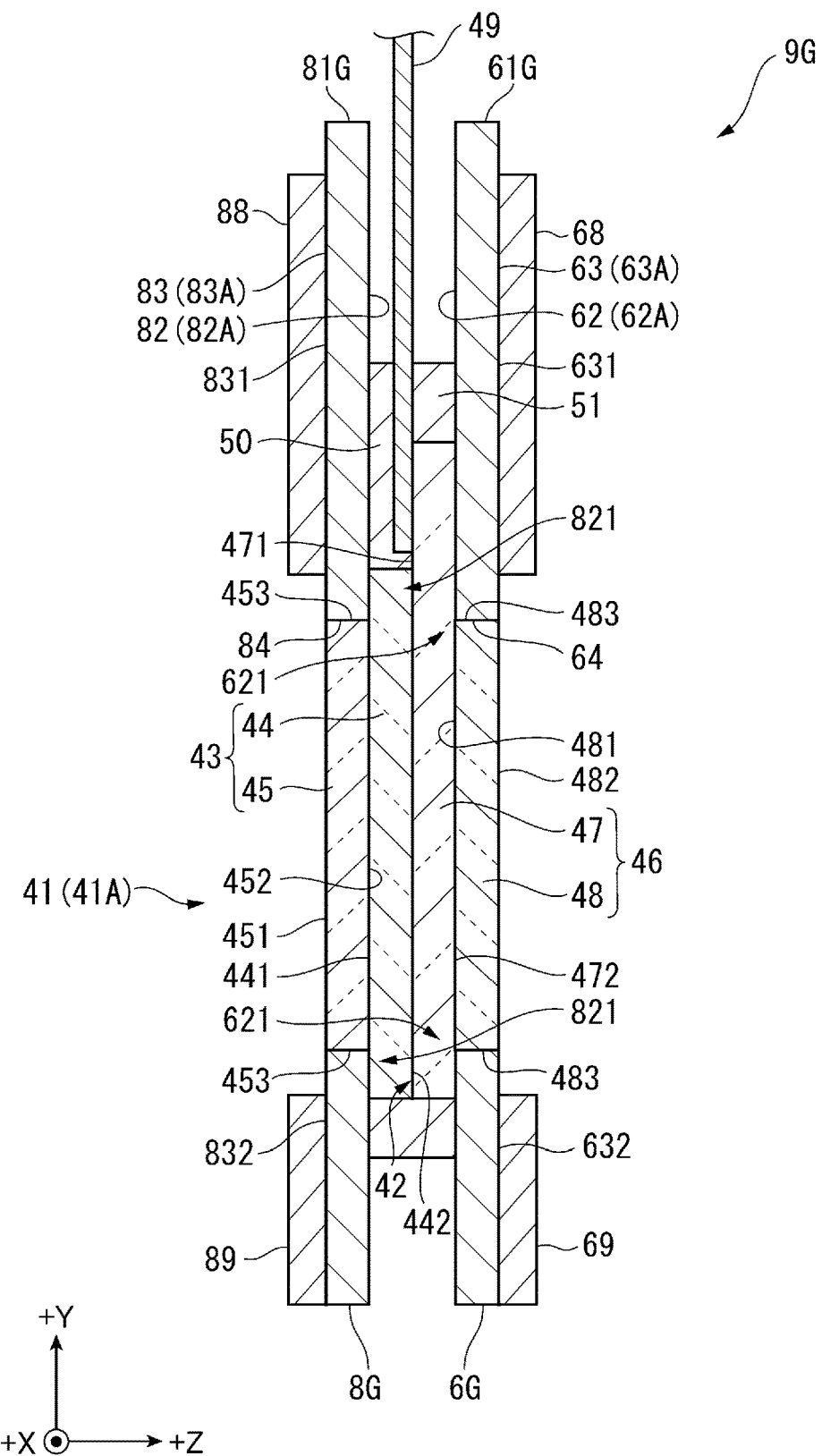
FIG. 32 is a schematic diagram showing a cross section of a liquid crystal panel included in a projector according to the seventh embodiment.

FIG. 32 is a diagram schematically showing a cross section along a YZ plane of a liquid crystal panel 9G, which is a modification of the liquid crystal panel 9A.

For example, the liquid crystal panel 9G shown in FIG. 32 may be adopted instead of the liquid crystal panel 9A.

The liquid crystal panel 9G has a configuration in which the liquid crystal panel 4G explained in the third embodiment and the liquid crystal panel 7G explained in the sixth embodiment are combined.

That is, the liquid crystal panel 9G includes the panel main body 41, the wire 49, the holding housing 50, the clamping member 51, the emission side cooling member 6G, and the incident side cooling member 8G.

In the liquid crystal panel 9G, the heat receiving section 621 of the emission side cooling member 6G is coupled to the light emission surface 472 of the pixel substrate 47 in a heat transferable manner. The emission side dustproof substrate 48 is disposed on the inner side of the opening section 64 of the emission side cooling member 6G. The side surface 483 is coupled to the inner circumferential surface of the opening section 64 via a thermally conductive adhesive or the like in a heat transferable manner. The main body section 61G of the emission side cooling member 6G may be provided on the pixel substrate 47 or may be provided on the emission side dustproof substrate 48.

In the liquid crystal panel 9G, the heat receiving section 821 of the incident side cooling member 8G is coupled to the light incident surface 441 of the counter substrate 44 in a heat transferable manner. The incident side dustproof substrate 45 is disposed on the inner side of the opening section 84 of the incident side cooling member 8G. The side surface 453 is coupled to the inner circumferential surface of the opening section 84 via a thermally conductive adhesive or the like in a heat transferable manner. The main body section 81G of the incident side cooling member 8G may be provided on the counter substrate 44 or may be provided on the incident side dustproof substrate 45.

A cooling gas flows from a fan of a cooling device to such a liquid crystal panel 9G along the +Y direction in the same manner as the cooling gas flows to the liquid crystal panels 4A to 4I and 7A to 7I explained above.

The cooling gas flowing in a space on the light incident side with respect to the liquid crystal panel 9G flows in the +Y direction and cools the second heat radiating member 89, the incident side dustproof substrate 45, and the first heat radiating member 88 in order.

The cooling gas flowing in a space on the light emission side with respect to the liquid crystal panel 9G flows in the +Y direction and cools the second heat radiating member 69, the emission side dustproof substrate 48, and the first heat radiating member 68 in order.

In this way, in the liquid crystal panel 9G, the heat of the liquid crystal layer 42 is radiated to the outside of the liquid crystal panel 9G by the incident side dustproof substrate 45, the emission side dustproof substrate 48, the emission side cooling member 6G, and the incident side cooling member 8G, the liquid crystal layer 42 is cooled, and the driver circuit 491 is cooled.

Such a liquid crystal panel 9G achieves the same effects as the effects of the liquid crystal panels 4G, 7G, and 9A.

Eighth Modification of the Seventh Embodiment

Figure 33:
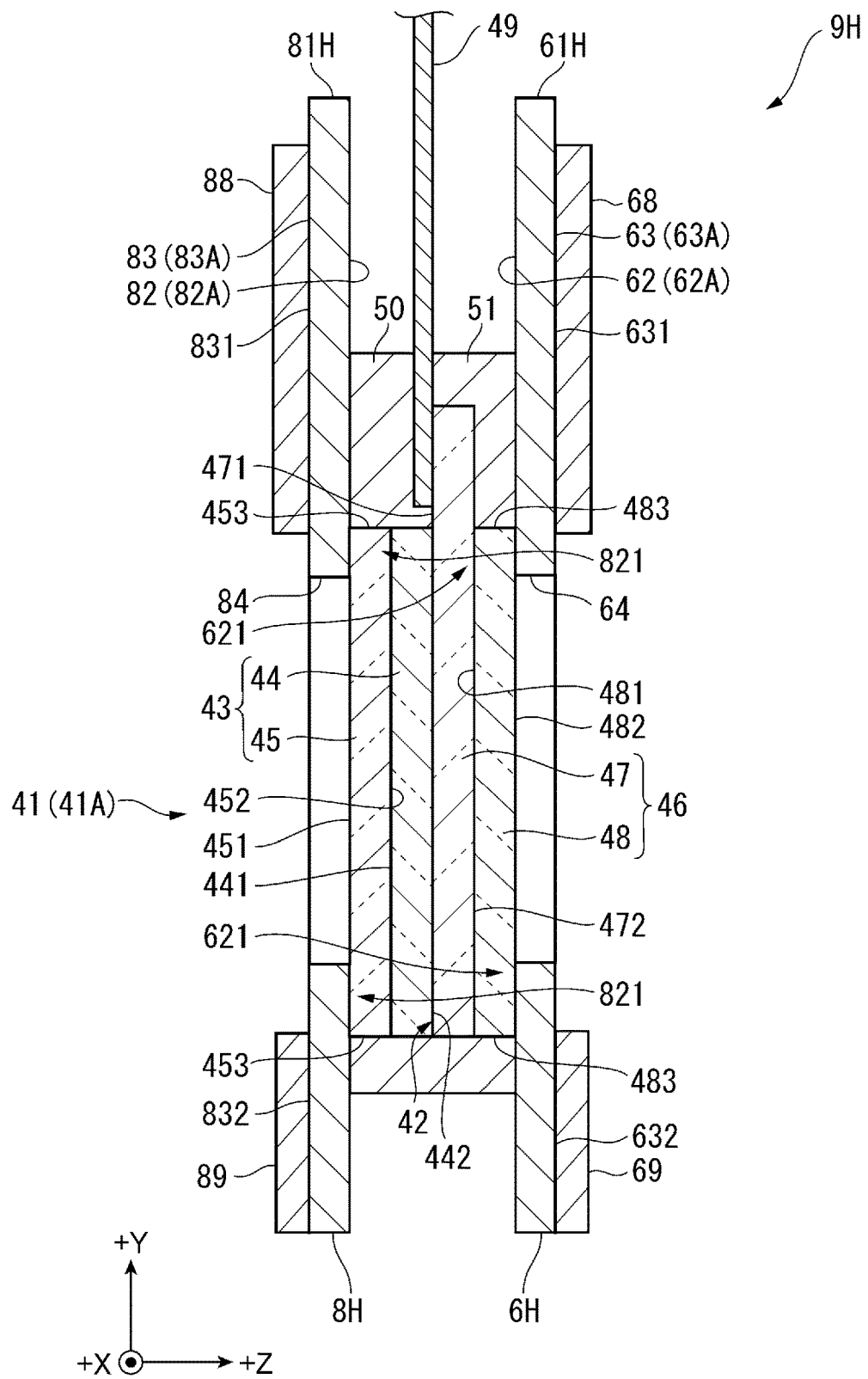
FIG. 33 is a schematic diagram showing a cross section of a modification of the liquid crystal panel according to the seventh embodiment.

FIG. 33 is a diagram schematically showing a cross section along a YZ plane of a liquid crystal panel 9H, which is a modification of the liquid crystal panel 9A.

For example, the liquid crystal panel 9H shown in FIG. 33 may be adopted instead of the liquid crystal panel 9A.

The liquid crystal panel 9H has a configuration in which the liquid crystal panel 4H explained in the second modification of the third embodiment and the liquid crystal panel 7H explained in the second modification of the sixth embodiment are combined.

That is, the liquid crystal panel 9H includes the panel main body 41, the wire 49, the holding housing 50, the clamping member 51, the emission side cooling member 6H, and the incident side cooling member 8H.

In the liquid crystal panel 9H, the main body section 61H of the emission side cooling member 6H is provided on the emission side dustproof substrate 48. The heat receiving section 621 provided around the opening section 64 on the first surface 62A is coupled to the light emission surface 482 of the emission side dustproof substrate 48. Another part of the heat receiving section 621 is coupled to the pixel substrate 47 via the clamping member 51 in a heat transferable manner.

In the liquid crystal panel 9H, the main body section 81H of the incident side cooling member 8E is provided on the incident side dustproof substrate 45. The heat receiving section 821 provided around the opening section 84 on the first surface 82A is coupled to the light incident surface 451 of the incident side dustproof substrate 45. Another part of the heat receiving section 821 is coupled to the counter substrate 44 via the holding housing 50 in a heat transferable manner.

The heat receiving section 621 may not be coupled to the clamping member 51 in a heat transferable manner. The heat receiving section 821 may not be coupled to the holding housing 50 in a heat transferable manner.

Such a liquid crystal panel 9H achieves the same effects as the effects of the liquid crystal panels 4H, 7H, and 9G.

Ninth Modification of the Seventh Embodiment

Figure 34:
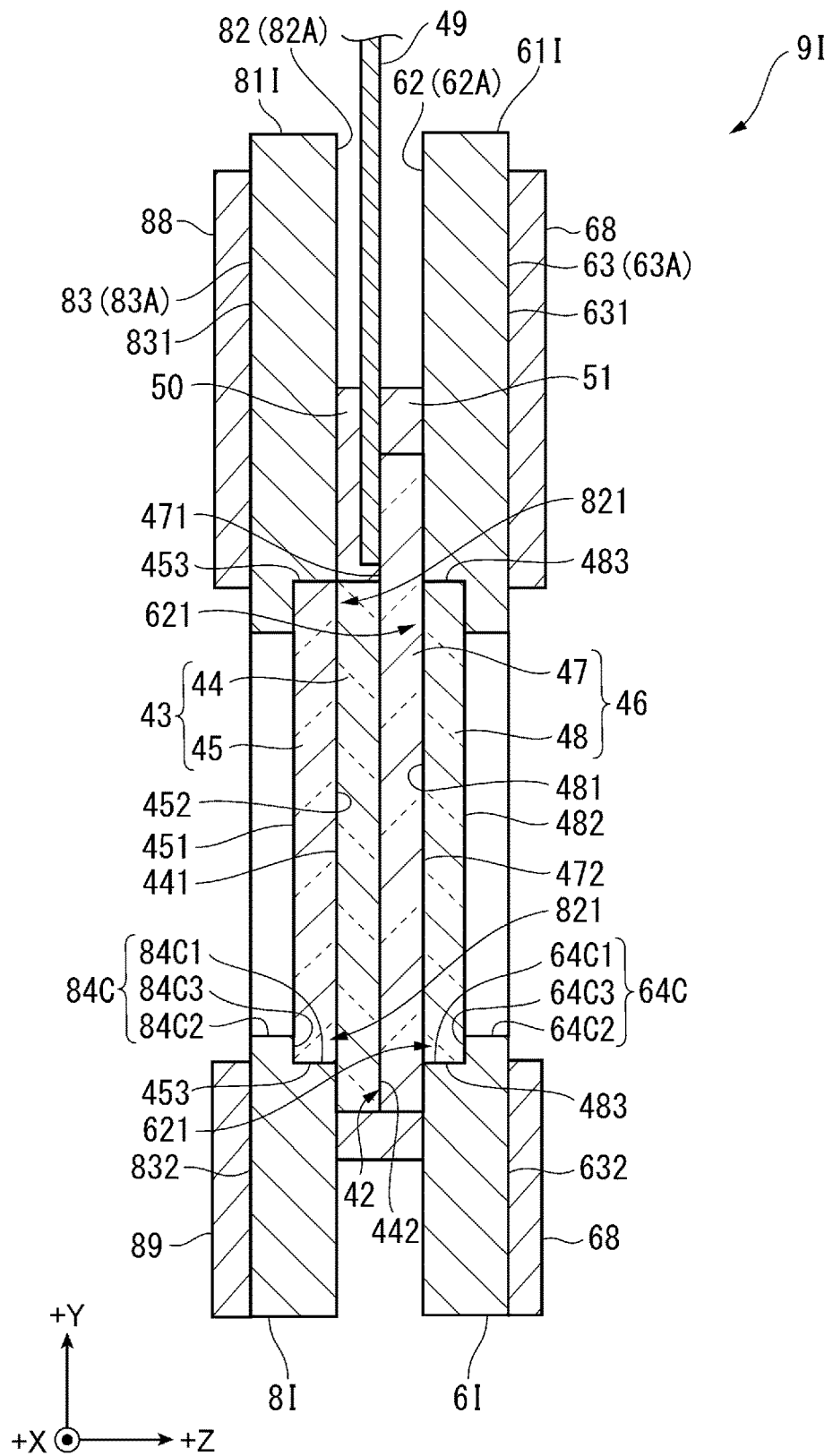
FIG. 34 is a schematic diagram showing a cross section of a modification of the liquid crystal panel according to the seventh embodiment.

FIG. 34 is a diagram schematically showing a cross section along a YZ plane of a liquid crystal panel 9I, which is a modification of the liquid crystal panel 9A.

For example, the liquid crystal panel 9I shown in FIG. 34 may be adopted instead of the liquid crystal panel 9A.

The liquid crystal panel 9I has a configuration in which the liquid crystal panel 4I explained in the third modification of the third embodiment and the liquid crystal panel 7I explained in the third modification of the sixth embodiment are combined.

That is, the liquid crystal panel 9I includes the panel main body 41, the wire 49, the holding housing 50, the clamping member 51, the emission side cooling member 6I, and the incident side cooling member 8I.

In the liquid crystal panel 9I, the emission side dustproof substrate 48 is disposed in the first opening section 64C1 of the emission side cooling member 6I. The inner circumferential surface of the first opening section 64C1 is coupled to the side surface 483 of the emission side dustproof substrate 48. The coupling section 64C3 is coupled to a part of the light emission surface 482 of the emission side dustproof substrate 48. The inner circumferential surface of the first opening section 64C1 and the coupling section 64C3 are parts of the heat receiving section 621. The heat receiving section 621 is coupled to the pixel substrate 47.

In the liquid crystal panel 9I, the incident side dustproof substrate 45 is disposed in the first opening section 84C1 of the incident side cooling member 8I. The inner circumferential surface of the first opening section 84C1 is coupled to the side surface 453 of the incident side dustproof substrate 45. The coupling section 84C3 is coupled to a part of the light incident surface 451 of the incident side dustproof substrate 45. The inner circumferential surface of the first opening section 84C1 and the coupling section 84C3 are parts of the heat receiving section 821. The heat receiving section 821 is coupled to the counter substrate 44 and the pixel substrate 47 via the holding housing 50 in a heat transferable manner.

The heat receiving section 621 may not be coupled to the clamping member 51 in a heat transferable manner. The heat receiving section 821 may not be coupled to the holding housing 50 in a heat transferable manner.

Such a liquid crystal panel 9I achieves the same effects as the effects of the liquid crystal panels 4I, 7I, and 9G.

Tenth Modification of the Seventh Embodiment

In the liquid crystal panel 9A, the main body section 81A functioning as the first vapor chamber among the components of the incident side cooling member 8A and the main body section 61A functioning as the second vapor chamber among the components of the emission side cooling member 6A are opposed to each other in the traveling direction of the light made incident on the liquid crystal layer 42.

However, not only this, but the main body section 81A and the main body section 61A may not be opposed to each other in the traveling direction of the light made incident on the liquid crystal layer 42. The same applies in a liquid crystal panel including one emission side cooling member among the emission side cooling members 6A to 6I and one incident side cooling member among the incident side cooling members 8A to 8I.

Figure 35:
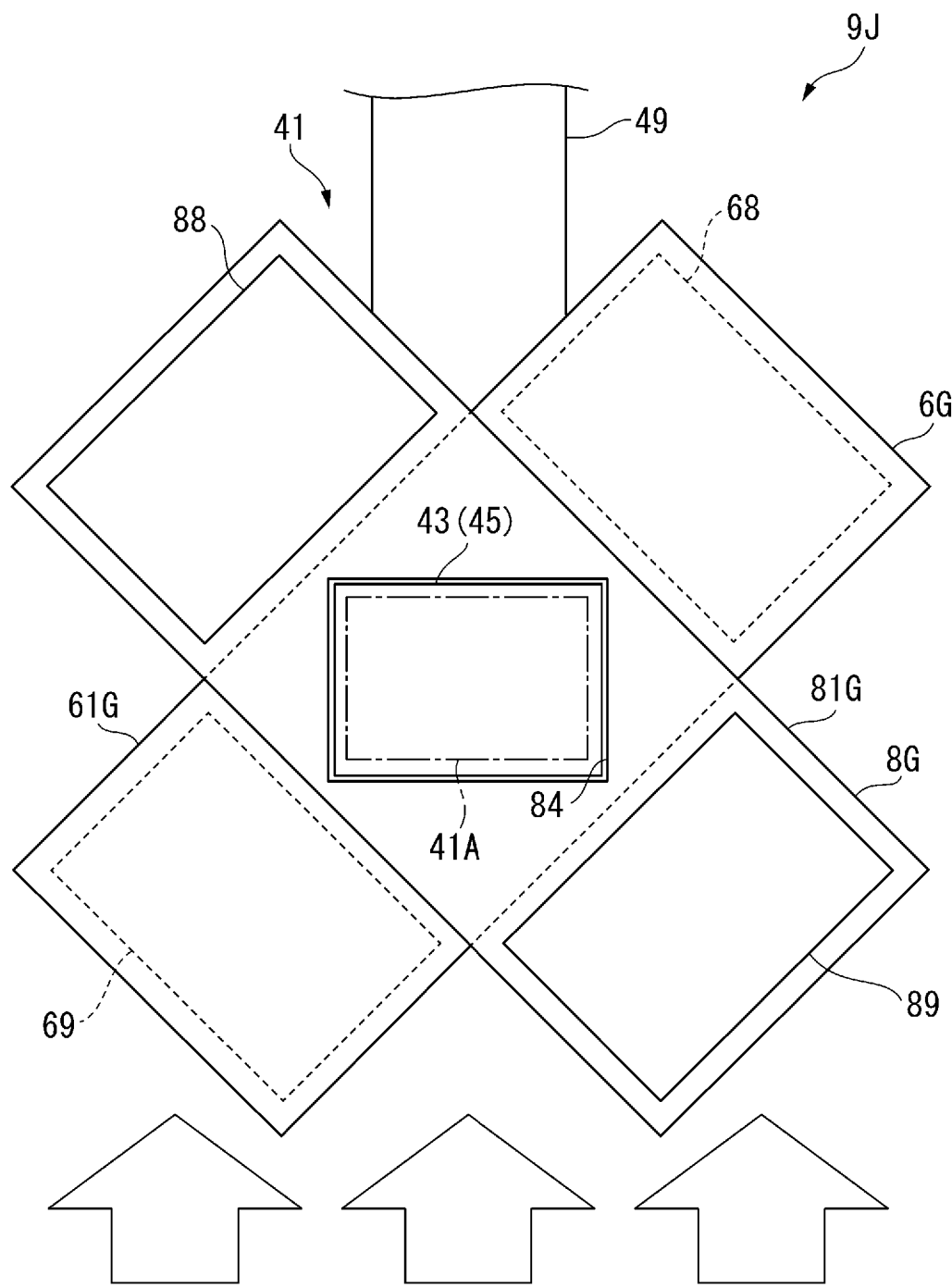
FIG. 35 is a schematic diagram showing a cross section of a modification of the liquid crystal panel according to the seventh embodiment.

FIG. 35 is a schematic diagram of a liquid crystal panel 9J, which is a modification of the liquid crystal panel 9G, viewed from the light incident side with respect to the liquid crystal layer 42. In other words, FIG. 35 is a diagram showing disposition of the main body section 61G of the emission side cooling member 6G and the main body section 81G of the incident side cooling member 8G in the liquid crystal panel 9J.

For example, the liquid crystal panel 9J shown in FIG. 35 may be adopted instead of the liquid crystal panel 9A.

Like the liquid crystal panel 9G, the liquid crystal panel 9J includes the panel main body 41, the wire 49, the holding housing 50 not shown in FIG. 35, the emission side cooling member 6G, and the incident side cooling member 8G.

In the liquid crystal panel 9J, the main body section 61G configuring the emission side cooling member 6G is inclined with respect to each of the +Y direction and the +X direction to be located further in the +X direction toward the +Y direction from the end portion in the −Y direction in the main body section 61G. Accordingly, in an example shown in FIG. 35, the first heat radiating member 68 of the emission side cooling member 6G is disposed in a position in the +X direction and the +Y direction with respect to the pixel region 41A and the second heat radiating member 69 is disposed in a position in the −X direction and the −Y direction with respect to the pixel region 41A.

The first heat radiating member 68 and the second heat radiating member 69 are provided to correspond to the first heat radiating section 631 and the second heat radiating section 632 such that a channel provided in each of the first heat radiating member 68 and the second heat radiating member 69 extends along the +Y direction.

In the liquid crystal panel 9J, the main body section 81G configuring the incident side cooling member 8G is inclined with respect to each of the +Y direction and the +X direction to be located further in the −X direction toward the +Y direction from the end portion in the −Y direction in the main body section 81G. Accordingly, in the example shown in FIG. 35, the first heat radiating member 88 of the incident side cooling member 8G is disposed in a position in the −X direction and the +Y direction with respect to the pixel region 41A and the second heat radiating member 89 is disposed in a position in the +X direction and the −Y direction with respect to the pixel region 41A.

The first heat radiating member 88 and the second heat radiating member 89 are provided to correspond to the first heat radiating section 831 and the second heat radiating section 832 such that a channel provided in each of the first heat radiating member 88 and the second heat radiating member 89 extends along the +Y direction.

In this way, in the liquid crystal panel 9J, the emission side cooling member 6G and the incident side cooling member 8G are provided to cross in the pixel region 41A when viewed from the light incident side with respect to the liquid crystal panel 9J.

Consequently, it is possible to allow a cooling gas flowing along the +Y direction to easily flow to each of the heat radiating members 68, 69, 88, and 89, the incident side dustproof substrate 45, and the emission side dustproof substrate 48. Therefore, it is possible to improve the cooling efficiency of the liquid crystal layer 42.

The main body section 61G may be inclined to be located further in the −X direction toward the +Y direction from the end portion in the −Y direction in the main body section 61G. The main body section 81G may be inclined to be located further in the +X direction toward the +Y direction from the end portion in the −Y direction in the main body section 81G.

Cooling members disposed as explained above are not limited to the emission side cooling member 6G and the incident side cooling member 8G and may be one of the emission side cooling members 6A to 6I or may be one of the incident side cooling members 8A to 8I. For example, even when a liquid crystal panel includes one cooling member of an emission side cooling member and an incident side cooling member, the one cooling member may be inclined with respect to the +X direction and the +Y direction.

Modifications of the Embodiments

The present disclosure is not limited to the embodiments including the modifications. Modifications, improvements, and the like in a range in which the object of the present disclosure can be attained are included in the present disclosure.

In the emission side cooling members according to the second and seventh embodiments, the first heat radiating member 68 provided to correspond to the first heat radiating section 631 on the second surface 63A of the second member 63 is disposed on the light emission side with respect to the first member 62.

However, not only this, but the first heat radiating member 68 may be provided on the light incident side with respect to the first member 62.

In the emission side cooling members according to the third and seventh embodiments, the second heat radiating member 69 provided to correspond to the second heat radiating section 632 on the second surface 63A of the second member 63 is disposed on the light emission side with respect to the first member 62.

However, not only this, but the second heat radiating member 69 may be provided on the light incident side with respect to the first member 62.

In these cases, for example, the first heat radiating section 631 and the first heat radiating member 68 only have to be coupled by a heat transfer member in a heat transferable manner. For example, the second heat radiating section 632 and the second heat radiating member 69 only have to be coupled by a heat transfer member in a heat transferable manner.

The heat transfer member may include a function of supporting the first heat radiating member 68 and the second heat radiating member 69.

In the incident side cooling members according to the fourth and seventh embodiments, the first heat radiating member 88 provided to correspond to the first heat radiating section 831 on the second surface 83A of the second member 83 is disposed on the light incident side with respect to the first member 82.

However, not only this, but the first heat radiating member 88 may be provided on the light emission side with respect to the first member 82.

In the incident side cooling members according to the fifth and seventh embodiments, the second heat radiating member 89 provided to correspond to the second heat radiating section 832 on the second surface 83A of the second member 83 is disposed on the light incident side with respect to the first member 82.

However, not only this, but the second heat radiating member 89 may be provided on the light emission side with respect to the first member 82.

In these cases, for example, the first heat radiating section 831 and the first heat radiating member 88 only have to be coupled by a heat transfer member in a heat transferable manner. For example, the second heat radiating section 832 and the second heat radiating member 89 only have to be coupled by a heat transfer member in a heat transferable manner.

The heat transfer member may include a function of supporting the first heat radiating member 88 or the second heat radiating member 89.

Figure 36:
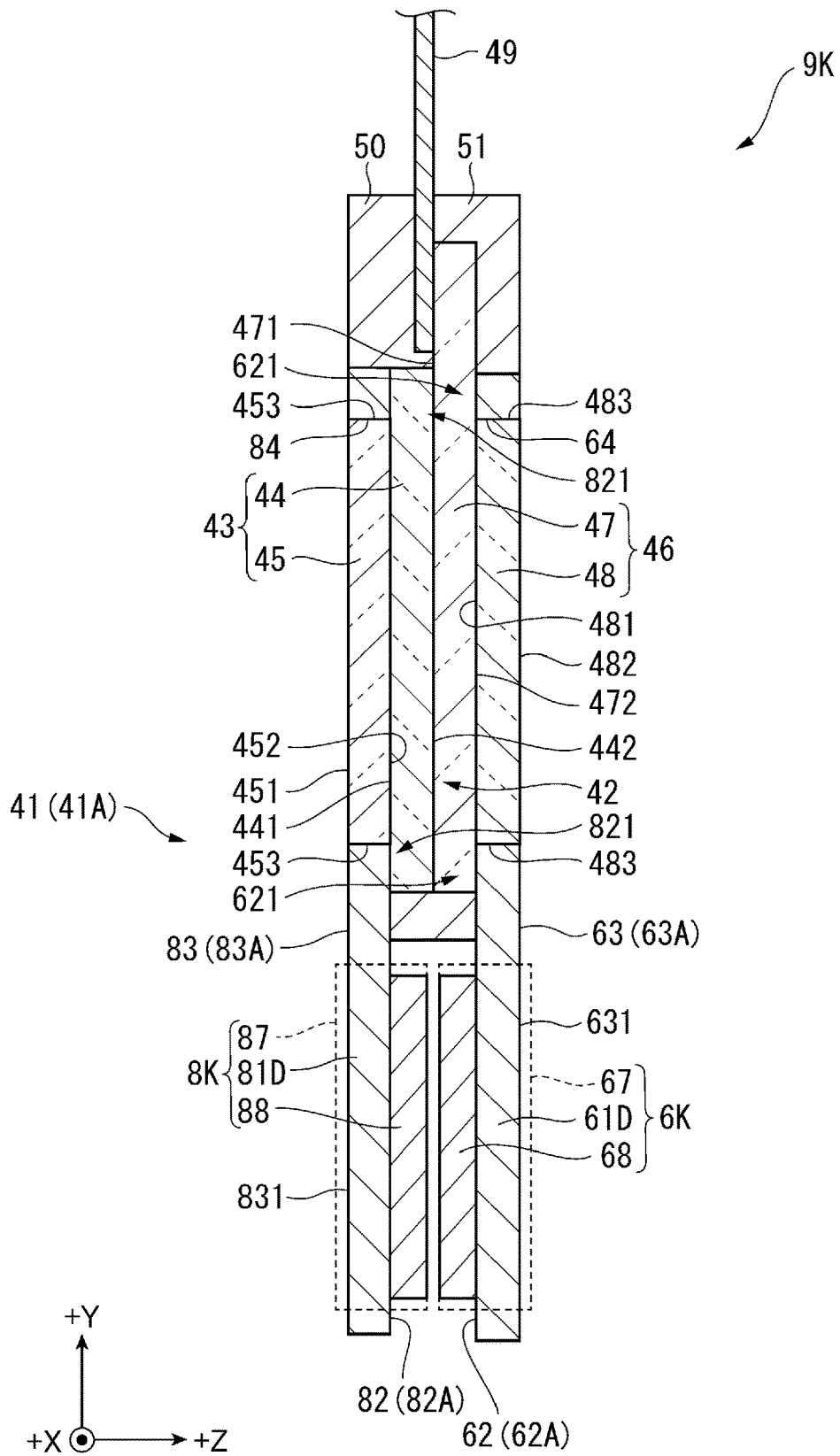
FIG. 36 is a schematic diagram showing a cross section of a modification of the liquid crystal panels according to the embodiments.

FIG. 36 is a diagram schematically showing a cross section along a YZ plane of a liquid crystal panel 9K, which is a modification of the liquid crystal panel 9D.

For example, the liquid crystal panel 9K shown in FIG. 36 may be adopted instead of the liquid crystal panel 9D.

The liquid crystal panel 9K includes the same components and the same functions as the components and the functions of the liquid crystal panel 9D except that the liquid crystal panel 9K includes an emission side cooling member 6K and an incident side cooling member 8K instead of the emission side cooling member 6D and the incident side cooling member 8D.

That is, the liquid crystal panel 9K includes the panel main body 41, the wire 49, the holding housing 50, the clamping member 51, the emission side cooling member 6K, and the incident side cooling member 8K.

Like the emission side cooling member 6D, the emission side cooling member 6K vaporizes the coolant in the liquid phase into the coolant in the gas phase with heat transferred from the pixel substrate 47 and the emission side dustproof substrate 48 and radiates heat received from the coolant in the gas phase to the outside. The emission side cooling member 6K includes the same components and the same functions as the components and the functions of the emission side cooling member 6D except that the emission side cooling member 6K includes a heat transfer member 67 and disposition of the first heat radiating member 68 is different.

That is, the emission side cooling member 6K includes the main body section 61D, the heat transfer member 67, and the first heat radiating member 68.

In the emission side cooling member 6K, the first heat radiating member 68 is disposed on the light incident side with respect to the first member 62. That is, the first heat radiating member 68 is disposed on the opposite side of the second member 63 with respect to the first member 62.

When the plurality of fins 681 are provided as the plurality of fins included in the first heat radiating member 68, the channels provided in the fins 681 may be inclined with respect to the +Y direction to be located further in the +X direction or the −X direction toward the +Y direction.

The heat transfer member 67 couples the first heat radiating section 631 on the second surface 63A and the first heat radiating member 68 in a heat transferable manner and transfers, to the first heat radiating member 68, the heat of the coolant in the gas phase transferred from the first condensing section to the first heat radiating section 631. The heat transfer member 67 may be formed by, for example, a metal sheet or may be formed by a metal member capable of supporting the first heat radiating member 68.

Like the incident side cooling member 8D, the incident side cooling member 8K vaporizes the coolant in the liquid phase into the coolant in the gas phase with heat transferred from the counter substrate 44 and the incident side dustproof substrate 45 and radiates heat received from the coolant in the gas phase to the outside. The incident side cooling member 8K includes the same components and the same functions as the components and the functions of the incident side cooling member 8D except that the incident side cooling member 8K includes the a heat transfer member 87 and disposition of the first heat radiating member 88 is different.

That is, the incident side cooling member 8K includes the main body section 81D, the heat transfer member 87, and the first heat radiating member 88.

In the incident side cooling member 8K, the first heat radiating member 88 is disposed on the light emission side with respect to the first member 82. That is, the first heat radiating member 88 is disposed on the opposite side of the second member 83 with respect to the first member 82.

When the plurality of fins 681 are provided as the plurality of fins included in the first heat radiating member 88, the channels provided in the fins 681 may be inclined with respect to the +Y direction to be located further in the +X direction or the −X direction toward the +Y direction.

The heat transfer member 87 couples the first heat radiating section 831 on the second surface 83A and the first heat radiating member 88 in a heat transferable manner and transfers, to the first heat radiating member 88, the heat of the coolant in the gas phase transferred from the first condensing section to the first heat radiating section 831. The heat transfer member 87 may be formed by, for example, a metal sheet or may be formed by a metal member capable of supporting the first heat radiating member 88.

The cooling gas circulated by the fan of the cooling device disposed in the exterior housing 2 flows in the +Y direction with respect to the liquid crystal panel 9K.

The cooling gas flowing in the space on the light incident side with respect to the liquid crystal panel 9K flows in the +Y direction and cools the incident side dustproof substrate 45 and, thereafter, cools the holding housing 50.

The cooling gas flowing in the space on the light emission side with respect to the liquid crystal panel 9K flows in the +Y direction and cools the emission side dustproof substrate 48 and, thereafter, cools the clamping member 51.

The cooling gas flowing between the main body section 61D of the emission side cooling member 6K and the main body section 81D of the incident side cooling member 8K flows in the +Y direction and cools the first heat radiating members 68 and 88 and, thereafter, flows in the +X direction or the −X direction and flows in a direction away from the liquid crystal panel 9K.

Such a liquid crystal panel 9K achieves the following effects besides achieving the same effects as the effects of the liquid crystal panel 9D.

It is possible to prevent the cooling gas having flowed in the first heat radiating member 68 from flowing to the emission side dustproof substrate 48. It is possible to prevent the cooling gas having flowed in the first heat radiating member 88 from flowing to the incident side dustproof substrate 45.

Accordingly, it is possible to individually circulate the cooling gas having relatively low temperature to each of the emission side dustproof substrate 48 and the first heat radiating member 68 disposed in the −Y direction with respect to the emission side dustproof substrate 48.

Similarly, it is possible to individually circulate the cooling gas having relatively low temperature to each of the incident side dustproof substrate 45 and the first heat radiating member 88 disposed in the −Y direction with respect to the incident side dustproof substrate 45.

Therefore, it is possible to efficiently cool the incident side dustproof substrate 45, the emission side dustproof substrate 48, and the first heat radiating members 68 and 88 and efficiently cool the liquid crystal layer 42.

In a liquid crystal panel including one emission side cooling member among the emission side cooling members 6D to 6I, the first heat radiating member 68 or the second heat radiating member 69 disposed in the −Y direction with respect to the opening sections 64 and 64C may be disposed on the opposite side of the second member 63 with respect to the first member 62. The second surface 63A and the first heat radiating member 68 or the second heat radiating member 69 may be coupled by the heat transfer member 67 in a heat transferable manner.

Similarly, in a liquid crystal panel including one incident side cooling member among the incident side cooling members 8D to 8I, the first heat radiating member 88 or the second heat radiating member 89 disposed in the −Y direction with respect to the opening sections 84 and 84C may be disposed on the opposite side of the second member 83 with respect to the first member 82. The second surface 83A and the first heat radiating member 88 or the second heat radiating member 89 may be coupled by the heat transfer member 87 in a heat transferable manner.

When the cooling gas flowing from the fan of the cooling device flows in the −Y direction with respect to the liquid crystal panel, the first heat radiating member 68 disposed in the +Y direction with respect to the opening sections 64 and 64C in the emission side cooling members 6A to 6C and 6G to 6I may be disposed in the opposite direction of the second member 63 with respect to the first member 62. The second surface 63A and the first heat radiating member 68 may be coupled via the heat transfer member 67 in a heat transferable manner.

Similarly, when the cooling gas flowing from the cooling device flows in the −Y direction with respect to the liquid crystal panel, the first heat radiating member 88 disposed in the +Y direction with respect to the opening sections 84 and 84C in the incident side cooling members 8A to 8C and 8G to 8I may be disposed in the opposite direction of the second member 83 with respect to the first member 82. The second surface 83A and the first heat radiating member 88 may be coupled via the heat transfer member 87 in a heat transferable manner.

One heat radiating member of the incident side heat radiating member included in the incident side cooling member and the emission side heat radiating member included in the emission side cooling member may be provided on the second member 83 side with respect to the first member 82 and the other heat radiating member may be provided on the opposite side of the second member 83 with respect to the first member 82.

In the embodiments explained above, the incident section 43 includes the incident side dustproof substrate 45 and the emission section 46 includes the emission side dustproof substrate 48.

However, not only this, but the liquid crystal panel according to the present disclosure may not include at least one dustproof substrate of the incident side dustproof substrate 45 and the emission side dustproof substrate 48.

In the embodiments explained above, the emission side cooling members 6A to 6I include at least one heat radiating member of the first heat radiating member 68 and the second heat radiating member 69 and the incident side cooling members 8A to 8I include at least one heat radiating member of the first heat radiating member 88 and the second heat radiating member 89.

However, not only this, but at least one of the incident side cooling member and the emission side cooling member may not include the heat radiating member.

That is, the heat radiating member may not be provided in the vapor chamber in the present disclosure.

In the embodiments explained above, the incident side electrode substrate disposed on the light incident side with respect to the liquid crystal layer 42 is the counter substrate 44 and the emission side electrode substrate disposed on the light emission side with respect to the liquid crystal layer 42 is the pixel substrate 47. However, not only this, but the incident side electrode substrate may be the pixel substrate 47 and the emission side electrode substrate may be the counter substrate 44.

In the embodiments explained above, the projector is explained as the device on which the liquid crystal panels 4A to 4I, 7A to 7I, and 9A to 9K are mounted. However, not only this, but the liquid crystal panel according to the present disclosure may be applied to, for example, a stationary liquid crystal display device or may be applied to, for example, a mobile liquid crystal display device.

Overview of the Present Disclosure

An overview of the present disclosure is noted below.

A transmissive liquid crystal panel according to a first aspect of the present disclosure includes: a pixel region where a plurality of pixels are arrayed; a liquid crystal layer configured to modulate light for each of the plurality of pixels; an incident section configured to make the light incident on the liquid crystal layer; an emission section configured to emit, as image light, the light modulated by the liquid crystal layer; and a vapor chamber including an opening section corresponding to the pixel region, a heat receiving section provided around the opening section, and a heat radiating section configured to radiate heat received by the heat receiving section, the vapor chamber vaporizing, with the heat received by the heat receiving section, a coolant in a liquid phase encapsulated on an inside of the vapor chamber and radiating, with the heat radiating section, heat of the coolant in a gas phase to thereby condense the coolant in the gas phase into the coolant in the liquid phase.

In the vapor chamber, a pipe for circulating the coolant and a wire for supplying driving power are unnecessary. With the configuration explained above, compared with when a cooling device in which the coolant flows is provided and when a thermoelectric conversion element such as a Peltier element for moving heat with electric power is provided, it is possible to simplify the configuration of the transmissive liquid crystal panel.

Therefore, it is possible to achieve a reduction in the size of a device on which the transmissive liquid crystal panel is mounted.

Since it is possible to attach and detach the transmissive liquid crystal panel to and from the device without attaching and detaching the pipe and the wire, it is possible to easily carry out replacement of the transmissive liquid crystal panel.

Further, since the heat receiving section provided around the opening section corresponding to the pixel region receives heat, it is possible to improve uniformity of the temperature in the pixel region.

In the first aspect, the emission section may include a light transmissive emission side substrate that is coupled to the liquid crystal layer in a heat transferable manner and through which the image light passes. An area of the emission side substrate may be larger than an area of the pixel region when viewed from an emitting direction of the image light. The vapor chamber may be provided on the emission side substrate in a heat transferable manner.

With such a configuration, since the emission side substrate is coupled to the liquid crystal layer in a heat transferable manner, the heat of the liquid crystal layer is transferred to the emission side substrate.

When the vapor chamber is provided on such an emission side substrate in a heat transferable manner, the heat receiving section easily receives the heat of the liquid crystal layer.

Therefore, it is possible to make it easy to cool the liquid crystal layer.

In the first aspect, the emission section may include a light transmissive emission side electrode substrate that includes an emission side electrode electrically coupled to the liquid crystal layer and is disposed on a light emission side with respect to the liquid crystal layer. The emission side substrate may be the emission side electrode substrate.

With such a configuration, the emission side electrode substrate is a light transmissive substrate directly coupled to the liquid crystal layer susceptible to heat. Since the vapor chamber is provided on such an emission side electrode substrate, it is possible to efficiently transfer heat generated by the liquid crystal layer to the heat receiving section.

Therefore, it is possible to improve cooling efficiency of the liquid crystal layer.

In the first aspect, the emission section may include an emission side dustproof substrate provided on a surface on a light emission side in the emission side electrode substrate. The emission side dustproof substrate may include a side surface that couples a surface on a light incident side in the emission side dustproof substrate and the surface on the light emission side in the emission side dustproof substrate. The heat receiving section may receive heat from the surface on the light emission side in the emission side electrode substrate and the side surface in the emission side dustproof substrate.

With such a configuration, since the heat receiving section receives the heat from each of the emission side electrode substrate and the emission side dustproof substrate, it is possible to transfer the heat of the liquid crystal layer to the heat receiving section via each of the emission side electrode substrate and the emission side dustproof substrate.

Therefore, since the heat of the liquid crystal layer can be efficiently transferred to the heat receiving section, it is possible to improve the cooling efficiency of the liquid crystal layer.

In the first aspect, the emission section may include: a light transmissive emission side electrode substrate that includes an emission side electrode electrically coupled to the liquid crystal layer and is disposed on a light emission side with respect to the liquid crystal layer; and an emission side dustproof substrate provided on a surface on the light emission side in the emission side electrode substrate. The emission side substrate may be the emission side dustproof substrate.

With such a configuration, the vapor chamber is provided, in a heat transferable manner, on the emission side dustproof substrate provided further on the light emission side than the emission side electrode substrate.

Accordingly, compared with when the vapor chamber is provided on the emission side electrode substrate to avoid the emission side dustproof substrate, it is possible to easily couple the vapor chamber to the emission section.

Since the heat generated by the liquid crystal layer is transferred to the emission side dustproof substrate via the emission side electrode substrate, the heat of the liquid crystal layer diffuses.

In contrast, since the vapor chamber is provided on the surface on the light emission side in the emission side dustproof substrate, it is possible to make it easy to transfer the heat of the liquid crystal layer to the heat receiving section.

In the first aspect, the vapor chamber may be provided on a surface on the light emission side of the emission side dustproof substrate.

With such a configuration, for example, compared with when the emission side dustproof substrate is disposed in the opening section corresponding to the pixel region, even when tolerance occurs in the vapor chamber, it is possible to easily attach the vapor chamber to the emission section.

In the first aspect, the emission side dustproof substrate may include a side surface that couples a surface on a light incident side in the emission side dustproof substrate and a surface on the light emission side in the emission side dustproof substrate. An inner circumferential surface of the opening section may be coupled to at least a part of the side surface in the emission side dustproof substrate in a heat transferable manner.

With such a configuration, the heat of the liquid crystal layer transferred to the emission side dustproof substrate can be received by the inner circumferential surface of the opening section.

Accordingly, compared with when the vapor chamber is provided such that the heat receiving section is coupled to the surface on the light emission side in the emission side dustproof substrate, it is possible to prevent the dimension of the transmissive liquid crystal panel in a light passing direction from increasing.

In the first aspect, the heat receiving section may be coupled to the emission side electrode substrate in a heat transferable manner.

With such a configuration, not only heat is transferred to the heat receiving section from the side surface of the emission side dustproof substrate but also heat is transferred to the heat receiving section from the emission side electrode substrate.

Accordingly, since it is possible to make it easy to transfer the heat of the liquid crystal layer to the heat receiving section, it is possible to improve the cooling efficiency of the liquid crystal layer.

In the first aspect, the emission side electrode substrate may be a pixel substrate that includes, as the emission side electrode, a plurality of pixel electrodes provided to respectively correspond to the plurality of pixels and is disposed on the light emission side with respect to the liquid crystal layer.

In a general transmissive liquid crystal panel, a counter substrate is disposed on a light incident side with respect to a liquid crystal layer and a pixel substrate is disposed on a light emission side with respect to the liquid crystal layer.

Accordingly, since the emission side electrode substrate is the pixel substrate, the transmissive liquid crystal panel according to the present disclosure can be configured by providing the vapor chamber having the configuration explained above in the general transmissive liquid crystal panel.

Therefore, it is possible to easily configure the transmissive liquid crystal panel according to the present disclosure.

In the first aspect, the incident section may include a light transmissive incident side substrate that is coupled to the liquid crystal layer in a heat transferable manner and through which the light made incident on the liquid crystal layer passes. An area of the incident side substrate may be larger than an area of the pixel region when viewed from an opposite direction of a traveling direction of the light made incident on the liquid crystal layer. The vapor chamber may be provided on the incident side substrate in a heat transferable manner.

With such a configuration, since the incident side substrate is coupled to the liquid crystal layer in a heat transferable manner, the heat of the liquid crystal layer is transferred to the incident side substrate. Since the vapor chamber is provided on such an incident side substrate in a heat transferable manner, the heat receiving section easily receives the heat of the liquid crystal layer.

Therefore, it is possible to make it easy to cool the liquid crystal layer.

In the first aspect, the incident section may include a light transmissive incident side electrode substrate that includes an incident side electrode electrically coupled to the liquid crystal layer and is disposed on a light incident side with respect to the liquid crystal layer. The incident side substrate may be the incident side electrode substrate.

With such a configuration, the incident side electrode substrate is a light transmissive substrate directly coupled to the liquid crystal layer susceptible to heat. Since the vapor chamber is provided on such an emission side electrode substrate, it is possible to efficiently transfer heat generated by the liquid crystal layer to the heat receiving section.

Therefore, it is possible to improve the cooling efficiency of the liquid crystal layer.

In the first aspect, the incident section may include an incident side dustproof substrate provided on a surface on the light incident side in the incident side electrode substrate. The incident side dustproof substrate may include a side surface that couples a surface on the light incident side in the incident side dustproof substrate and a surface on a light emission side in the incident side dustproof substrate. The heat receiving section may receive heat from the surface on the light incident side in the incident side electrode substrate and the side surface in the incident side dustproof substrate.

With such a configuration, since the heat receiving section receives heat from each of the incident side electrode substrate and the incident side dustproof substrate, the heat of the liquid crystal layer can be transferred to the heat receiving section via each of the incident side electrode substrate and the incident side dustproof substrate.

Therefore, since the heat of the liquid crystal layer can be efficiently transferred to the heat receiving section, it is possible to improve the cooling efficiency of the liquid crystal layer.

In the first aspect, the incident section may include: a light transmissive incident side electrode substrate that includes an incident side electrode electrically coupled to the liquid crystal layer and is disposed on a light incident side with respect to the liquid crystal layer; and an incident side dustproof substrate provided on a surface on the light incident side in the incident side electrode substrate. The incident side substrate may be the incident side dustproof substrate.

With such a configuration, the vapor chamber is provided, in a heat transferable manner, on the incident side dustproof substrate provided further on the light incident side than the incident side electrode substrate.

Accordingly, compared with when the vapor chamber is provided on the incident side electrode substrate to avoid the incident side dustproof substrate, it is possible to easily couple the vapor chamber to the incident section.

Since heat generated by the liquid crystal layer is transferred to the emission side dustproof substrate via the incident side electrode substrate, the heat of the liquid crystal layer diffuses.

In contrast, since the vapor chamber is provided on the surface on the light incident side in the incident side dustproof substrate, it is possible to make it easy to transfer the heat of the liquid crystal layer to the heat receiving section.

In the first aspect, the vapor chamber may be provided on a surface on the light incident side of the incident side dustproof substrate.

With such a configuration, for example, compared with when the incident side dustproof substrate is disposed in the opening section corresponding to the pixel region, even when tolerance occurs in the vapor chamber, it is possible to easily attach the vapor chamber to the incident section.

In the first aspect, the incident side dustproof substrate may include a side surface that couples a surface on the light incident side in the incident side dustproof substrate and a surface on a light emission side in the incident side dustproof substrate. An inner circumferential surface of the opening section may be in contact with at least a part of the side surface in the incident side dustproof substrate in a heat transferable manner.

With such a configuration, the heat of the liquid crystal layer transferred to the incident side dustproof substrate can be received by the inner edge of the opening section.

Accordingly, compared with when the vapor chamber is provided such that the heat receiving section is coupled to the surface on the light incident side in the incident side dustproof substrate, it is possible to prevent the dimension of the transmissive liquid crystal panel in the light passing direction from increasing.

In the first aspect, the heat receiving section may be coupled to the incident side electrode substrate in a heat transferable manner.

With such a configuration, not only heat is transferred to the heat receiving section from the side surface of the incident side dustproof substrate but also heat is transferred to the heat receiving section from the incident side electrode substrate.

Accordingly, since it is possible to make it easy to transfer the heat of the liquid crystal layer to the heat receiving section, it is possible to improve the cooling efficiency of the liquid crystal layer.

In the first aspect, the incident side electrode substrate may be a counter substrate including, as the incident side electrode, a common electrode provided to correspond to the pixel region.

As explained above, in the general transmissive liquid crystal panel, the counter substrate is disposed on the light incident side with respect to the liquid crystal layer and the pixel substrate is disposed on the light emission side with respect to the liquid crystal layer.

Accordingly, since the incident side electrode substrate is the counter substrate, the transmissive liquid crystal panel according to the present disclosure can be configured by providing the vapor chamber having the configuration explained above in the general transmissive liquid crystal panel.

Therefore, it is possible to easily configure the transmissive liquid crystal panel according to the present disclosure.

In the first aspect, the transmissive liquid crystal panel may further include a wire configured to supply an image signal for driving the liquid crystal layer, and the vapor chamber may extend from the opening section in an extending direction of the wire from the liquid crystal layer.

With such a configuration, for example, compared with when the vapor chamber extends in the opposite direction of the extending direction of the wire from the opening section, it is possible to prevent an increase in the size of the transmissive liquid crystal panel.

In the first aspect, the transmissive liquid crystal panel may further include a wire configured to supply an image signal for driving the liquid crystal layer, and the vapor chamber may extend from the opening section in an opposite direction of an extending direction of the wire from the liquid crystal layer.

With such a configuration, since it is possible to prevent the wire and the vapor chamber from interfering with each other, it is possible to prevent heat radiation by the vapor chamber from being hindered by the wire.

In the first aspect, the transmissive liquid crystal panel may further include a wire configured to supply an image signal for driving the liquid crystal layer, and the vapor chamber may extend from the opening section in each of an extending direction of the wire from the liquid crystal layer and an opposite direction of the extending direction.

With such a configuration, since it is possible to increase a heat radiation area of heat received from the coolant in the gas phase in the vapor chamber, it is possible to make it easy to condense the coolant in the gas phase into the coolant in the liquid phase.

Therefore, it is possible to circulate the coolant in the liquid phase to the heat receiving section without delay. It is possible to accelerate the vaporization of the coolant in the liquid phase by the heat of the liquid crystal layer.

When the transmissive liquid crystal panel is disposed such that one of the extending direction of the wire and the opposite direction of the extending direction of the wire is the vertical direction upper side, the condensed coolant in the liquid phase can be transported to, by not only the capillarity but also the gravity, a portion that vaporizes the coolant in the liquid phase.

Consequently, the change from the coolant in the liquid phase to the coolant in the gas phase by the heat received by the heat receiving section can be accelerated.

Therefore, it is possible to improve heat radiation efficiency of the heat of the liquid crystal layer and the cooling efficiency of the liquid crystal layer.

In the first aspect, the transmissive liquid crystal panel may further include a heat radiating member provided in the vapor chamber and configured to radiate the heat transferred from the heat radiating section. The heat radiating member may be provided, with respect to the opening section, in a direction in which the vapor chamber extends from the opening section.

With such a configuration, it is possible to separate a heat generating body coupled to the heat receiving section and the heat radiating member.

Consequently, it is possible to prevent the heat transferred to the heat radiating member from affecting the heat generating body.

A transmissive liquid crystal panel according to a second aspect of the present disclosure includes: a pixel region where a plurality of pixels are arrayed; a liquid crystal layer configured to modulate light for each of the plurality of pixels; a counter substrate including a common electrode provided to correspond to the pixel region; a pixel substrate including a plurality of pixel electrodes provided to respectively correspond to the plurality of pixels, the pixel substrate carrying the liquid crystal layer between the pixel substrate and the counter substrate; a first dustproof substrate provided on a surface on an opposite side of the pixel substrate in the counter substrate; and a second dustproof substrate provided on a surface on an opposite side of the counter substrate in the pixel substrate.

The transmissive liquid crystal panel further includes a first vapor chamber including a first opening section corresponding to the pixel region, a first heat receiving section provided around the first opening section and coupled to at least one of the counter substrate and the first dustproof substrate in a heat transferable manner, and a first heat radiating section configured to radiate heat received by the first heat receiving section, the first vapor chamber vaporizing, with the heat received by the first heat receiving section, a first coolant in a liquid phase encapsulated on an inside of the first vapor chamber and radiating, with the first heat radiating section, heat of the first coolant in a gas phase to thereby condense the first coolant in the gas phase into the first coolant in the liquid phase.

The transmissive liquid crystal panel further includes a second vapor chamber including a second opening section corresponding to the pixel region, a second heat receiving section provided around the second opening section and coupled to at least one of the pixel substrate and the second dustproof substrate in a heat transferable manner, and a second heat radiating section configured to radiate heat received by the second heat receiving section, the second vapor chamber vaporizing, with the heat received by the second heat receiving section, a second coolant in the liquid phase encapsulated on an inside of the second vapor chamber and radiating, with the second heat radiating section, heat of the second coolant in the gas phase to thereby condense the second coolant in the gas phase into the second coolant in the liquid phase.

With such a configuration, it is possible to achieve the same effects as the effects of the transmissive liquid crystal panel according to the first aspect.

Since the transmissive liquid crystal panel includes the first vapor chamber coupled to at least one of the counter substrate and the first dustproof substrate in a heat transferable manner and the second vapor chamber coupled to at least one of the pixel substrate and the second dustproof substrate in a heat transferable manner, it is possible to further improve the cooling efficiency of the liquid crystal layer.

In the second aspect, the first vapor chamber may extend further to an outer side than the counter substrate and the first dustproof substrate when viewed from an incident side of light made incident on the liquid crystal layer. The second vapor chamber may extend further to the outer side than the pixel substrate and the second dustproof substrate when viewed from an emission side of light emitted from the liquid crystal layer. The first vapor chamber and the second vapor chamber may be opposed to each other in a light incident direction with respect to the liquid crystal layer.

With such a configuration, compared with when the first vapor chamber and the second vapor chamber are not opposed to each other, it is possible to prevent an increase in the size of the transmissive liquid crystal panel.

What is claimed is:

1. A transmissive liquid crystal panel comprising:
a liquid crystal panel that includes:
a pixel region where a plurality of pixels are arrayed;
a liquid crystal layer configured to modulate light for each of the plurality of pixels;
an incident section configured to make the light incident on the liquid crystal layer; and
an emission section configured to emit, as image light, the light modulated by the liquid crystal layer; and
a vapor chamber coupled to the liquid crystal panel in a heat transferable manner, and including an opening section corresponding to the pixel region, a heat receiving section provided around the opening section and configured to receive heat from the liquid crystal panel, and a heat radiating section configured to radiate heat received by the heat receiving section, the vapor chamber vaporizing, with the heat received by the heat receiving section, a coolant in a liquid phase encapsulated on an inside of the vapor chamber and radiating, with the heat radiating section, heat of the coolant in a gas phase to thereby condense the coolant in the gas phase into the coolant in the liquid phase.

2. The transmissive liquid crystal panel according to claim 1, wherein
the emission section includes a light transmissive emission side substrate that is coupled to the liquid crystal layer in a heat transferable manner and through which the image light passes,
an area of the emission side substrate is larger than an area of the pixel region when viewed from an emitting direction of the image light, and
the vapor chamber is provided on the emission side substrate in a heat transferable manner.

3. The transmissive liquid crystal panel according to claim 2, wherein
the emission section includes a light transmissive emission side electrode substrate that includes an emission side electrode electrically coupled to the liquid crystal layer and is disposed on a light emission side with respect to the liquid crystal layer, and the emission side substrate is the emission side electrode substrate.

4. The transmissive liquid crystal panel according to claim 2, wherein
the emission section includes:
a light transmissive emission side electrode substrate that includes an emission side electrode electrically coupled to the liquid crystal layer and is disposed on a light emission side with respect to the liquid crystal layer; and
an emission side dustproof substrate provided on a surface on the light emission side in the emission side electrode substrate, and
the emission side substrate is the emission side dustproof substrate.

5. The transmissive liquid crystal panel according to claim 4, wherein the vapor chamber is provided on a surface on the light emission side of the emission side dustproof substrate.

6. The transmissive liquid crystal panel according to claim 4, wherein
the emission side dustproof substrate includes a side surface that couples a surface on a light incident side in the emission side dustproof substrate and a surface on the light emission side in the emission side dustproof substrate, and
an inner circumferential surface of the opening section is coupled to at least a part of the side surface in the emission side dustproof substrate in a heat transferable manner.

7. The transmissive liquid crystal panel according to claim 6, wherein the heat receiving section is coupled to the emission side electrode substrate in a heat transferable manner.

8. The transmissive liquid crystal panel according to claim 3, wherein the emission side electrode substrate is a pixel substrate that includes, as the emission side electrode, a plurality of pixel electrodes provided to respectively correspond to the plurality of pixels and is disposed on the light emission side with respect to the liquid crystal layer.

9. The transmissive liquid crystal panel according to claim 1, wherein
the incident section includes a light transmissive incident side substrate that is coupled to the liquid crystal layer in a heat transferable manner and through which the light made incident on the liquid crystal layer passes,
an area of the incident side substrate is larger than an area of the pixel region when viewed from an opposite direction of a traveling direction of the light made incident on the liquid crystal layer, and
the vapor chamber is provided on the incident side substrate in a heat transferable manner.

10. The transmissive liquid crystal panel according to claim 9, wherein
the incident section includes a light transmissive incident side electrode substrate that includes an incident side electrode electrically coupled to the liquid crystal layer and is disposed on a light incident side with respect to the liquid crystal layer, and
the incident side substrate is the incident side electrode substrate.

11. The transmissive liquid crystal panel according to claim 10, wherein
the incident section includes an incident side dustproof substrate provided on a surface on the light incident side in the incident side electrode substrate, the incident side dustproof substrate includes a side surface that couples a surface on the light incident side in the incident side dustproof substrate and a surface on a light emission side in the incident side dustproof substrate, and the heat receiving section receives heat from the surface on the light incident side in the incident side electrode substrate and the side surface in the incident side dustproof substrate.

12. The transmissive liquid crystal panel according to claim 9, wherein the incident section includes:

a light transmissive incident side electrode substrate that includes an incident side electrode electrically coupled to the liquid crystal layer and is disposed on a light incident side with respect to the liquid crystal layer; and an incident side dustproof substrate provided on a surface on the light incident side in the incident side electrode substrate, and the incident side substrate is the incident side dustproof substrate.

13. The transmissive liquid crystal panel according to claim 12, wherein the vapor chamber is provided on a surface on the light incident side of the incident side dustproof substrate.

14. The transmissive liquid crystal panel according to claim 12, wherein the incident side dustproof substrate includes a side surface that couples a surface on the light incident side in the incident side dustproof substrate and a surface on a light emission side in the incident side dustproof substrate, and an inner circumferential surface of the opening section is in contact with at least a part of the side surface in the incident side dustproof substrate in a heat transferable manner.

15. The transmissive liquid crystal panel according to claim 14, wherein the heat receiving section is coupled to the incident side electrode substrate in a heat transferable manner.

16. The transmissive liquid crystal panel according to claim 10, wherein the incident side electrode substrate is a counter substrate including, as the incident side electrode, a common electrode provided to correspond to the pixel region.

17. A transmissive liquid crystal panel comprising:

a pixel region where a plurality of pixels are arrayed;

a liquid crystal layer configured to modulate light for each of the plurality of pixels;

a counter substrate including a common electrode provided to correspond to the pixel region;

a pixel substrate including a plurality of pixel electrodes provided to respectively correspond to the plurality of pixels, the pixel substrate carrying the liquid crystal layer between the pixel substrate and the counter substrate;

a first dustproof substrate provided on a surface on an opposite side of the pixel substrate in the counter substrate;

a second dustproof substrate provided on a surface on an opposite side of the counter substrate in the pixel substrate;

a first vapor chamber including a first opening section corresponding to the pixel region, a first heat receiving section provided around the first opening section and coupled to at least one of the counter substrate and the first dustproof substrate in a heat transferable manner, and a first heat radiating section configured to radiate heat received by the first heat receiving section, the first vapor chamber vaporizing, with the heat received by the first heat receiving section, a first coolant in a liquid phase encapsulated on an inside of the first vapor chamber and radiating, with the first heat radiating section, heat of the first coolant in a gas phase to thereby condense the first coolant in the gas phase into the first coolant in the liquid phase; and a second vapor chamber including a second opening section corresponding to the pixel region, a second heat receiving section provided around the second opening section and coupled to at least one of the pixel substrate and the second dustproof substrate in a heat transferable manner, and a second heat radiating section configured to radiate heat received by the second heat receiving section, the second vapor chamber vaporizing, with the heat received by the second heat receiving section, a second coolant in the liquid phase encapsulated on an inside of the second vapor chamber and radiating, with the second heat radiating section, heat of the second coolant in the gas phase to thereby condense the second coolant in the gas phase into the second coolant in the liquid phase.

18. The transmissive liquid crystal panel according to claim 17, wherein the first vapor chamber extends further to an outer side than the counter substrate and the first dustproof substrate when viewed from an incident side of light made incident on the liquid crystal layer, the second vapor chamber extends further to the outer side than the pixel substrate and the second dustproof substrate when viewed from an emission side of light emitted from the liquid crystal layer, and the first vapor chamber and the second vapor chamber are opposed to each other in a light incident direction with respect to the liquid crystal layer.

* * * * *